(12) United States Patent
Mahalingam et al.

(10) Patent No.: US 12,218,903 B2
(45) Date of Patent: Feb. 4, 2025

(54) L2 DOMAIN HIERARCHICAL ADDRESS COMMUNICATION SYSTEM

(71) Applicant: Dell Products L.P., Round Rock, TX (US)

(72) Inventors: Venkatesan Mahalingam, Pleasanton, CA (US); Vinoth Kumar Arumugam, Fremont, CA (US); Senthil Kumar Ganesan, San Ramon, CA (US); Anoop Ghanwani, Roseville, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/076,856

(22) Filed: Dec. 7, 2022

(65) Prior Publication Data

US 2024/0195778 A1 Jun. 13, 2024

(51) Int. Cl.
*H04L 61/103* (2022.01)
*H04L 45/02* (2022.01)
*H04L 47/33* (2022.01)

(52) U.S. Cl.
CPC ............ *H04L 61/103* (2013.01); *H04L 45/04* (2013.01); *H04L 47/33* (2013.01)

(58) Field of Classification Search
CPC ..... H04L 45/48; H04L 1/0025; H04L 1/0032; H04L 1/0002; H04L 1/1671; H04L 1/1685; H04L 61/00; H04L 45/00; H04L 45/66; H04L 12/4633; H04L 41/0226; H04L 41/042; H04L 41/0806; H04L 41/20; H04L 41/50; H04L 45/38; H04L 45/42; H04L 47/10; H04L 47/50; H04L 47/825; H04L 49/254; H04L 12/66; H04L 41/044; H04L 41/122; H04L 41/40; H04L 45/04; H04L 12/6418; H04L 41/12; H04L 41/5003; H04L 47/17; H04L 47/24; H04L 47/2433; H04L 47/26; H04L 47/265; H04L 47/30; H04L 47/33; H04L 47/805; H04L 49/358; H04L 49/70; H04L 43/04; H04L 43/062; H04L 43/0894; H04L 63/02; H04L 63/0227; H04L 63/1408; H04L 63/1425; H04L 63/20; H04L 45/74;
(Continued)

(56) References Cited

U.S. PATENT DOCUMENTS

2005/0027881 A1* 2/2005 Figueira ................ H04L 49/602
709/238
2006/0098644 A1* 5/2006 Pullela ..................... H04L 61/00
370/389

(Continued)

*Primary Examiner* — Djenane M Bayard
(74) *Attorney, Agent, or Firm* — Joseph Mencher

(57) ABSTRACT

A Layer 2 (L2) domain hierarchical address communication system includes a first computing device that provides a first host, and a second computing device that provides a second host. A first leaf switch device is connected to the first computing device, and a second leaf switch device that is connected to the second computing device and coupled to the first leaf switch device. The first leaf switch device receives a first data communication from the first host that includes a second hierarchical MAC address of the second host. The first leaf switch device identifies a hierarchical MAC prefix in the second hierarchical MAC address, and uses the hierarchical MAC prefix to forward the first data communication to the second leaf switch device.

20 Claims, 43 Drawing Sheets

(58) Field of Classification Search
CPC ... H04L 2101/622; H04L 45/02; H04L 45/08;
H04L 45/745; H04L 45/7452; H04L
49/3009; H04L 49/356; H04L 61/103;
H04L 61/58; H04L 45/586; H04L
41/0816; H04L 61/5007; H04L 12/4641;
H04L 41/0893; H04L 41/0895; H04L
41/0896; H04L 49/00; H04L 41/0894;
H04L 47/783; H04L 41/0853; H04L
45/036; H04L 45/76; H04L 49/1546;
H04L 49/3063; H04L 47/125
See application file for complete search history.

(56) References Cited

U.S. PATENT DOCUMENTS

| | | | | |
|---|---|---|---|---|
| 2012/0113871 | A1* | 5/2012 | Bulusu | H04L 45/00 370/256 |
| 2014/0247754 | A1* | 9/2014 | Venkata | H04L 45/48 370/256 |
| 2014/0369345 | A1* | 12/2014 | Yang | H04L 12/1886 370/392 |
| 2016/0036703 | A1* | 2/2016 | Josyula | H04L 45/745 370/392 |

* cited by examiner

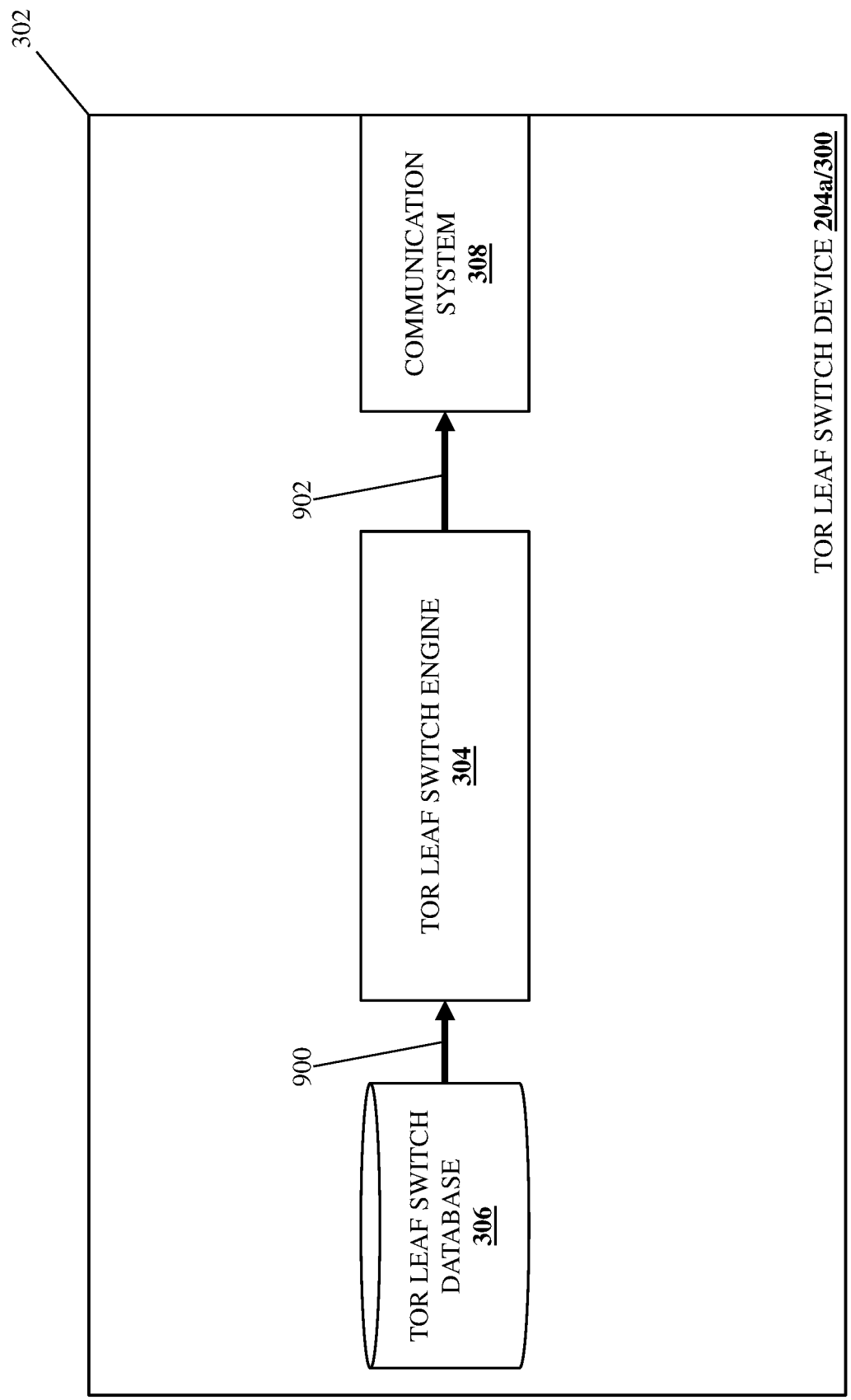

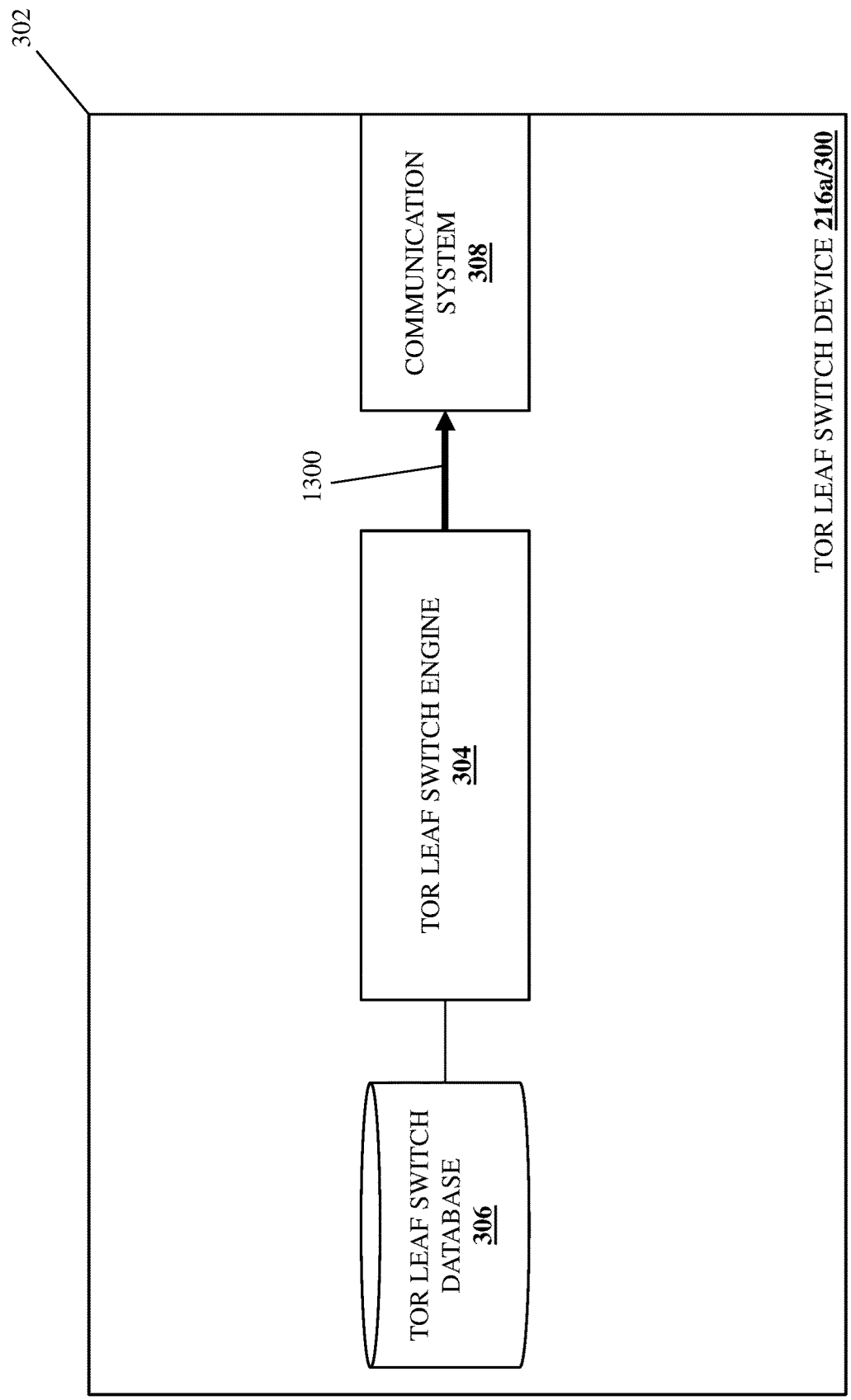

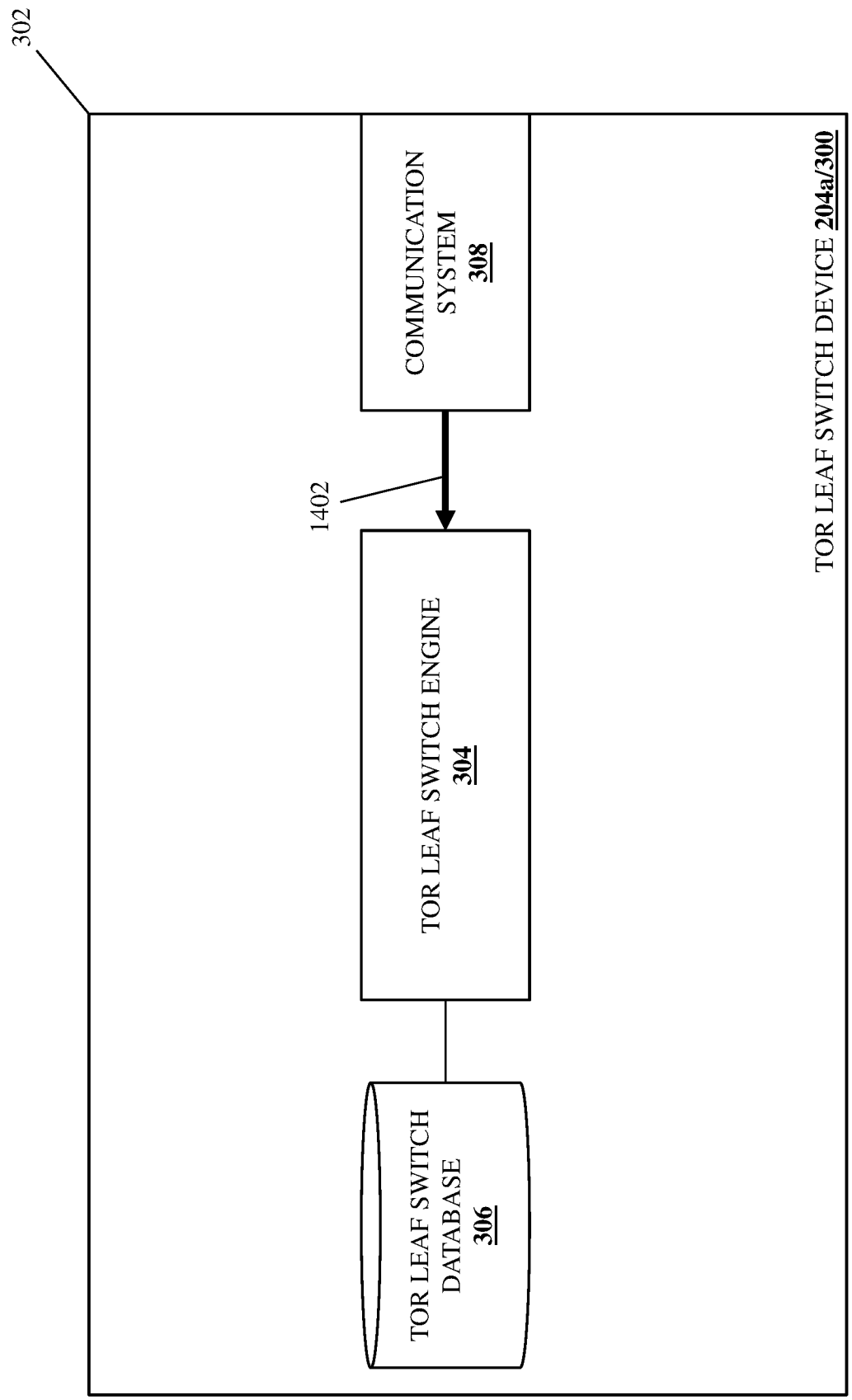

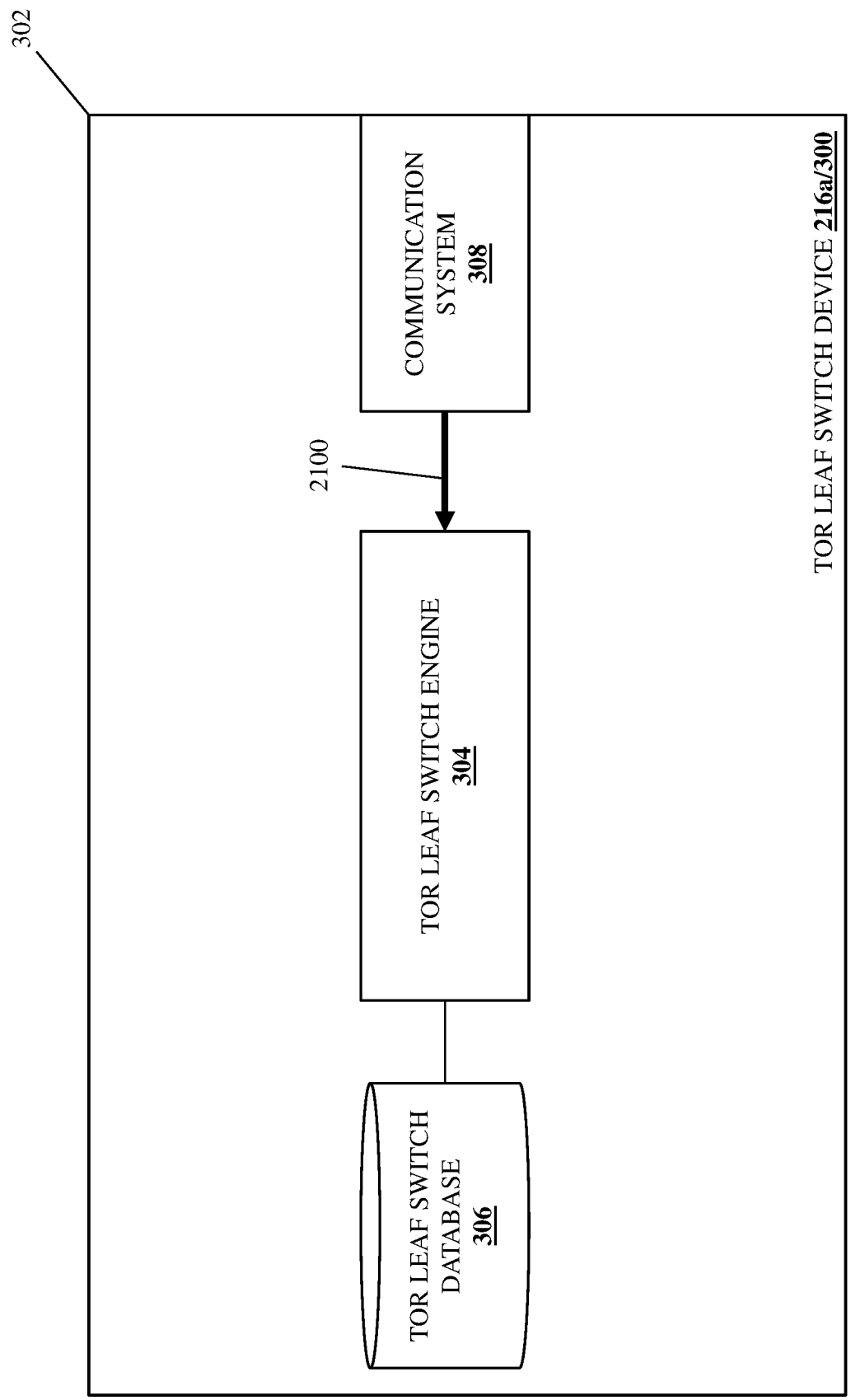

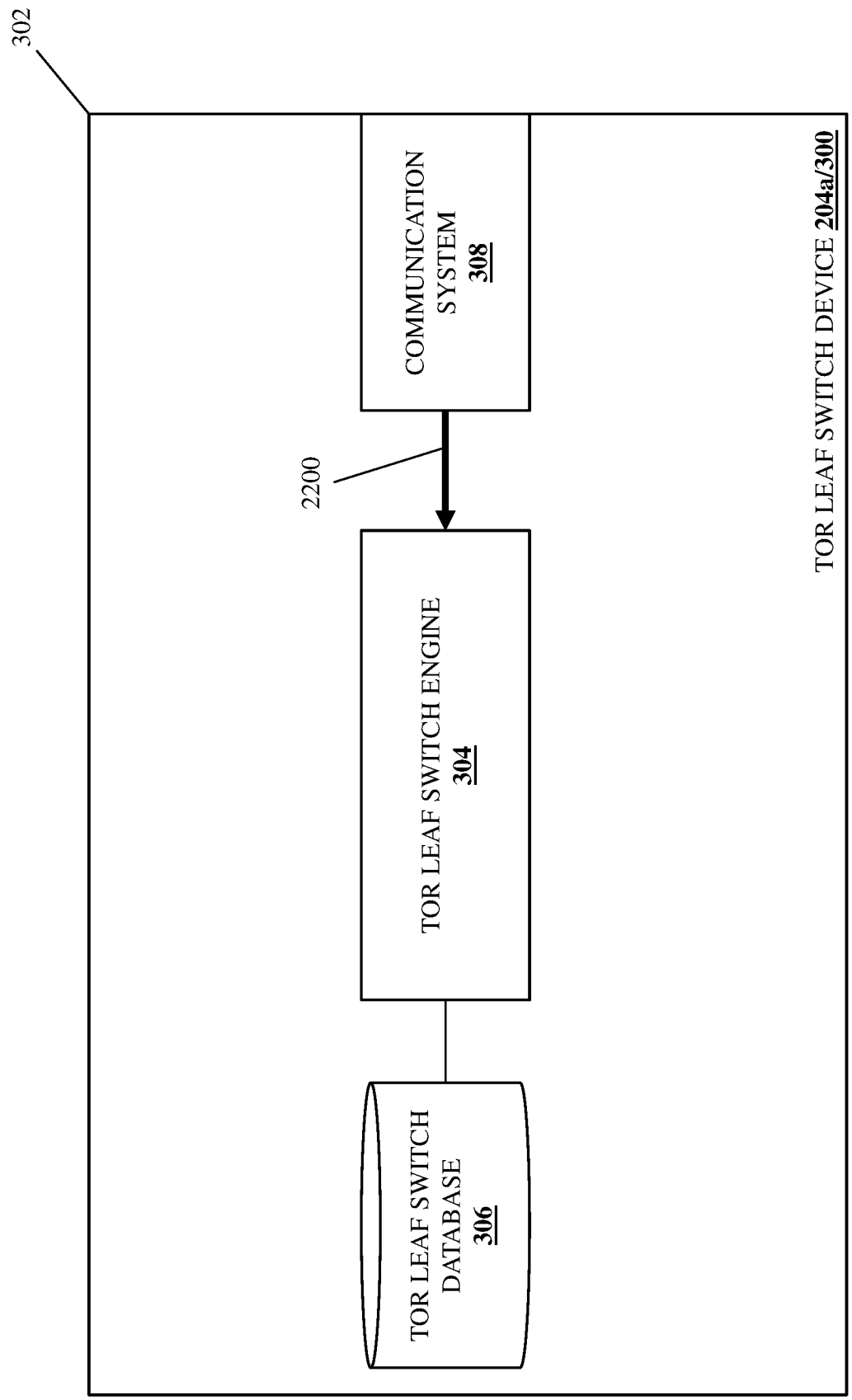

L2 DOMAIN HIERARCHICAL ADDRESS COMMUNICATION SYSTEM

BACKGROUND

The present disclosure relates generally to information handling systems, and more particularly to the use of hierarchical addresses for communications between information handling systems via a Layer 2 (L2) domain.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices in datacenters, can sometimes provide many hosts that communicate with other hosts provided in the datacenters. For example, server devices in datacenters may provide many virtual machines and/or other virtual entities that perform Layer 2 (L2) domain communications (i.e., communications via the data link layer in the Transmission Control Protocol/Internet Protocol (TCP/IP) network model) with each other. In order to support such virtual computing resources and/or clusters across geographically distributed datacenters (as well as to provide workload mobility), network administrators and/or other users may need to extend their Layer 2 (L2) domain within any particular datacenter as well as across datacenters, which can raise some issues.

For example, the conventional extension of an L2 domain in a datacenter or across datacenters with server devices that provide relatively large numbers of hosts requires relatively large Media Access Control (MAC) address tables in the switch devices and/or other networking devices in those datacenter(s) that store the MAC addresses of all hosts reachable by those switch devices, thus presenting scaling issues. One solution to such issues is the Border Gateway Protocol (BGP) Ethernet Virtual Private Network (EVPN) that eliminates L2 forwarding in networking devices other than leaf switch devices, thus addressing the scaling issues in spine switch devices (but with the scaling issue with leaf switch devices remaining). One of skill in the art will appreciate how such scaling issues exists regardless of the encapsulation technique (e.g., Provider Backbone Bridging (PBB)/"MAC in MAC" encapsulation techniques, Locator Identifier Separation Protocol (LISP) encapsulation techniques, Overlay Transport Virtualization (OTV) encapsulation techniques, etc.) being used. Another solution to such issues is to perform encapsulation in hypervisors, but many network administrators or other users avoid such solutions due to the management complexity and/or other challenges presented by multi-hypervisor environments.

Accordingly, it would be desirable to provide an L2 domain communication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a leaf switch engine that is configured to: receive, from a first host provided by a first computing device, a first data communication that includes a second hierarchical MAC address of a second host provided by a second computing device; identify a hierarchical MAC prefix in the second hierarchical MAC address; and forward, using the hierarchical MAC prefix, the first data communication to a second leaf switch device that is coupled between the processing system and the second computing device.

BRIEF DESCRIPTION OF THE DRAWINGS

FIG. 9A is a schematic view illustrating an embodiment of the TOR leaf switch device of FIG. 3 operating during the method block of FIGS. 4B and 4C.

FIG. 13A is a schematic view illustrating an embodiment of the TOR leaf switch device of FIG. 3 operating during the method block of FIGS. 4B and 4C.

FIG. 14C is a schematic view illustrating an embodiment of the TOR leaf switch device of FIG. 3 operating during the method block of FIGS. 4B and 4C.

FIG. 21B is a schematic view illustrating an embodiment of the TOR leaf switch device of FIG. 3 operating during the method of FIG. 4A.

FIG. 22C is a schematic view illustrating an embodiment of the TOR leaf switch device of FIG. 3 operating during the method of FIG. 4A.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
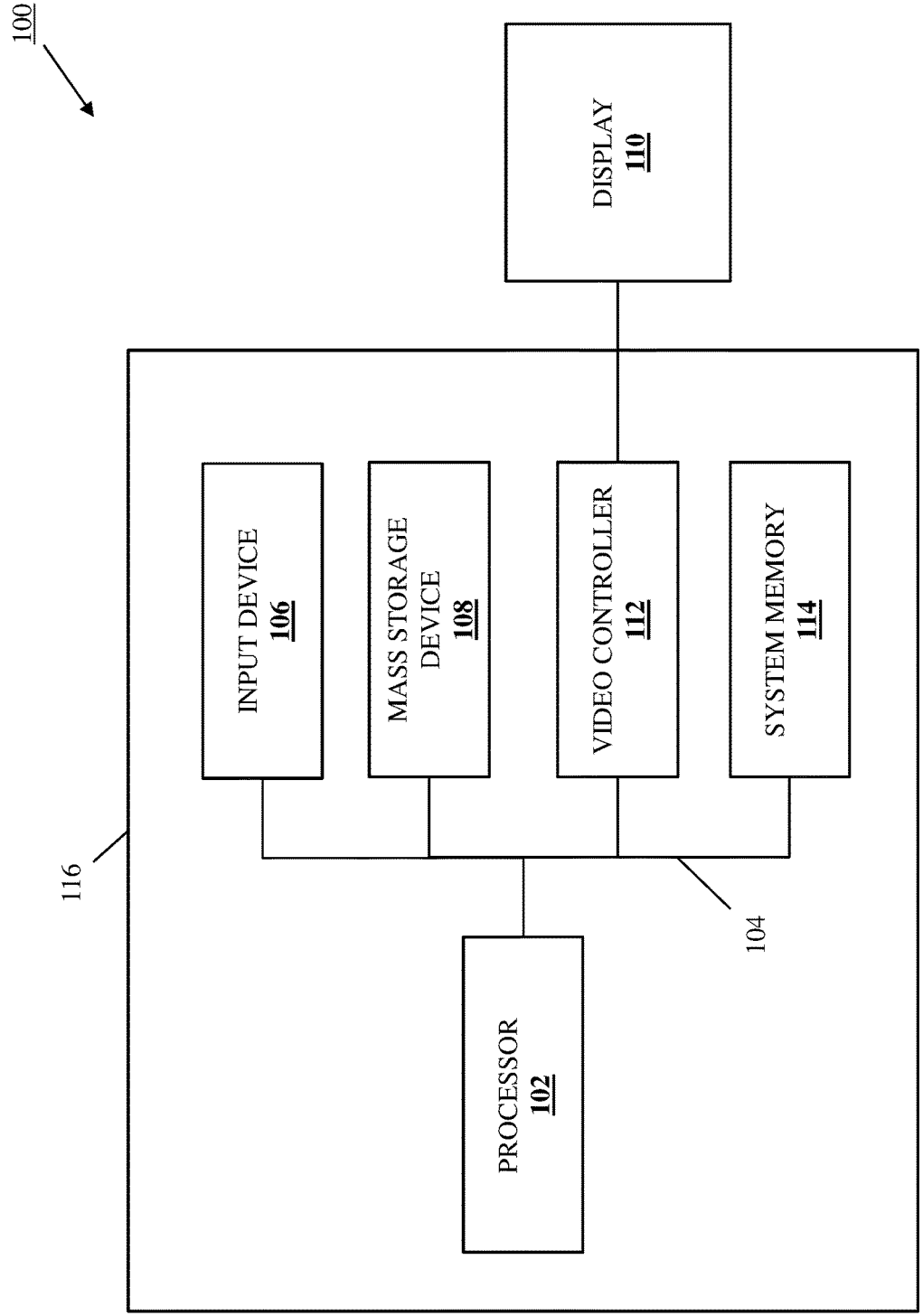
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
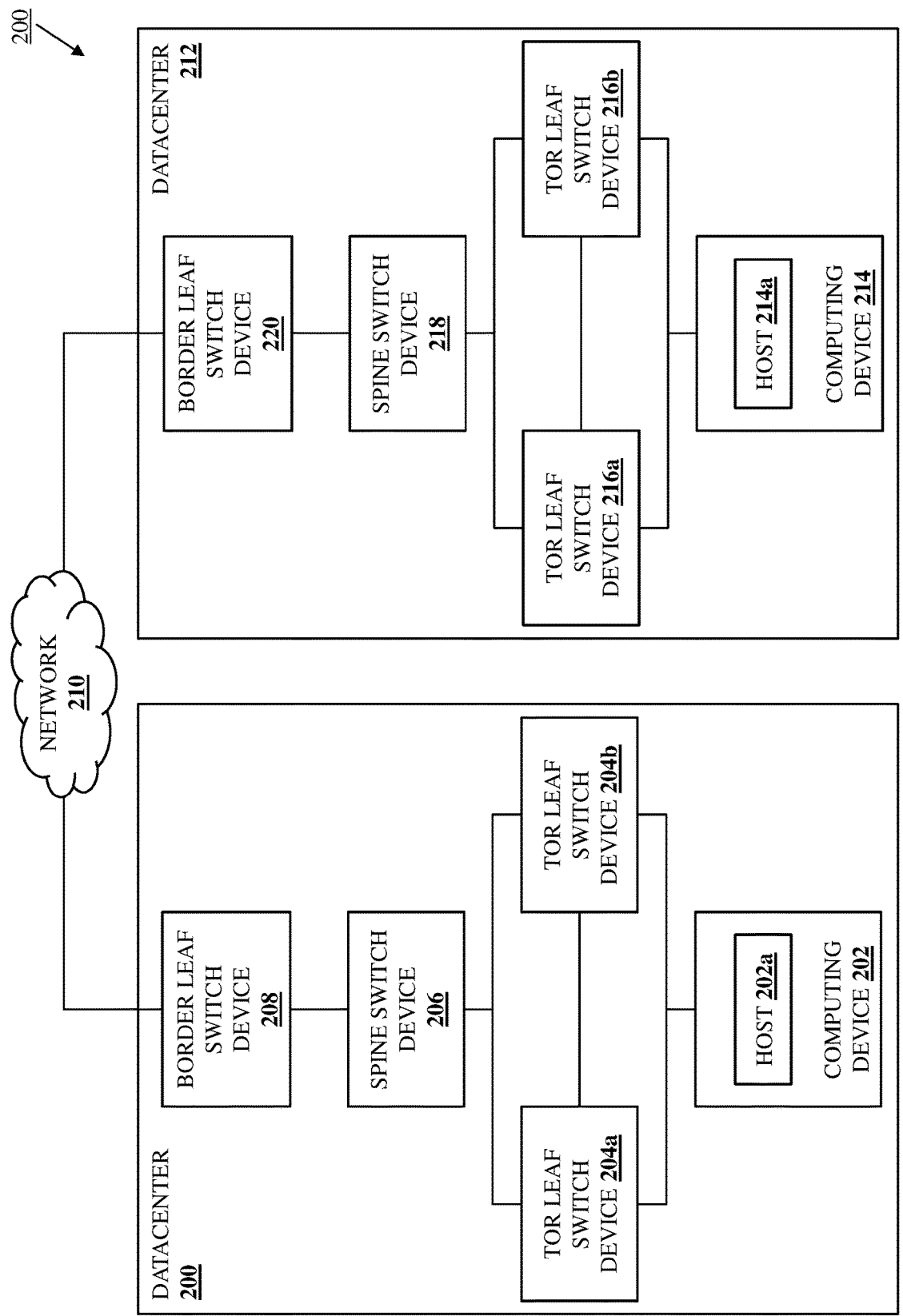
FIG. 2 is a schematic view illustrating an embodiment of a networked system that may utilize the L2 domain hierarchical address communication system of the present disclosure.

Referring now to FIG. 2, an embodiment of a networked system 200 is illustrated that may include the Layer 2 (L2) domain hierarchical address communication system of the present disclosure. In the illustrated embodiment, the networked system 200 includes a datacenter 200 including a plurality of devices, only some of which are illustrated and described below. For example, the datacenter 200 may include a computing device 202. In an embodiment, the computing device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that computing devices provided in the networked system 200 may include any devices that may be configured to operate similarly as the computing device 202 discussed below.

In the illustrated embodiment, the computing device 202 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a plurality of hosts such as the host 202a illustrated in FIG. 2 that, as discussed below, that is configured to perform the functionality of the hosts and/or computing devices discussed below. To provide a specific example, the host 202a may be provided by a virtual machine or other virtual computing resource known in the art and, as described herein, may be one of many hosts that are provided by the computing device 202.

In an embodiment, the computing device 202 is coupled to at least one leaf switch device that, in the illustrated embodiment, is provided by a pair of Top Of Rack (TOR) leaf switch devices 204a and 204b. In an embodiment, the either or both of the TOR leaf switch devices 204a and 204b may be provided by the IHS 100 discussed above with reference to FIG. 1, and/or may include some or all of the components of the IHS 100. However, while illustrated and discussed as being provided by TOR leaf switch devices, one of skill in the art in possession of the present disclosure will recognize that leaf switch devices provided in the networked system 200 may include any leaf switch devices that may be configured to operate similarly as the TOR leaf switch devices 204a and/or 204b discussed below.

In the specific examples provided below, the TOR leaf switch devices 204a and 204b are aggregated to operate as a single logical TOR leaf switch device (e.g., via aggregation protocols such as the Virtual Link Trunking (VLT) protocol and/or other aggregation protocols that would be apparent to one of skill in the art in possession of the present disclosure), with the TOR leaf switch device 204a operating as a "primary" aggregated switch device, and the TOR leaf switch device 204b operating as a "secondary" aggregated switch device. However, one of skill in the art in possession of the present disclosure will appreciate how the TOR leaf switch devices 204a and 204b may be replaced by a single leaf switch device and/or configured to provide the functionality described below in other manners that will fall within the scope of the present disclosure as well. As will be appreciated by one of skill in the art in possession of the present disclosure, while only a single computing device 202 providing a single host 202a is illustrated and described as being coupled to the TOR leaf switch devices 204a and 204b, a plurality of computing devices each providing a plurality of hosts may (and often will) be coupled to the TOR leaf switch devices 204a and 204b while remaining within the scope of the present disclosure.

In the illustrated embodiment, a spine switch device 206 is coupled to the TOR leaf switch devices 204a and 204b. In an embodiment, the spine switch devices 206 may be provided by the IHS 100 discussed above with reference to FIG. 1, and/or may include some or all of the components of the IHS 100. However, while illustrated and discussed as being provided by spine switch device, one of skill in the art in possession of the present disclosure will recognize the spine switch device 206 may be replaced by other networking devices while remaining within the scope of the present disclosure as well. In the illustrated embodiment, a border leaf switch device 208 is coupled to the spine switch device 206. In an embodiment, the border leaf switch device 208 may be provided by the IHS 100 discussed above with reference to FIG. 1, and/or may include some or all of the components of the IHS 100. However, while illustrated and discussed as being provided by border leaf switch device, one of skill in the art in possession of the present disclosure will recognize the border leaf switch device 208 may be replaced by other networking devices while remaining within the scope of the present disclosure as well. As illustrated, the border leaf switch device 208 may be coupled to a network 210 that may be provided by a Local Area Network (LAN), the Internet, combinations thereof, and/or any other network that would be apparent to one of skill in the art in possession of the present disclosure.

In the illustrated embodiment, the networked system 212 also includes a datacenter 212 including a plurality of devices, only some of which are illustrated and described below. For example, the datacenter 212 may include a computing device 214. In an embodiment, the computing device 214 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that computing devices provided in the networked system 200 may include any devices that may be configured to operate similarly as the computing device 214 discussed below.

In the illustrated embodiment, the computing device 214 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a plurality of hosts such as the host 214a illustrated in FIG. 2 that, as discussed below, that is configured to perform the functionality of the hosts and/or computing devices discussed below. To provide a specific example, the host 214a may be provided by a virtual machine or other virtual computing resource known in the art and, as described herein, may be one of many hosts that are provided by the computing device 214.

In an embodiment, the computing device 214 is coupled to at least one leaf switch device that, in the illustrated embodiment, is provided by a pair of TOR leaf switch devices 216a and 216b. In an embodiment, the either or both of the TOR leaf switch devices 216a and 216b may be provided by the IHS 100 discussed above with reference to FIG. 1, and/or may include some or all of the components of the IHS 100. However, while illustrated and discussed as being provided by TOR leaf switch device, one of skill in the art in possession of the present disclosure will recognize that leaf switch devices provided in the networked system 200 may include any leaf switch devices that may be configured to operate similarly as the TOR leaf switch devices 216a and/or 216b discussed below. As will be appreciated by one of skill in the art in possession of the present disclosure, while only a single computing device 214 providing a single host 214a is illustrated and described as being coupled to the TOR leaf switch devices 216a and 216b, a plurality of computing devices each providing a plurality of hosts may (and often will) be coupled to the TOR leaf switch devices 216a and 216b while remaining within the scope of the present disclosure.

In the specific examples provided below, the TOR leaf switch devices 216a and 216b are aggregated to operate as a single logical TOR leaf switch device (e.g., via aggregation protocols such as the VLT protocol and/or other aggregation protocols that would be apparent to one of skill in the art in possession of the present disclosure), with the TOR leaf switch device 216a operating as a "primary" aggregated switch device, and the TOR leaf switch device 216b operating as a "secondary" aggregated switch device. However, one of skill in the art in possession of the present disclosure will appreciate how the TOR leaf switch devices 216a and 216b may be replaced by a single leaf switch device and/or configured to provide the functionality described below in other manners that will fall within the scope of the present disclosure as well.

In the illustrated embodiment, a spine switch device 218 is coupled to the TOR leaf switch devices 216a and 216b. In an embodiment, the spine switch devices 218 may be provided by the IHS 100 discussed above with reference to FIG. 1, and/or may include some or all of the components of the IHS 100. However, while illustrated and discussed as being provided by spine switch device, one of skill in the art in possession of the present disclosure will recognize the spine switch device 218 may be replaced by other networking devices while remaining within the scope of the present disclosure as well. In the illustrated embodiment, a border leaf switch device 220 is coupled to the spine switch device 218. In an embodiment, the border leaf switch device 220 may be provided by the IHS 100 discussed above with reference to FIG. 1, and/or may include some or all of the components of the IHS 100. However, while illustrated and discussed as being provided by border leaf switch device, one of skill in the art in possession of the present disclosure will recognize the border leaf switch device 220 may be replaced by other networking devices while remaining within the scope of the present disclosure as well.

As illustrated, the border leaf switch device 220 may be coupled to the network 210 in order to couple the datacenter 212 to the datacenter 200. Furthermore, while not illustrated, one of skill in the art in possession of the present disclosure will appreciate how the datacenter 200 may be coupled via the network 210 to a plurality of other datacenters that are similar to the datacenter 212. However, while a specific networked system 200 has been illustrated and described, one of skill in the art in possession of the present disclosure will recognize that the L2 domain hierarchical address communication system of the present disclosure may include a variety of components and component configurations while remaining within the scope of the present disclosure as well.

Figure 3:
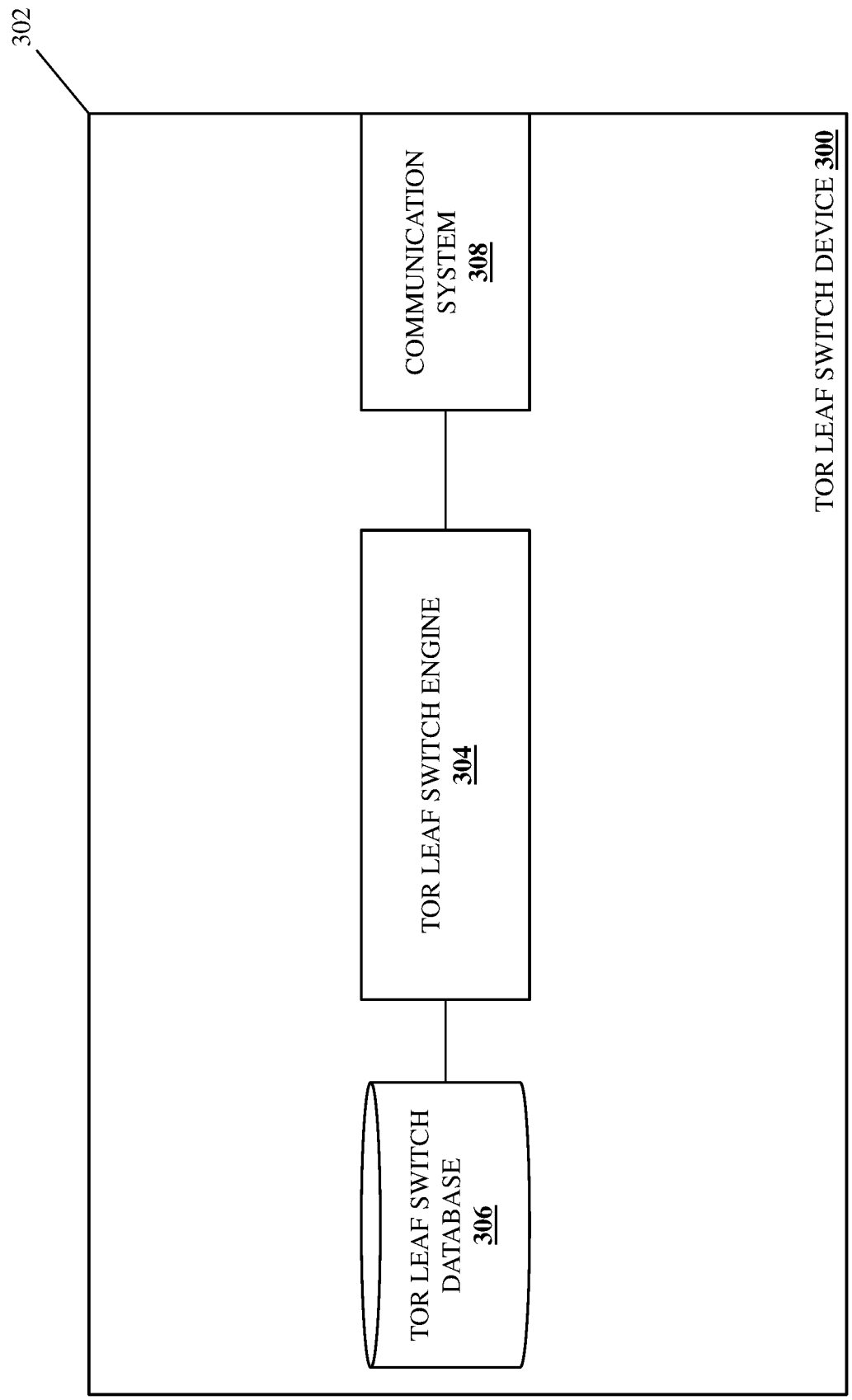
FIG. 3 is a schematic view illustrating an embodiment of a TOR leaf switch device that may be included in the networked system of FIG. 2.

Referring now to FIG. 3, an embodiment of a TOR leaf switch device 300 is illustrated that may provide the any or all of the TOR leaf switch devices 204a, 204b, 216a, and/or 216b discussed above with reference to FIG. 2. As such, the TOR leaf switch device 300 may be provided by the IHS 100 discussed above with reference to FIG. 1 and/or may include some or all of the components of the IHS 100. However, while illustrated and described as being provided by TOR leaf switch device, one of skill in the art in possession of the present disclosure will recognize that leaf switch devices provided in the networked system 200 may include any leaf switch devices that may be configured to operate similarly as the TOR leaf switch device 300 discussed below. In the illustrated embodiment, the TOR leaf switch device 300 includes a chassis 302 that houses the components of the TOR leaf switch device 300, only some of which are illustrated and described below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a TOR leaf switch engine 304 that is configured to perform the functionality of the TOR leaf switch engines and/or TOR leaf switch devices discussed below.

The chassis 302 may also house a storage system (not illustrated, but which may include the storage 108 discussed above with reference to FIG. 1) that is coupled to the TOR leaf switch engine 304 (e.g., via a coupling between the storage system and the processing system) and that includes a TOR leaf switch database 306 that is configured to store any of the information utilized by the TOR leaf switch engine 304 discussed below. The chassis 302 may also house a communication system 308 that is coupled to the TOR leaf switch engine 304 (e.g., via a coupling between the communication system 308 and the processing system) and that may be provided by any of a variety of switch/networking communication components that would be apparent to one of skill in the art in possession of the present disclosure. However, while a specific TOR leaf switch device 300 has been illustrated and described, one of skill in the art in possession of the present disclosure will recognize that TOR leaf switch devices (or other devices operating according to the teachings of the present disclosure in a manner similar to that described below for the TOR leaf switch device 300) may include a variety of components and/or component configurations for providing conventional TOR leaf switch device functionality, as well as the functionality discussed below, while remaining within the scope of the present disclosure as well.

Figure 4A:
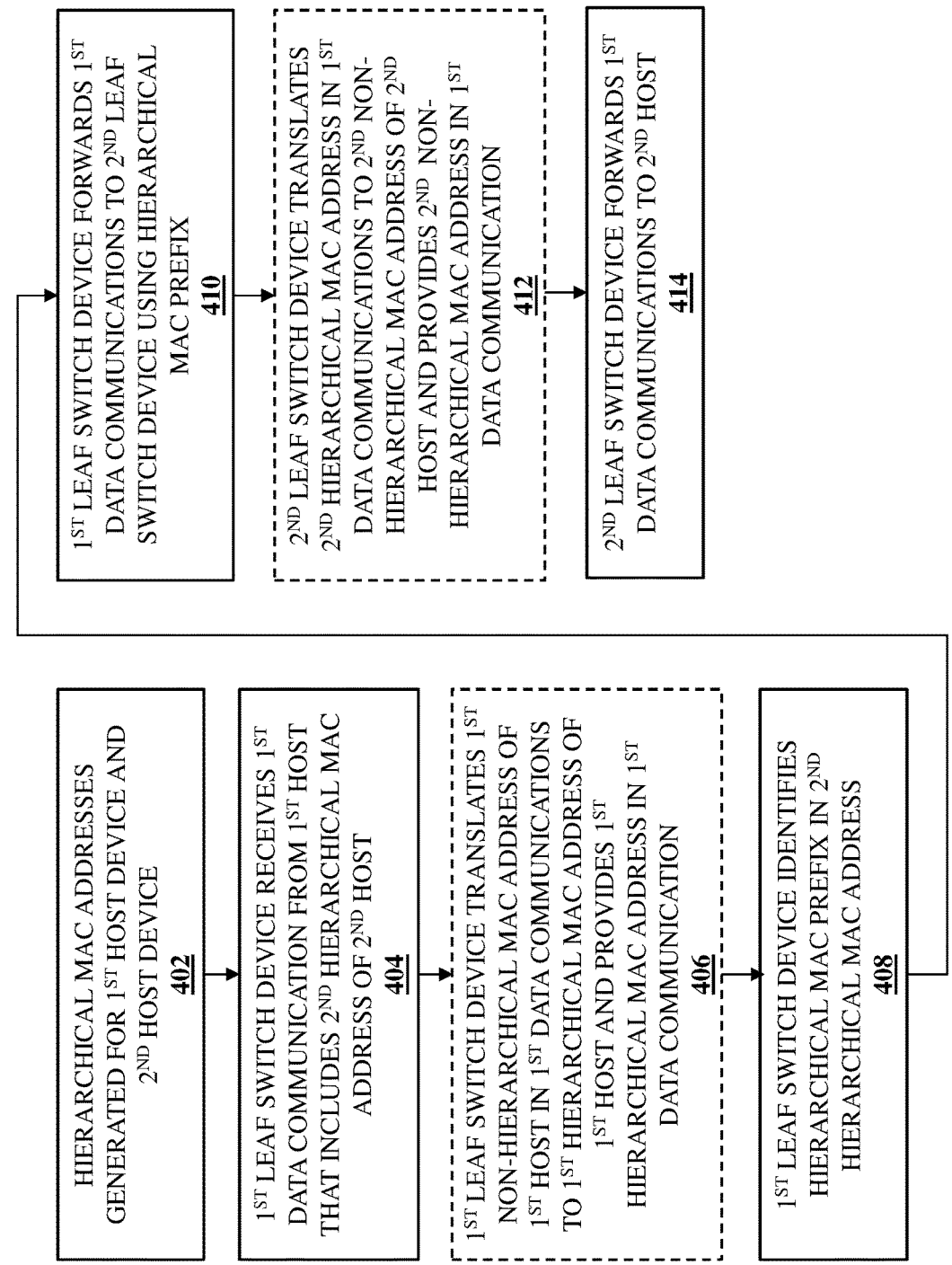
FIG. 4A is a flow chart illustrating an embodiment of a method for providing L2 domain hierarchical address communications.

Referring now to FIG. 4, an embodiment of a method 400 for providing Layer 2 (L2) domain hierarchical address communications is illustrated. As discussed below, the systems and methods of the present disclosure provide for the use of hierarchical MAC addresses by leaf switch devices in the forwarding of L2 domain communications between their connected hosts. For example, the L2 domain hierarchical address communication system of the present disclosure may include a first computing device that provides a first host, and a second computing device that provides a second host. A first leaf switch device is connected to the first computing device, and a second leaf switch device that is connected to the second computing device and coupled to the first leaf switch device. The first leaf switch device receives a first data communication from the first host that includes a second hierarchical MAC address of the second host. The first leaf switch device identifies a hierarchical MAC prefix in the second hierarchical MAC address, and uses the hierarchical MAC prefix to forward the first data communication to the second leaf switch device. As such, leaf switch devices need only store the hierarchical MAC prefixes associated with "remote" hosts, thus reducing the size of their forwarding tables.

The method 400 begins at block 402 where hierarchical MAC addresses are generated for a first host and a second host. In an embodiment, at block 402, hierarchical MAC addresses may be generated for the host 202a provided by the computing device 202, the host device 214a provided by the computing device 214, as well as any other hosts included in the L2 domain provided by the networked system 200 (e.g., other hosts provided by the computing devices 202 and/or 214, other hosts provided by other (non-illustrated) computing devices, etc.). As will be appreciated by one of skill in the art in possession of the present disclosure, each of the hosts 202a and 214a may be associated with respective non-hierarchical MAC addresses that are conventionally provided for virtual machines and/or other virtual computing resources.

Figure 5:
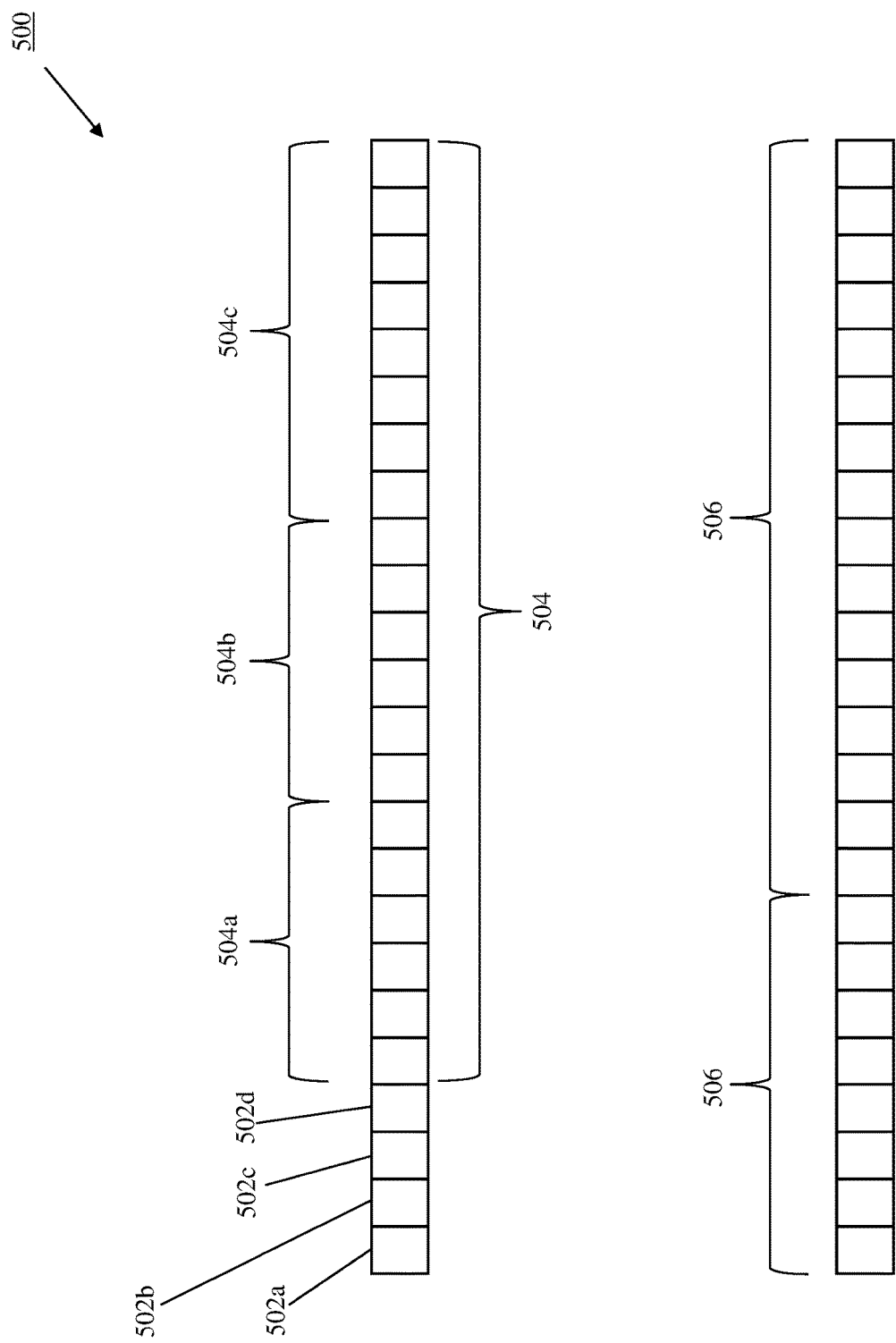
FIG. 5 is a schematic view illustrating an embodiment of a hierarchical address that may be generated and/or utilized during the method block of FIGS. 4B and 4C.

For example, a non-hierarchical MAC address assigned to a virtual machine typically includes a prefix that is utilized to ensure that the host portion of that non-hierarchical MAC address is unique within its orchestration domain. To provide a specific example, the hierarchical MAC addresses of the present disclosure may function similarly to a "burned-in" MAC address in physical Network Interface Controllers (NICs) present in host systems such as service devices. However, in addition to those hierarchical MAC addresses being unique within an administrative domain, those hierarchical MAC addresses are configured with identifying information that is based on the physical location of the virtual machine or other host to which they are assigned. As discussed below, in order to accomplish this, the hierarchical MAC address may be split into a number of fields, with each field indicating a particular level within the hierarchy. In the specific example provided below, the lowest level of the hierarchy identifies a rack, with the next level of hierarchy identifying a pod, and the next level of hierarchy identifying a site. As such, embodiments of the hierarchical MAC addresses that use global addresses, when assigned to hosts provided by computing devices within the same rack, will share the same Organizationally Unique Identifier (OUI), as well as identical values in the site, pod, and rack fields. However, embodiments of the hierarchical MAC addresses that use local addressing (e.g., as per the IEEE 802c-2017 specification) will not use an OUI, and instead the fields used for site, pod, and rack can be expanded to allow for a higher number of hierarchical MAC addresses and corresponding host scale. With reference to FIG. 5, an example of a hierarchical MAC address 500 is illustrated that includes 48 bits (e.g., the two rows of 24 "boxes" in FIG. 5, with each "box" representing 1 bit).

In the examples provided herein, the hierarchical MAC address 500 is provided using "local" addresses, which one of skill in the art in possession of the present disclosure will appreciate provides a relatively larger address space, but requires either that local addresses not be used elsewhere in the L2 domain, or local address generation monitoring to ensure that no two entities utilize the same local address. However, while the use of local addresses is illustrated and described, one of skill in the art in possession of the present disclosure will appreciate how "global" addresses may eliminate the issues with local addresses discussed above (but while providing a relatively smaller address space), and thus may be utilized in embodiments in which the address space requirements allow it.

In a specific example, the hierarchical MAC address 500 may be provided as an Administratively Assigned Identifier (AAI) defined in Institute of Electrical and Electronics Engineers (IEEE) 802c-2017 standards (e.g., as per the AAI Structured Local Address Plan (SLAP) quadrant/SLAP format). As such, the first four bits 502a, 502b, 502c, and 502d of the hierarchical MAC address 500 may be used to identify that the hierarchical MAC address 500 is an AAI, as well as the type of addresses it uses and the type of data it is used to transmit. For example, the bit 502a (e.g., the "M-bit" in the SLAP format) may be provided with a "0" to indicate the transmission of unicast data communications, or a "1" to indicate the transmission of group/multicast data communications; the bit 502b (e.g., the "X-bit" in the SLAP format) may be provided with a "0" to indicate the use of global/universal addresses, and "1" to indicate the use of local addresses; and the bit 502c (e.g., the "SLAP Y-bit" in the SLAP format) and the bit 502d (e.g., the "SLAP Z-bit" in the SLAP format) may be provided with "0", "0", respectively, to indicate that the hierarchical MAC address 500 is an AAI. Thus, in the examples below, the first four bits 502a, 502b, 502c, and 502d may be "0100" to indicate the transmission of unicast data communications using local addresses in an AAI providing the hierarchical MAC address 500. However, while a specific type of hierarchical MAC address has been illustrated described, one of skill in the art in possession of the present disclosure will appreciate how the hierarchical MAC address of the present disclosure may be provided in other manners that would be apparent to one of skill in the art in possession of the present disclosure.

In the examples provided below, the hierarchical MAC address 500 includes a hierarchical MAC prefix 504 including a "site" field 504a that is configured to store a site identifier, a "pod" field 504b that is configured to store a pod identifier, and a "rack" field 504c that is configured to store a rack identifier, and one of skill in the art in possession of the present disclosure will appreciate how the categories "site", "pod", and "rack" may be used to identify subcategories of the L2 domain in which the hierarchical MAC address 500 may be used. For example, the "site" category may be utilized to identify different datacenters (e.g., the datacenters 202 and 212 discussed above with reference to FIG. 2), the "pod" category may be utilized to identify groups of racks/TOR leaf switch devices in a datacenter, and the "rack" category may be utilized to identify individual racks/TOR leaf switch devices in a pod/rack group/TOR leaf switch device group. However, while particular categories are described herein, one of skill in the art in possession of the present disclosure will appreciate how an L2 domain may be defined using a variety of identifiers/categories while remaining within the scope of the present disclosure. The hierarchical MAC address 500 also includes a "host" field 506 that is configured to store a host identifier that may be utilized to identify different hosts (e.g., the hosts 202a and 214a discussed above with reference to FIG. 2, and/or other hosts/VMs accessible via a TOR leaf switch device), as well as a reserved section 506 that may be reserved for future uses (e.g., as a new category in the hierarchical MAC prefix 504, to increase the size of the fields 504a, 504b, and/or 504c in the hierarchical MAC prefix 504, to increase the size of the host field 506, and/or for other reserved usages that would be apparent to one of skill in the art in possession of the present disclosure).

In the specific example provided in FIG. 5, the hierarchical MAC prefix 504 includes 20 bits, with 6 bits dedicated to the site field 504a, 6 bits dedicated to the pod field 504b, and 8 bits dedicated to the rack field 504c. Furthermore, the hierarchical MAC address 500 includes 16 bits dedicated to the host field 506. As such, one of skill in the art in possession of the present disclosure will appreciate how the hierarchical MAC address 500 illustrated in FIG. 5 may be capable of identifying ($2^6=$) 64 sites (e.g., datacenters), ($2^6=$) 64 pods (e.g., groups of racks/TOR leaf switch devices in any particular datacenter), ($2^8=$) 256 racks/TOR leaf switch devices in any particular pod/rack group/TOR leaf switch device group, and ($2^{16}=$) 65,536 hosts (e.g., MAC addresses of VMs accessible via any particular TOR leaf switch device). However, while specific numbers of bits assigned to each of the site field 504a, the pod field 504b, the rack field 504c, and the host field 506 have been illustrated and described, one of skill in the art in possession of the present disclosure will appreciate how different numbers of bits may be assigned to the fields 504a, 504b, 504c, and/or 506 depending on the implementation, use case, and/or details of the L2 domain.

As will be appreciated by one of skill in the art in possession of the present disclosure, when the local addresses discussed above are replaced with global addresses, an Organizationally Unique Identifier (OUI) may occupy the first 24 bits of the global address, and the remaining 24 bits may be utilized as the rack identifier and the host identifier discussed above. To provide a specific example, the prefix of the global address may include the 24-bit OUI and an 8-bit rack identifier, followed by a 16-bit host identifier, thus providing the capability to identity ($2^8=$) 256 racks/TOR leaf switch devices, and ($2^{16}=$) 65,536 hosts (e.g., MAC addresses of VMs accessible via any particular TOR leaf switch device). However, one of skill in the art in possession of the present disclosure will appreciate how different numbers of bits may be assigned to the identifiers used with global addresses depending on the implementation, use case, and/or details of the L2 domain.

In some embodiments, the generation of the hierarchical MAC addresses for the hosts 202a and 214a may be performed using an orchestrator tool in a management system (not illustrated) that is coupled to the network 210, and/or management systems that are configured to utilize a MAC address assignment protocol such as, for example, the new IEEE 802.1CQ standard. As such, a hierarchical MAC address provided according the format of the hierarchical MAC address 500 discussed above may be generated, assigned to, and/or otherwise provided for the host 202a and may include a bit combination in the "site" field 504a that uniquely identifies the datacenter 200 that includes the computing device 202 that provides the host 202a, a bit combination in the "pod" field 504b that uniquely identifies the group of TOR leaf switch devices in the datacenter 200 that include the TOR leaf switch device (e.g., the aggregated TOR leaf switch device provided by the TOR leaf switch devices 204a and 204b) through which the host 202a is accessible, a bit combination in the "rack" field 504c that uniquely identifies the TOR leaf switch device (e.g., the aggregated TOR leaf switch device provided by the TOR leaf switch devices 204a and 204b) in the group of TOR leaf switch devices in the datacenter 200 through which the host 202a is accessible, and a bit combination in the host field 506 that uniquely identifies the host 202a that is accessible via the TOR leaf switch device (e.g., the aggregated TOR leaf switch device provided by the TOR leaf switch devices 204a and 204b).

Similarly, a hierarchical MAC address provided according the format of the hierarchical MAC address 500 discussed above may be generated, assigned to, and/or otherwise provided for the host 214a and may include a bit combination in the "site" field 504a that uniquely identifies the datacenter 212 that includes the computing device 214 that provides the host 214a, a bit combination in the "pod" field 504b that uniquely identifies the group of TOR leaf switch devices in the datacenter 212 that include the TOR leaf switch device (e.g., the aggregated TOR leaf switch device provided by the TOR leaf switch devices 216a and 216b) through which the host 214a is accessible, a bit combination in the "rack" field 504c that uniquely identifies the TOR leaf switch device (e.g., the aggregated TOR leaf switch device provided by the TOR leaf switch devices 216b and 216b) in the group of TOR leaf switch devices in the datacenter 212 through which the host 214a is accessible, and a bit combination in the host field 506 that uniquely identifies the host 214a that is accessible via the TOR leaf switch device (e.g., the aggregated TOR leaf switch device provided by the TOR leaf switch devices 216a and 216b).

As will be appreciated by one of skill in the art in possession of the present disclosure, when the hosts 202a and 214a are assigned the hierarchical MAC addresses as discussed above, the TOR leaf switch devices 204a, 204b, 216a, and 216b may learn those hierarchical MAC addresses using a variety of MAC address learning techniques that would be apparent to one of skill in the art in possession of the present disclosure. However, in learning hierarchical MAC addresses, the TOR leaf switch devices may store the full hierarchical MAC addresses of hosts that are directly accessible via that TOR leaf switch device (e.g., "local" hosts such as hosts provided by computing device that are directly connected to that TOR leaf switch device), while storing only the hierarchical MAC prefix of the hierarchical MAC addresses of hosts that are not directly accessible via that TOR leaf switch device (e.g., "remote" hosts such as hosts provided by computing device that are provided in a different rack than that TOR leaf switch device).

As such, the TOR leaf switch devices 204a and 204b may store the full hierarchical MAC address of the host 202a while storing the hierarchical MAC prefix of the hierarchical MAC address of the host 214a in its TOR leaf switch database 306 (e.g., in a forwarding table), and the TOR leaf switch devices 216a and 216b may store the full hierarchical MAC address of the host 214a while storing the hierarchical MAC prefix of the hierarchical MAC address of the host 202a in its TOR leaf switch database 306 (e.g., in a forwarding table). Thus, continuing with the example provided above in which the host field 506 in the hierarchical MAC address 500 is 16 bits, the forwarding table for the TOR leaf switch devices 204a and 204b may require up to ($2^{16}=$) 65,536 fewer entries for the TOR leaf switch device 216a due to the need to only store a single entry with the hierarchical MAC prefix that identifies the TOR leaf switch device 216a (and not a respective entry that identifies each host accessible via the TOR leaf switch device 216a), and the forwarding table for the TOR leaf switch devices 216a and 216b may require up to ($2^{16}=$) 65,536 fewer entries for the TOR leaf switch device 204a due to the need to only store a single entry with the hierarchical MAC prefix that identifies the TOR leaf switch device 204a (and not a respective entry that identifies each host accessible via the TOR leaf switch device 204a).

Furthermore, as discussed below, some embodiments of the present disclosure may include the hosts 202a and 214 utilizing non-hierarchical MAC addresses (e.g., "original" or "conventional" MAC addresses generated, assigned, and/ or other provided to those hosts upon their creation), with the TOR leaf switch devices 204a, 204b, 216, and/or 216b operating to perform translations between such non-hierarchical MAC addresses and the hierarchical MAC addresses of the present disclosure. As such, the generation of the hierarchical MAC addresses for the hosts 202a and 214a may be performed during a discovery process between the hosts 202a and 214a, which is described below as occurring during sub-blocks of block 402 of the method 400. However, while two specific examples of the generation of hierarchical MAC addresses are described, one of skill in the art in possession of the present disclosure will appreciate that the hierarchical MAC addresses of the present disclosure may be generated for hosts using other techniques that will fall within the scope of the present disclosure as well.

Figure 4B:
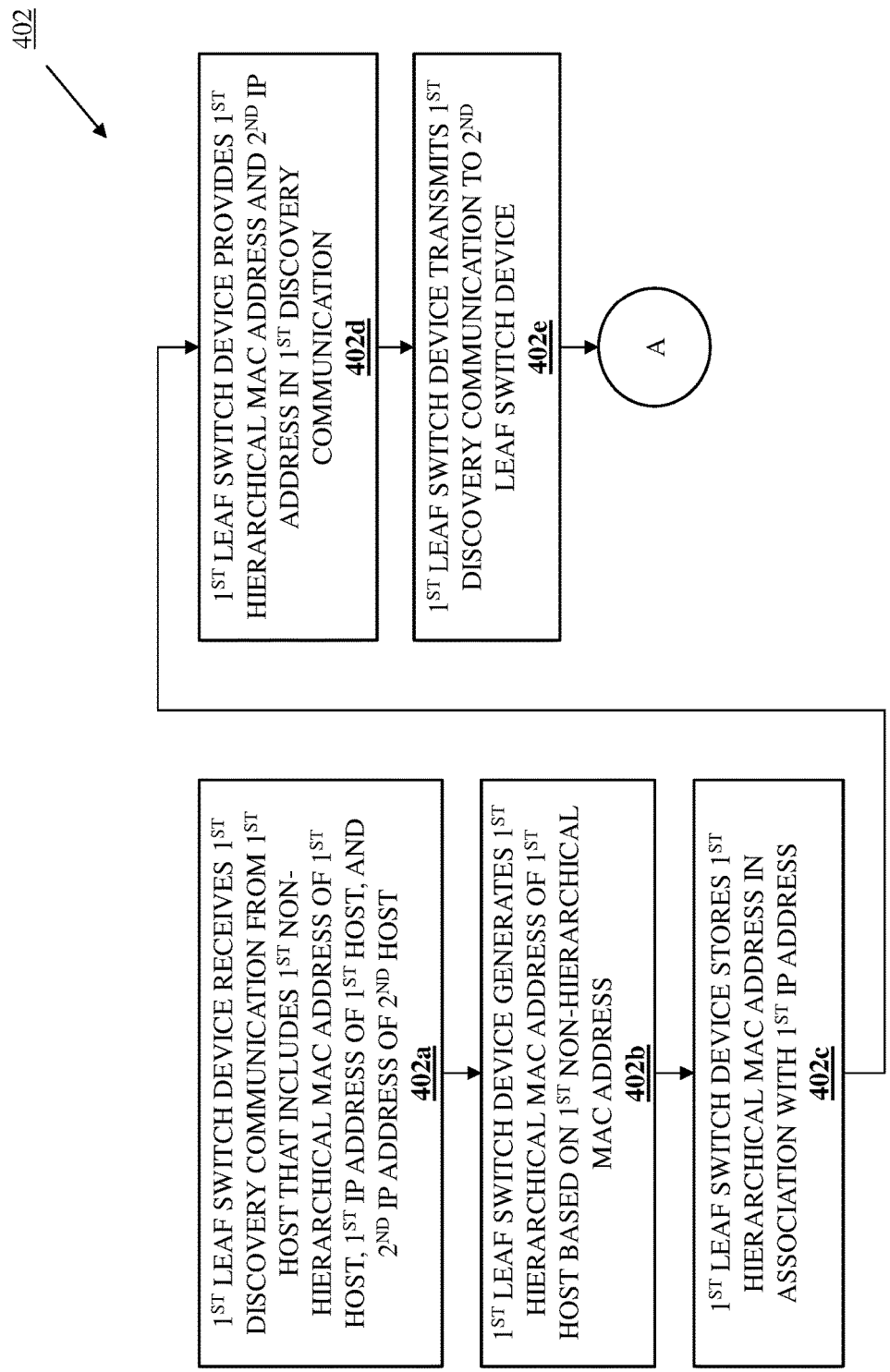
FIG. 4B is a flow chart illustrating an embodiment of a first set of sub-blocks of a method block included in the method of FIG. 4A.
Figure 4C:
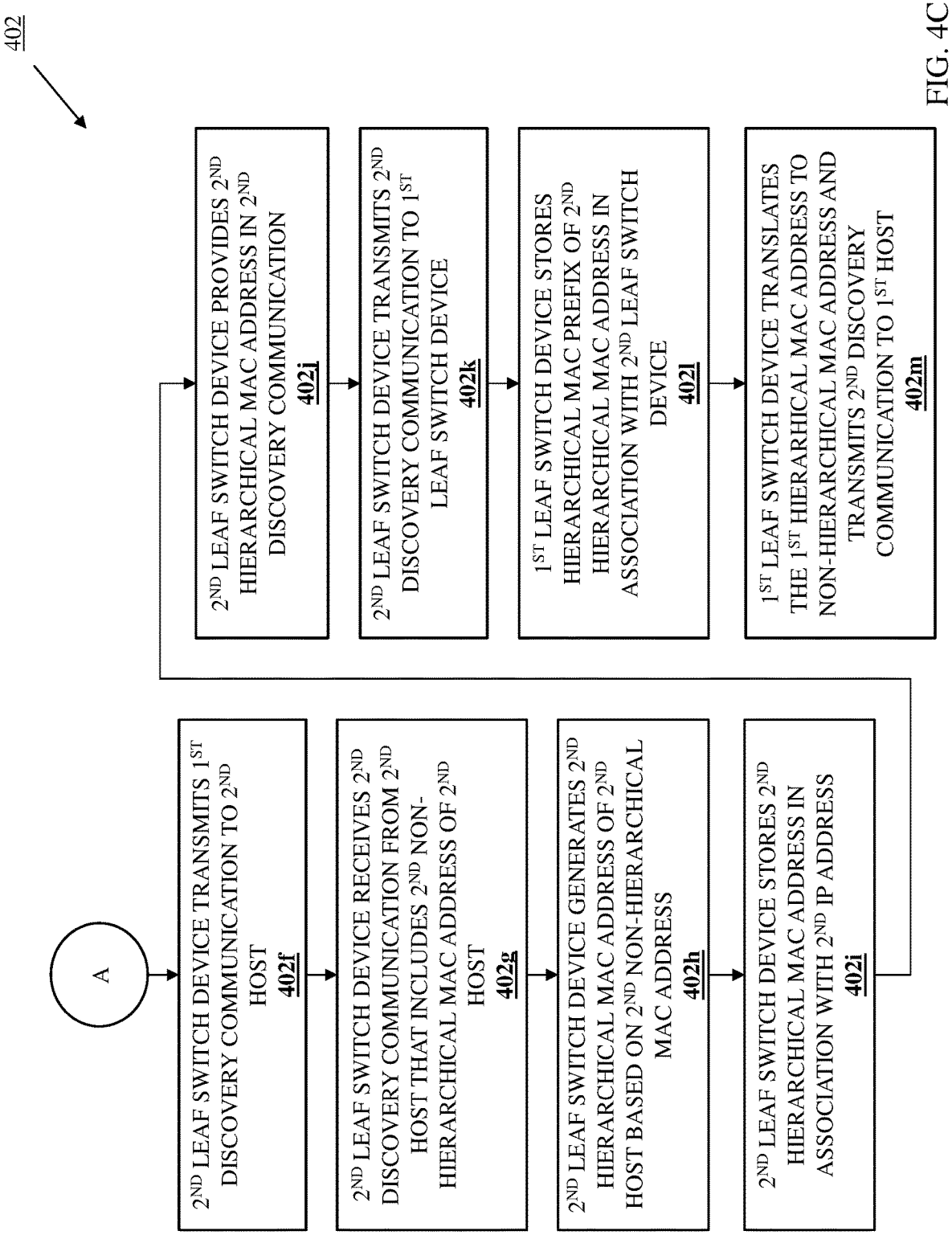
FIG. 4C is a flow chart illustrating an embodiment of a second set of sub-blocks of the method block included in the method of FIG. 4A.
Figure 6A:
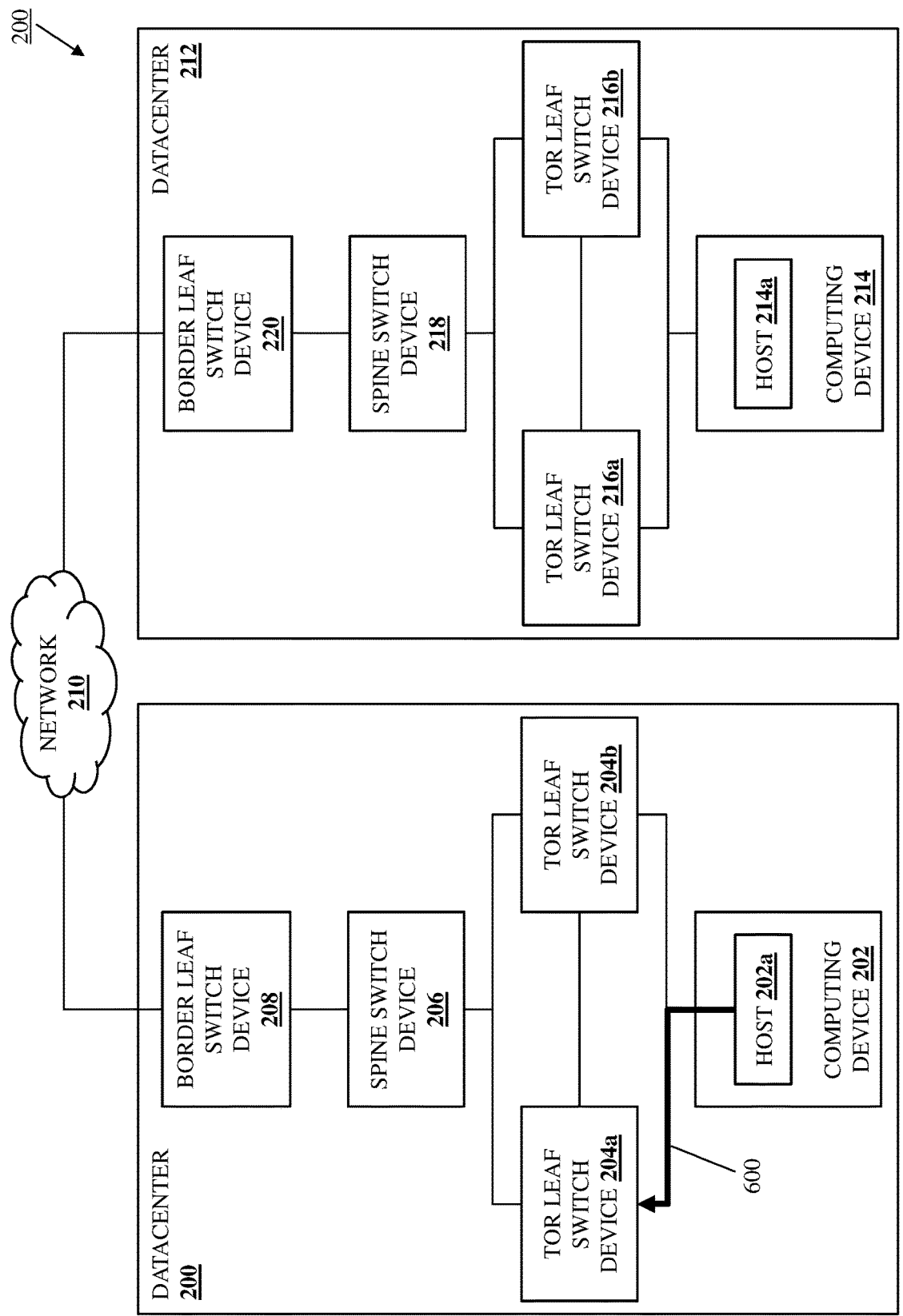
FIG. 6A is a schematic view illustrating an embodiment of the networked system of FIG. 2 operating during the method block of FIGS. 4B and 4C.

With reference to FIGS. 4B and 4C, embodiments of block 402 of the method 400 may begin at sub-block 402a where a first leaf switch device receives a first discovery communication from a first host that includes a first non-hierarchical MAC address of the first host, a first IP address of the first host, and a second IP address of the second host. With reference to FIG. 6A, in an embodiment of sub-block 402a, the host 202a in the computing device 202 may perform discovery communication transmission operations 600 that may include generating a discovery communication that includes a non-hierarchical MAC address of the host 202a, an IP address of the host 202a, an IP address of the host 214a in the computing device 214. As will be appreciated by one of skill in the art in possession of the present disclosure, the discovery communication may include the non-hierarchical MAC address of the host 202a as a "source MAC address" in a header of a data packet that provides the discovery communications, and may also include the non-hierarchical MAC address of the host 202a as a "source hardware address" in a "payload" of the data packet that provides the discovery communication.

Figure 6B:
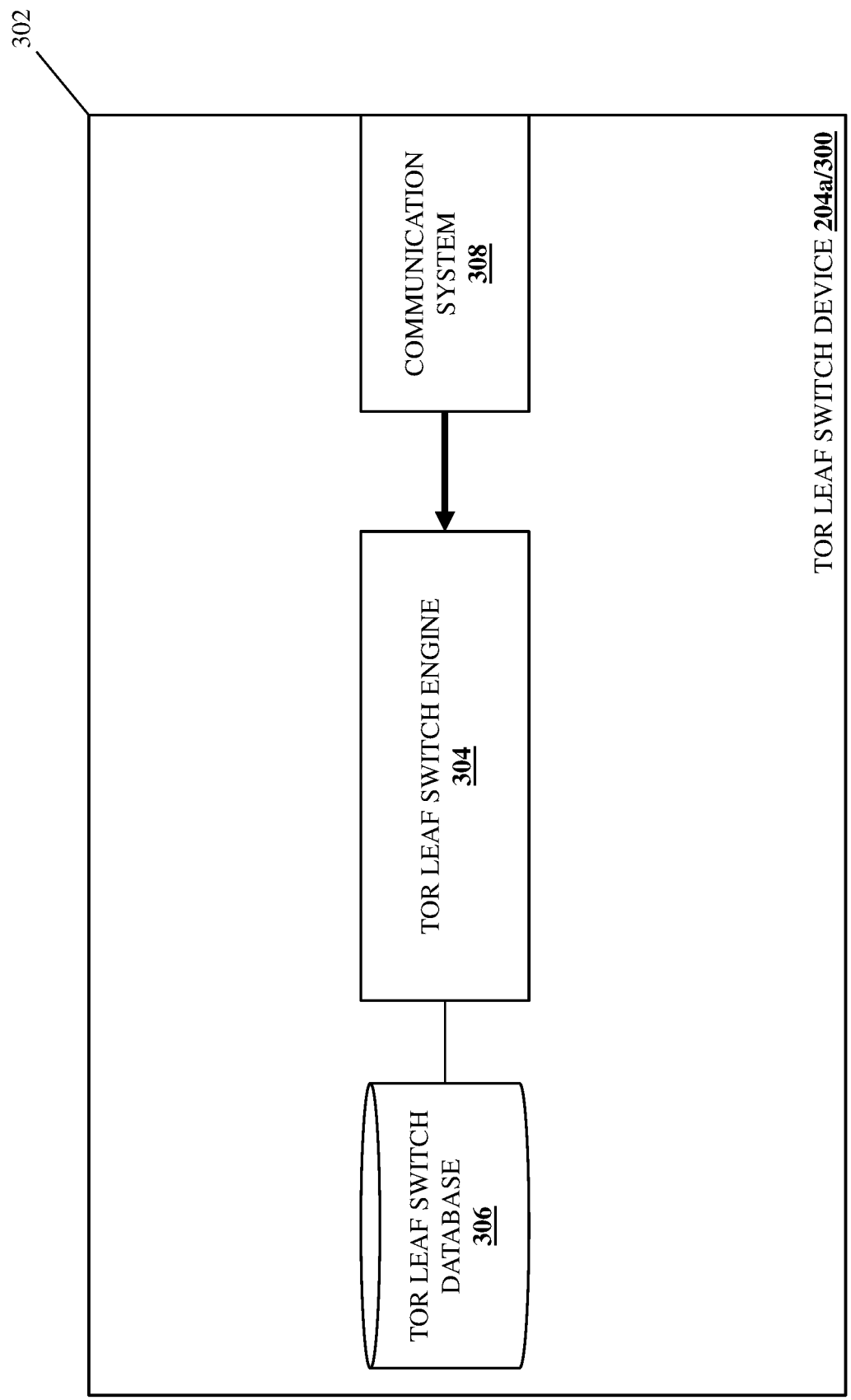
FIG. 6B is a schematic view illustrating an embodiment of the TOR leaf switch device of FIG. 3 operating during the method block of FIGS. 4B and 4C.

As will be appreciated by one of skill in the art in possession of the present disclosure, the discovery communication generated by the host 202a at sub-block 402a may be provided by an Address Resolution Protocol (ARP) discovery communication (e.g., an ARP request), a Neighbor Discovery (ND) discovery communication (e.g., a neighbor solicitation), and/or other discovery communications that would be apparent to one of skill in the art in possession of the present disclosure, and may be transmitted by the host 202a after identifying the IP address of the host 214a and in order to discover a MAC address for the host 214a. Furthermore, one of skill in the art in possession of the present disclosure will appreciate how the discovery communication may include a section for providing the MAC address for the host 214a, but that section may be zeroed out or otherwise left "blank". As such, with reference to FIG. 6B, the discovery communication transmission operations 600 may include the TOR leaf switch engine 304 in the TOR leaf switch device 204a/300 receiving the discovery communication via its communication system 308 at sub-block 402a.

Block 402 of the method 400 then proceeds to sub-block 402b where the first leaf switch device generates a first hierarchical MAC address of the first host based on the first non-hierarchical MAC address. In an embodiment, at sub-block 402b, the TOR leaf switch engine 304 in the TOR leaf switch device 204a/300 may identify the non-hierarchical MAC address of the host 202a that was provided in the discovery communication, and determine that that non-hierarchical MAC address is unknown (i.e., the TOR leaf switch engine 304 in the TOR leaf switch device 204a/300 has not previously learned that non-hierarchical MAC address). In response to receiving the unknown non-hierarchical MAC address of the host 202a, the TOR leaf switch engine 304 in the TOR leaf switch device 204a/300 may use the non-hierarchical MAC address of the host 202a to generate a hierarchical MAC address for the host 202a. For example, at sub-block 402b, the TOR leaf switch engine 304 in the TOR leaf switch device 204a/300 may perform non-hierarchical MAC address generation operations that may include executing a hashing operation on the non-hierarchical MAC address of the host 202a in order to generate the host identifier for the hierarchical MAC address for the host 202a that is similar in format to the hierarchical MAC address 500 described above with reference to FIG. 5 and that is within the hierarchical MAC address space utilized in the L2 domain provided by the networked system 200.

As such, one of skill in the art in possession of the present disclosure will appreciate how the hashing operation discussed above may be configured, when executed on the non-hierarchical MAC address of the host 202a, to generate a bit combination for the host field 506 that uniquely identifies the host 202a that is accessible via the TOR leaf switch device (e.g., the aggregated TOR leaf switch device provided by the TOR leaf switch devices 204a and 204b), with that bit combination utilized with the site identifier, pod identifier, and rack identifier that identifies the location of that TOR leaf switch device through which the host 202a is accessible in order to provide the hierarchical MAC address for the host 202a. However, while a specific example of the use of a non-hierarchical MAC address of the host 202a to generate a hierarchical MAC address of the host 202a has been described, one of skill in the art in possession of the present disclosure will appreciate how other techniques for generating the hierarchical MAC address of the host 202a based on the non-hierarchical MAC address of the host 202a will fall within the scope of the present disclosure as well.

Figure 7:
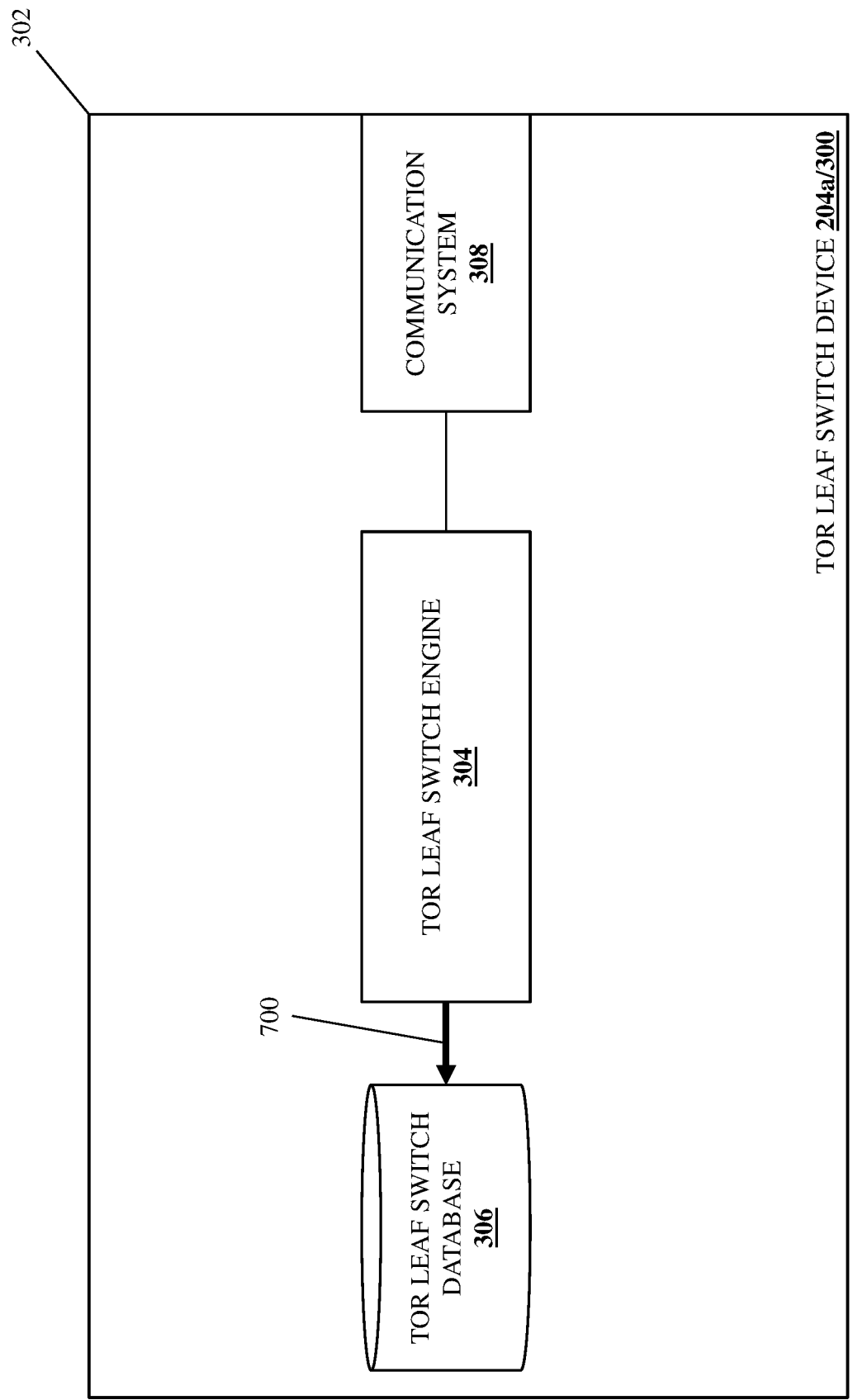
FIG. 7 is a schematic view illustrating an embodiment of the TOR leaf switch device of FIG. 3 operating during the method block of FIGS. 4B and 4C.

Block 402 of the method 400 then proceeds to sub-block 402c where the first leaf switch device stores the first hierarchical MAC address in association with the first IP address. With reference to FIG. 7, in an embodiment of sub-block 402c, the TOR leaf switch engine 304 in the TOR leaf switch device 204a/300 may perform hierarchical MAC address storage operations 700 that includes storing the hierarchical MAC address of the host 202a that was generated at sub-block 402c in the TOR leaf switch database 306. For example, the TOR leaf switch database 306 may include a translation table, and at sub-block 402c the TOR leaf switch engine 304 in the TOR leaf switch device 204a/300 may associate the hierarchical MAC address of the host 202a with the IP address of the host 202a (i.e., which was received in the discovery communication at sub-block 402a). As will be appreciated by one of skill in the art in possession of the present disclosure, the association of the hierarchical MAC address of the host 202a with the IP address of the host 202a in the translation table operates to generate, assign, and/or otherwise provide the hierarchical MAC address for the host 202a.

Figure 8A:
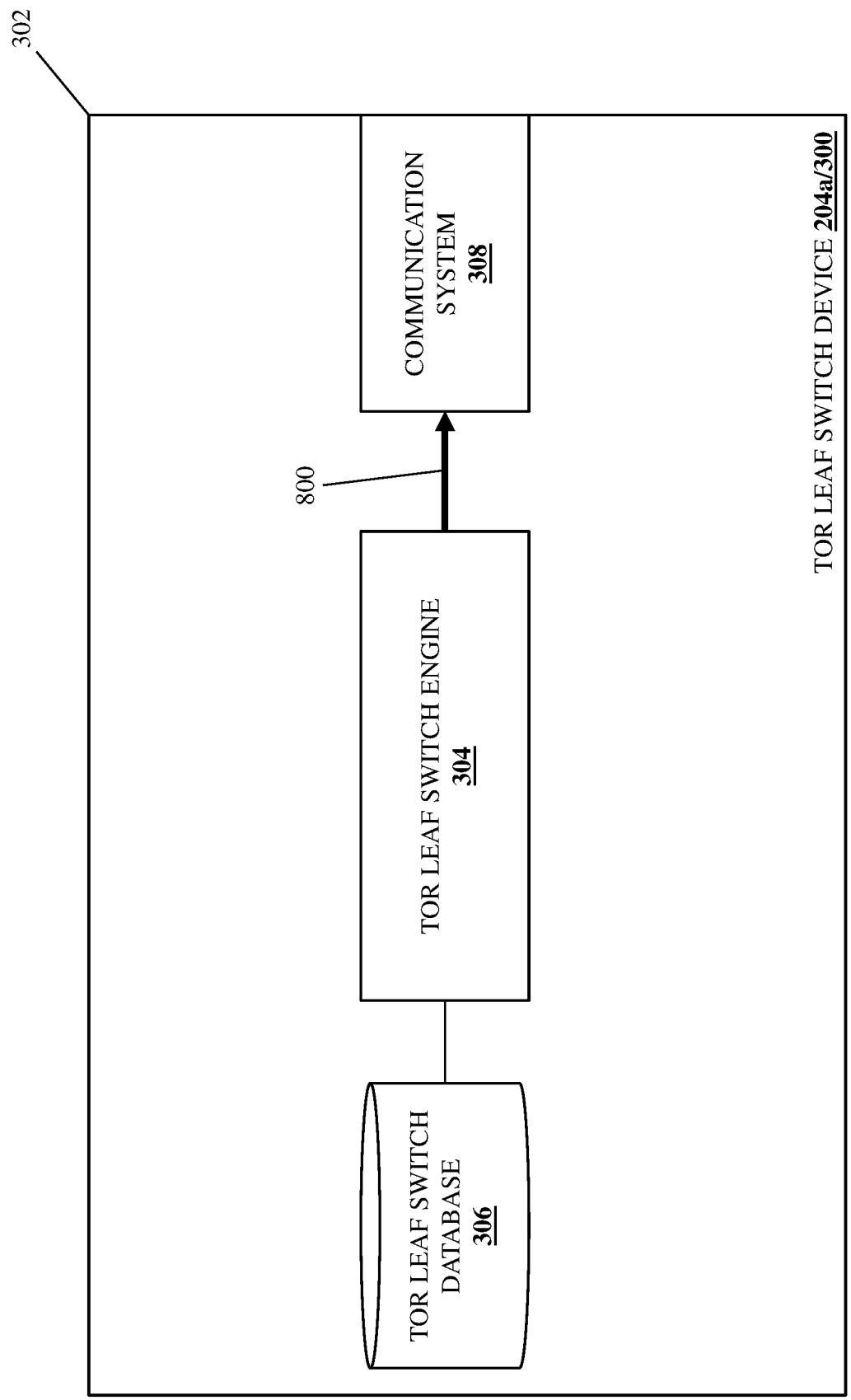
FIG. 8A is a schematic view illustrating an embodiment of the TOR leaf switch device of FIG. 3 operating during the method block of FIGS. 4B and 4C.
Figure 8B:
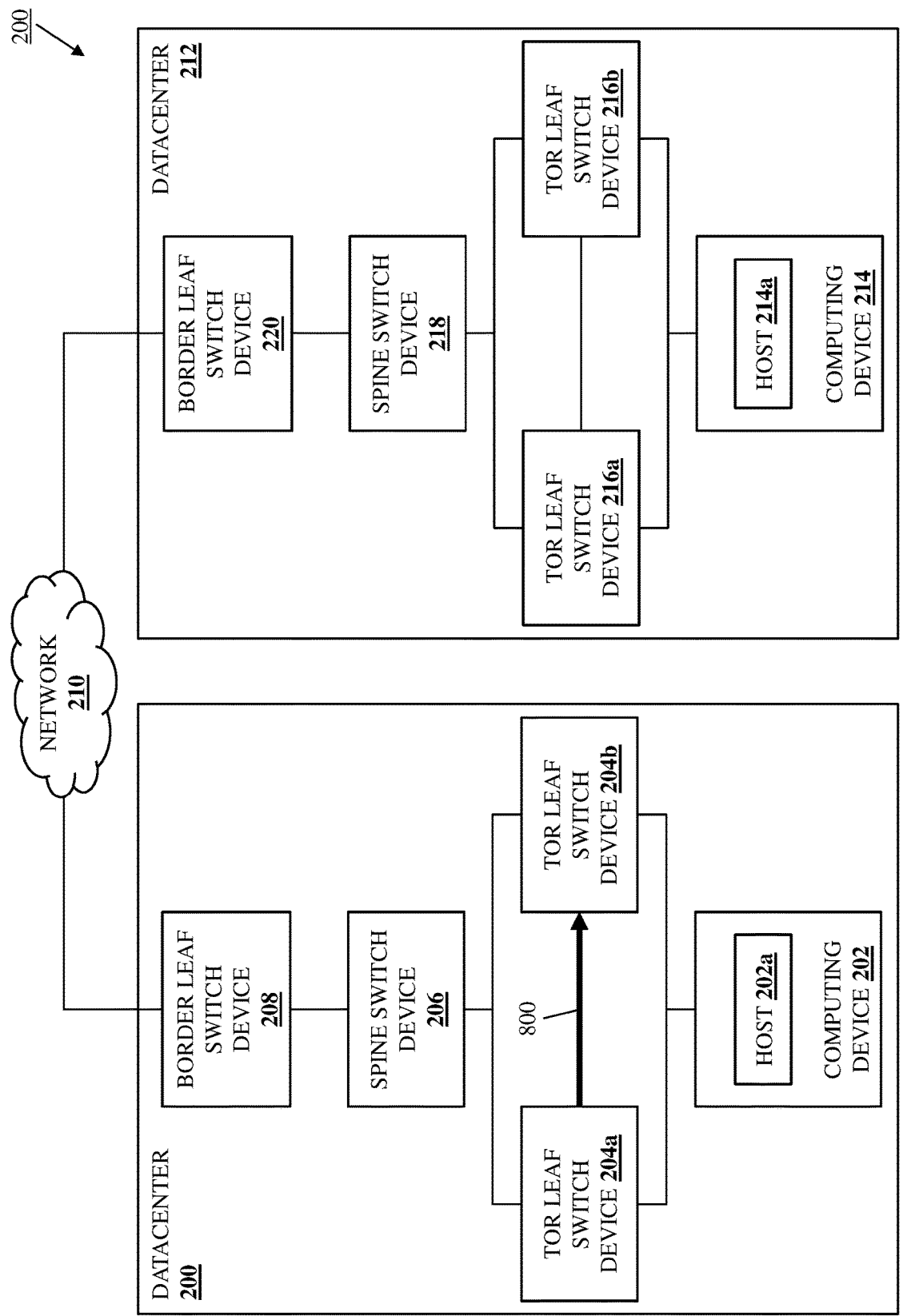
FIG. 8B is a schematic view illustrating an embodiment of the networked system of FIG. 2 operating during the method block of FIGS. 4B and 4C.

With reference to FIGS. 8A and 8B, in embodiments in which the TOR leaf switch devices 204a and 204b provide an aggregated TOR leaf switch device through which the host 202a is accessible and the TOR leaf switch device 204a operates as the "primary" aggregated switch device, the TOR leaf switch engine 304 in the TOR leaf switch device 204a/300 may perform hierarchical MAC address sharing operations 800 that may include transmitting the hierarchical MAC address of the host 202a (as well as any of the information provided in the discovery communication received at sub-block 402a if necessary) via its communication system 308 and to the TOR leaf switch device 204b (which is operating as the "secondary" aggregated switch device in this embodiment). While not illustrated, one of skill in the art in possession of the present disclosure will appreciate how, in response to receiving the hierarchical MAC address of the host 202a, the TOR leaf switch engine 304 in the TOR leaf switch device 204b/300 may store the hierarchical MAC address of the host 202a similarly as described above by the TOR leaf switch engine 304 in the TOR leaf switch device 204a/300 (e.g., in association with an IP address of the host 202a in a translation table in its TOR leaf switch device database 306). As will be appreciated by one of skill in the art in possession of the present disclosure, the hierarchical MAC address sharing operations 800 ensure that hash collisions are dealt with by the TOR leaf switch devices 204a and 204b in a consistent manner.

Block 402 of the method 400 then proceeds to sub-block 402d where the first leaf switch device provides the first hierarchical MAC address and the second IP address in the first discovery communication. As will be appreciated by one of skill in the art in possession of the present disclosure, the discovery communication received at sub-block 402a may be held following its use to generate the hierarchical MAC address of the host 202a until the non-hierarchical MAC address/hierarchical MAC address translations described herein may be performed. However, in some embodiments, the discovery communication received at sub-block 402a may be "dropped", discarded, and/or otherwise deleted following its use to generate the hierarchical MAC address of the host 202a in order to, for example, prevent the TOR leaf switch engine 304 in the TOR leaf switch device 204a/300 from becoming overloaded with accumulated discovery communications (i.e., received from the host 202a and other hosts) via the holding those discovery communications until the non-hierarchical MAC address/hierarchical MAC address translations described herein may be performed.

As will be appreciated by one of skill in the art in possession of the present disclosure, when the discovery communications are dropped as described above, the host 202a will generate and transmit a duplicate discovery communication after some time period that will be received by the TOR leaf switch engine 304 in the TOR leaf switch device 204a/300 in a manner similar to that described above. As such, the "first" discovery communication discussed herein may refer to a discovery communication that has been received from the host 202a and held, or a discovery communication that includes an initial discovery communication that was received from the host 202a and dropped as discussed above, as well as a subsequent duplicate discovery communication that is received from that host 202a following the dropping of the initial discovery communication.

As such, in an embodiment of sub-block 402d, the TOR leaf switch engine 304 in the TOR leaf switch device 204a/300 may provide the hierarchical MAC address of the host 202a and the IP address of the host 214a in the discovery communication that was received and held as discussed above, or in the subsequent duplicate discovery communication that was received following the dropping of the initial discovery communication as discussed above. With reference to FIG. 9A, in an embodiment of sub-block 402d, the TOR leaf switch engine 304 in the TOR leaf switch device 204a/300 may perform non-hierarchical MAC address/hierarchical MAC address translation operations 900 that may include using the translation table in the TOR leaf switch database 306 to translate the non-hierarchical MAC address of the host 202a included in the discovery communication to the hierarchical MAC address of the host 202a.

For example, the non-hierarchical MAC address/hierarchical MAC address translation operations 900 may retrieve the hierarchical MAC address of the host 202a from the TOR leaf switch database 306 using the non-hierarchical MAC address as a "key", and may provide that hierarchical MAC address in place of the non-hierarchical MAC address of the host 202a as the "source MAC address" in a header of a data packet that provides the discovery communication, as well as in place of the non-hierarchical MAC address of the host 202a as the "source hardware address" in a "payload" of the data packet that provides the discovery communication, and one of skill in the art in possession of the present disclosure will recognize how such translations may be performed for any non-hierarchical MAC addresses embedded in the discovery communications based on the control protocol being used. Furthermore, the TOR leaf switch engine 304 in the TOR leaf switch device 204a/300 may provide the IP address of the host 214a as a "target protocol address" in the "payload" of the data packet that provides the discovery communication. However, while examples of specific information that is provided in the discovery communication have been described, one of skill in the art in possession of the present disclosure will appreciate how other information may be provided in the discovery communication while remaining within the scope of the present disclosure as well.

As will be appreciated by one of skill in the art in possession of the present disclosure, in addition to the translation table discussed above, the TOR leaf switch engine 304 in the TOR leaf switch device 204a/300 may maintain a discovery cache (e.g., an ARP cache, an ND cache, etc.) in its TOR leaf switch database 306 that associates the IP address of the host 202a with the hierarchical MAC address of the host 202a, and may use that information to respond to discovery communications (e.g., ARP requests, ND neighbor solicitations, etc.) for the IP address of the host 202a from other hosts (e.g., the host 214a).

Figure 9B:
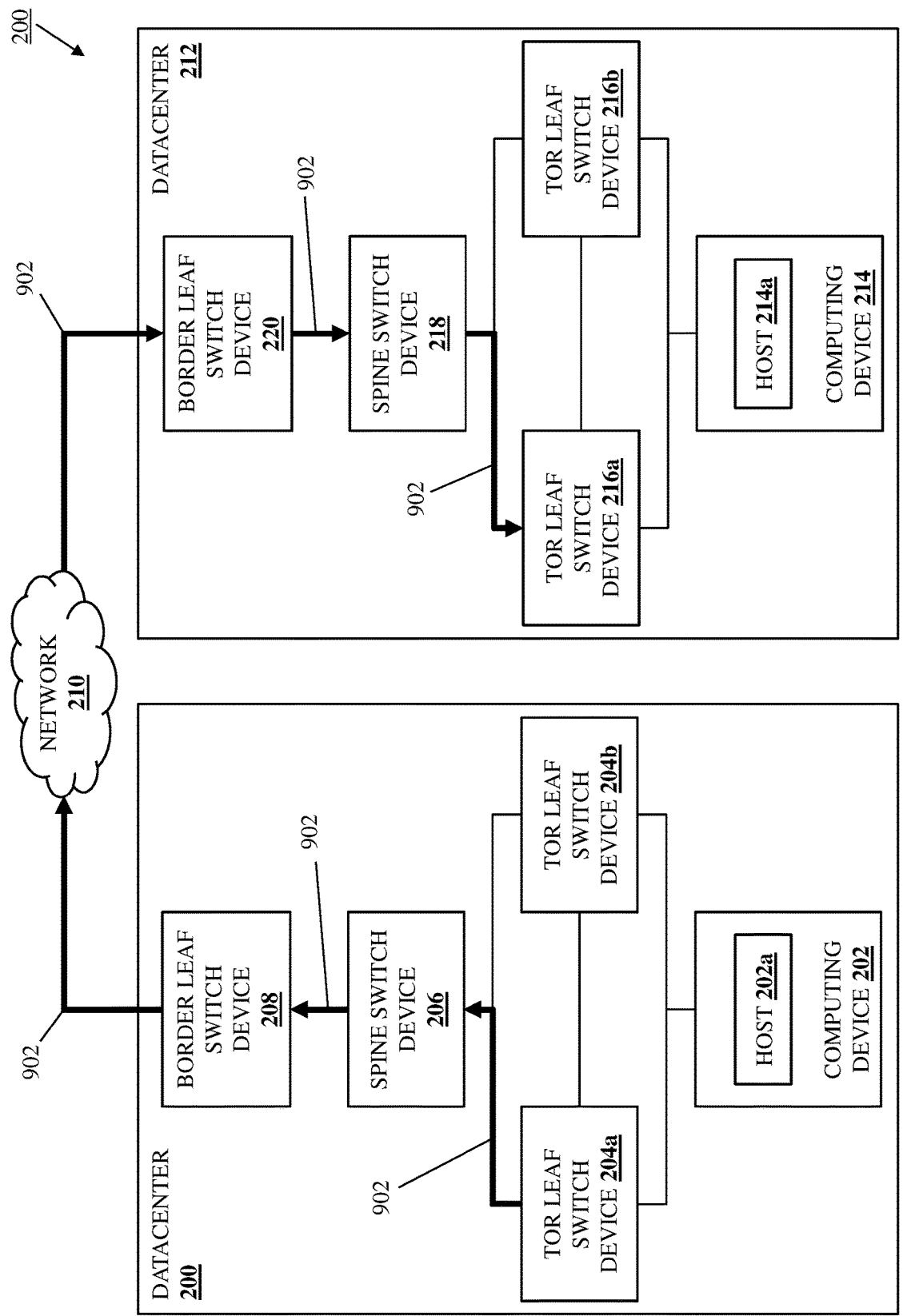
FIG. 9B is a schematic view illustrating an embodiment of the networked system of FIG. 2 operating during the method block of FIGS. 4B and 4C.
Figure 9C:
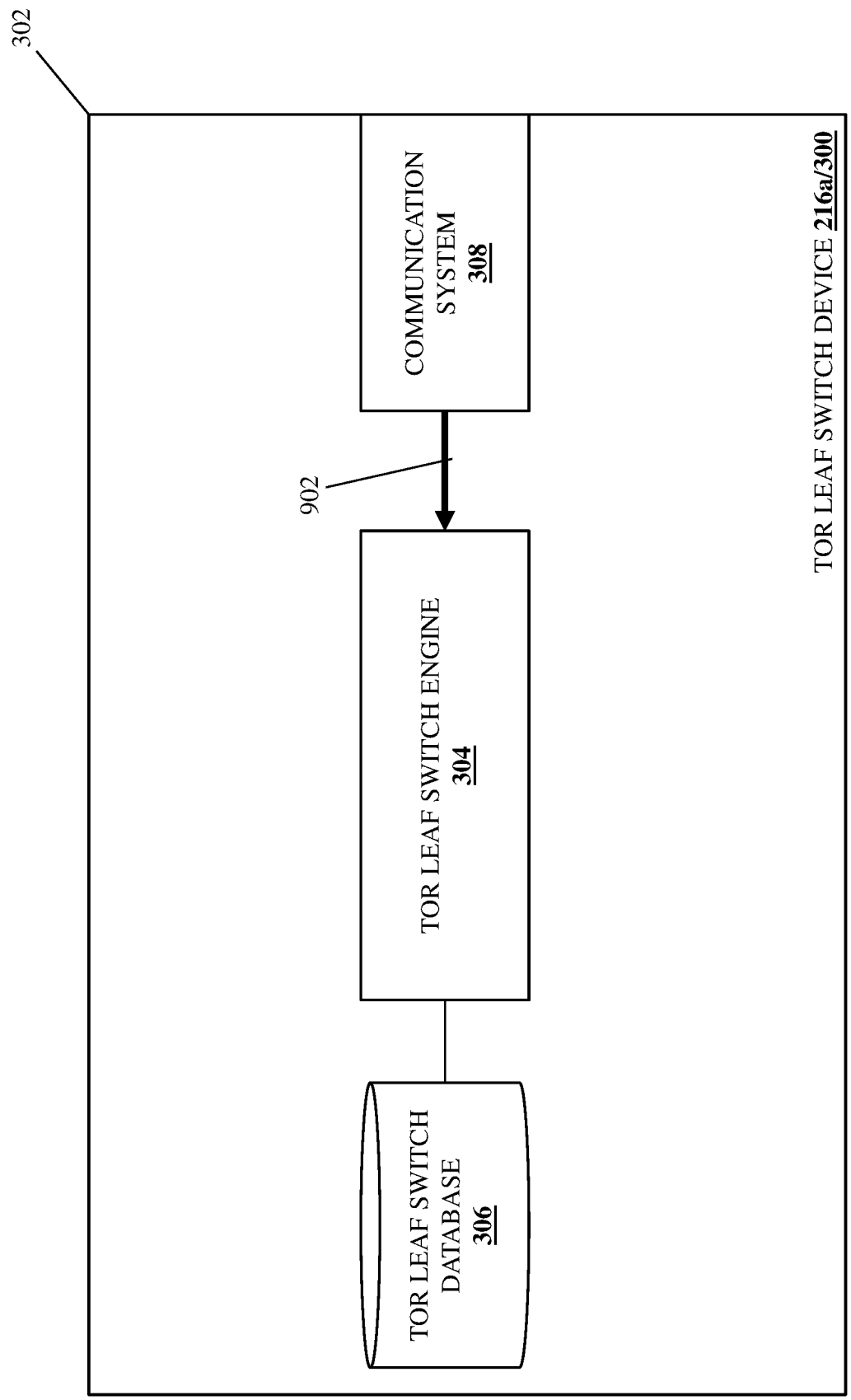
FIG. 9C is a schematic view illustrating an embodiment of the TOR leaf switch device of FIG. 3 operating during the method block of FIGS. 4B and 4C.

Block 402 of the method 400 then proceeds to sub-block 402e where the first leaf switch device transmits the first discovery communication to a second leaf switch device. With continued reference to FIG. 9A, in an embodiment of sub-block 402d, the TOR leaf switch engine 304 in the TOR leaf switch device 204a/300 may perform discovery communication transmission operations 902 that may include transmitting the discovery communication via its communication system 308 and towards the host 214a. For example, at sub-block 402e, the TOR leaf switch engine 304 in the TOR leaf switch device 204a/300 may "flood", multicast, and/or otherwise transmit the discovery communication such that the discovery communication is transmitted via the spine switch device 206, the border leaf switch device 208, the network 210, the border leaf switch device 220, the spine switch device 218, and to the TOR leaf switch device 216a, as illustrated in FIG. 9B. As such, as part of the discovery communication transmission operations 902 and as illustrated in FIG. 9C, the TOR leaf switch engine 304 in the TOR leaf switch device 216a/300 may receive the discovery communication via its communication system 308.

Figure 10A:
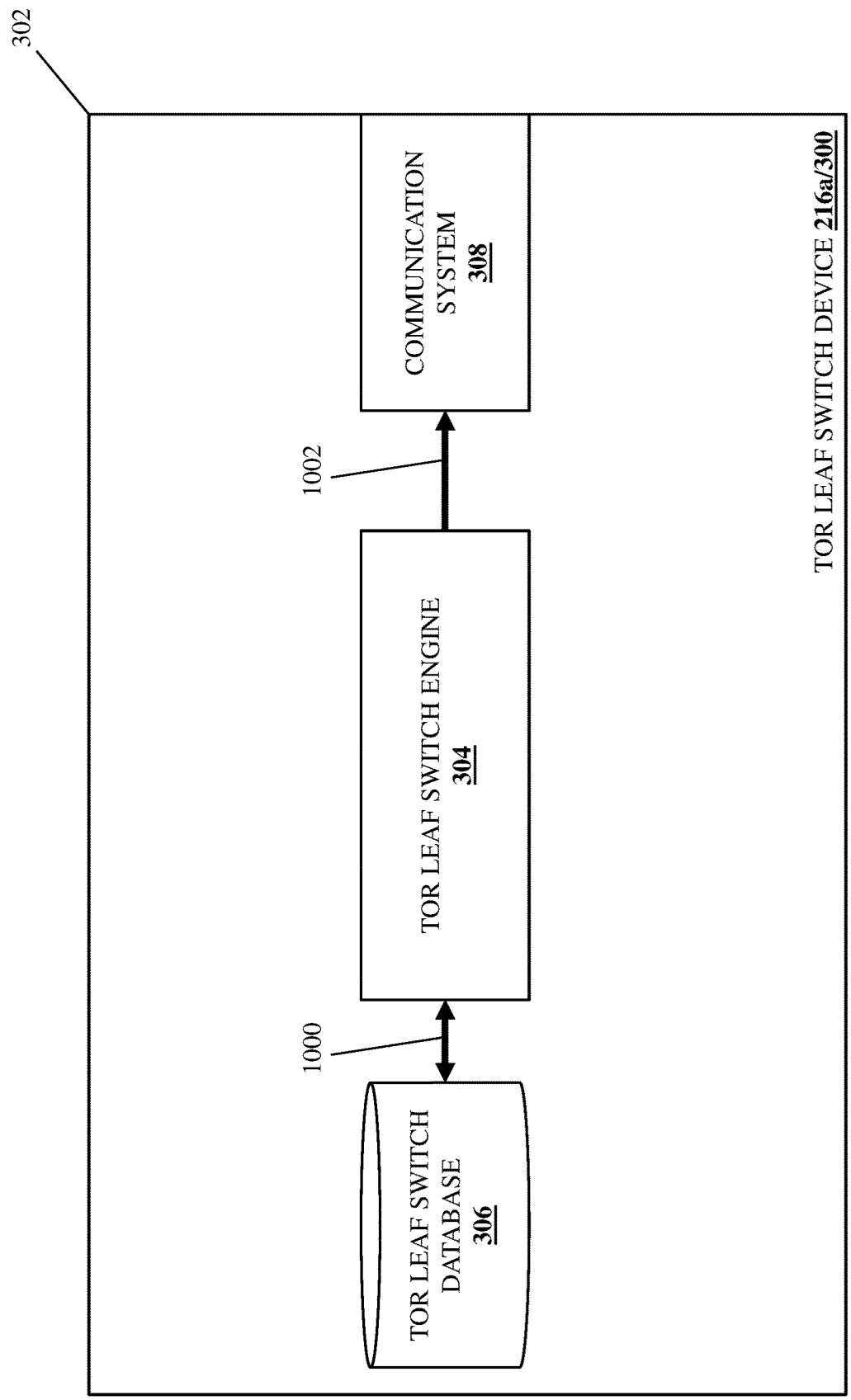
FIG. 10A is a schematic view illustrating an embodiment of the TOR leaf switch device of FIG. 3 operating during the method block of FIGS. 4B and 4C.
Figure 10B:
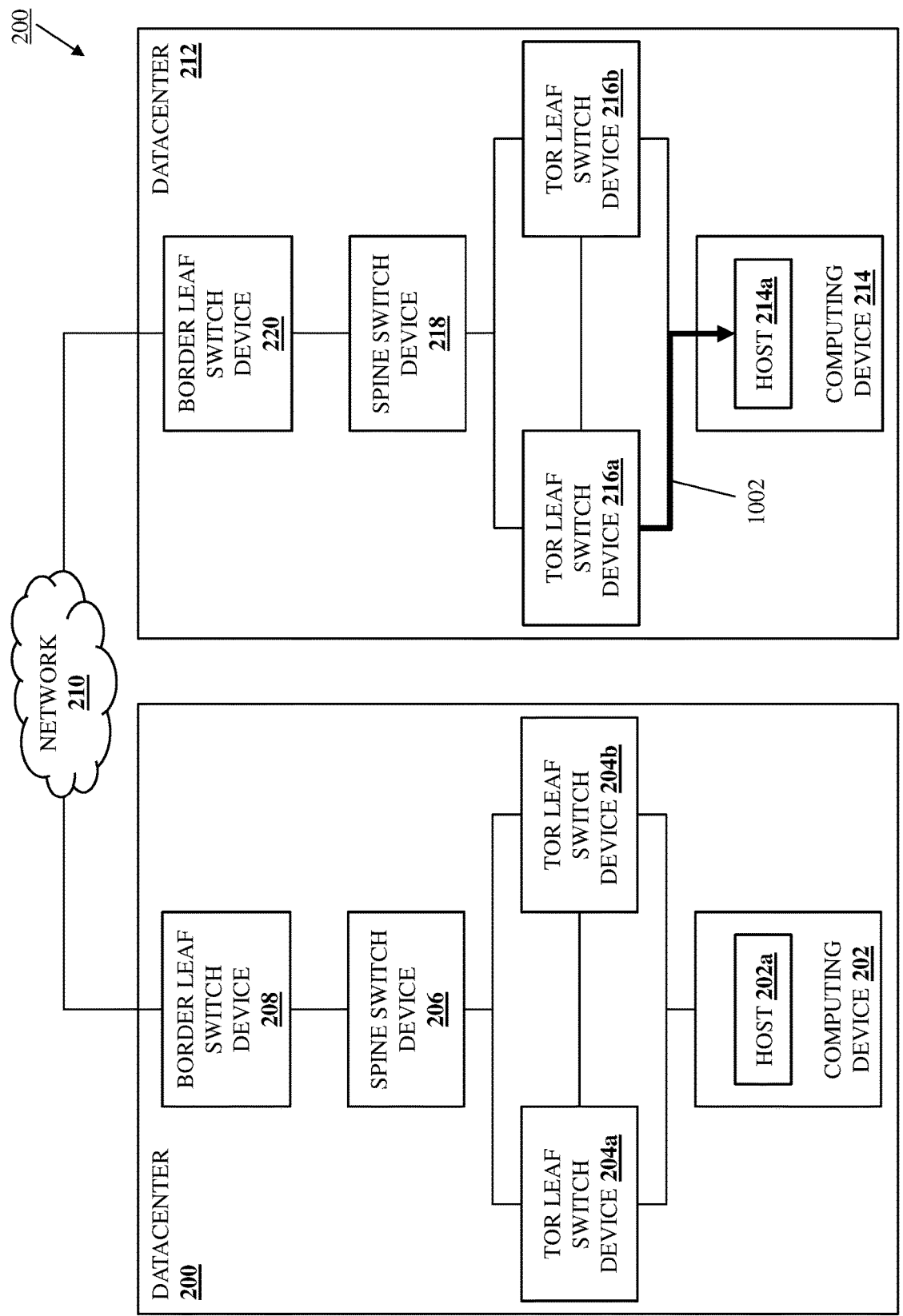
FIG. 10B is a schematic view illustrating an embodiment of the networked system of FIG. 2 operating during the method block of FIGS. 4B and 4C.

Block 402 of the method 400 then proceeds to sub-block 402f where the second leaf switch device transmits the first discovery communication to the second host. With reference to FIGS. 10A and 10B, in an embodiment of sub-block 402f and in response to receiving the discovery communication, the TOR leaf switch engine 304 in the TOR leaf switch device 216a/300 may perform IP address identification operations 1000 that may include determining whether the IP address of the host 214a that is included in the discovery communication is included in its TOR leaf switch database 306. As will be appreciated by one of skill in the art in possession of the present disclosure, at sub-block 402f, the TOR leaf switch engine 304 in the TOR leaf switch device 216a/300 may determine that the IP address of the host 214a is not included in the TOR leaf switch database 306 (i.e., the TOR leaf switch engine 304 in the TOR leaf switch device 216a/300 has not yet "learned" the IP address of the host 214a) and, in response, may perform discovery communication transmission operation 1002 that include transmitting the discovery communication via its communication system 308 and to the host 214a provided by the computing device 214. For example, in response to determining that the IP address of the host 214a is not included in the TOR leaf switch database 306, the TOR leaf switch engine 304 in the TOR leaf switch device 216a/300 may "flood", multicast, and/or otherwise transmit the discovery communication to each of the hosts that are accessible via the TOR leaf switch device 216a (including the host 214a).

Figure 11A:
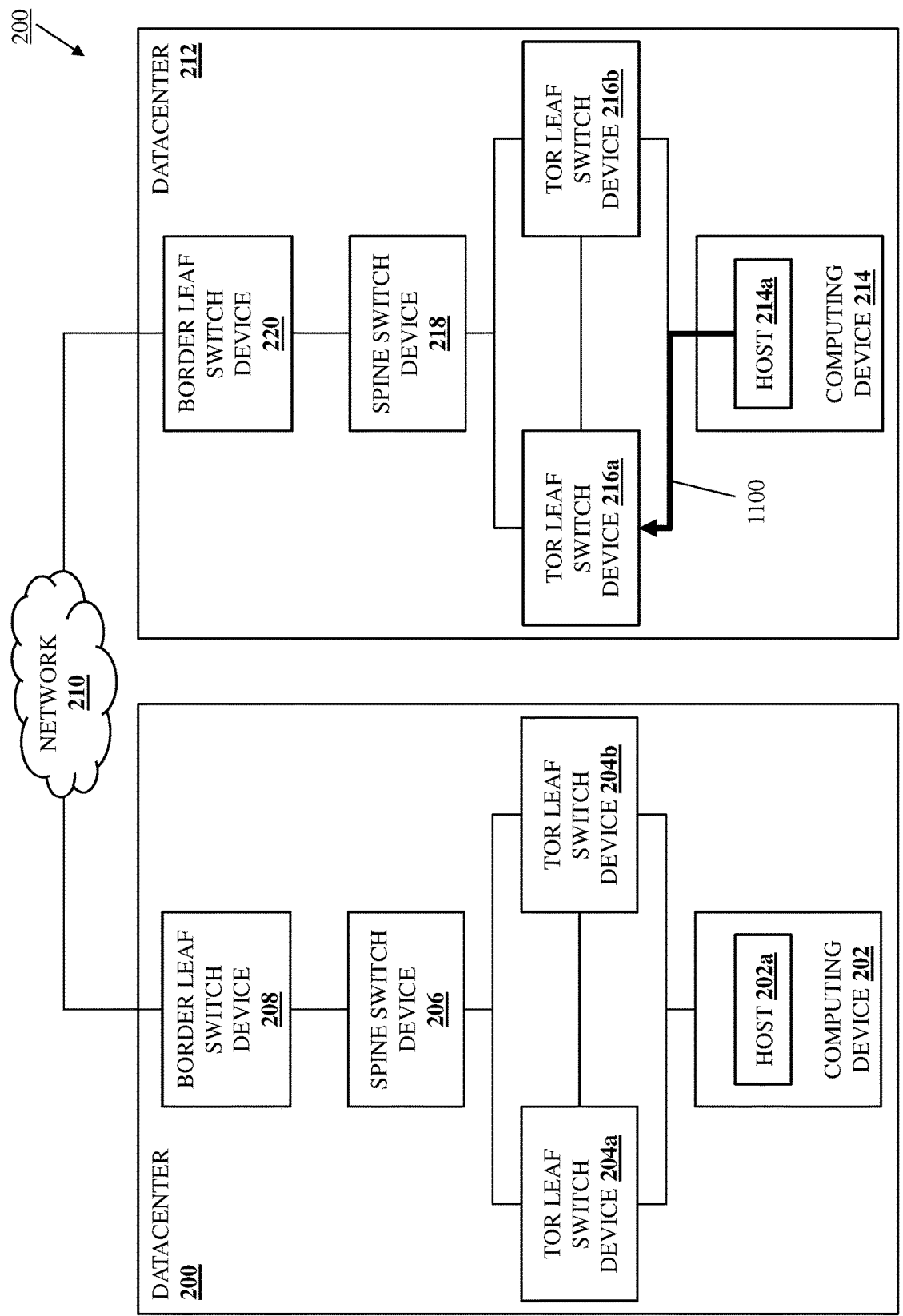
FIG. 11A is a schematic view illustrating an embodiment of the networked system of FIG. 2 operating during the method block of FIGS. 4B and 4C.
Figure 11B:
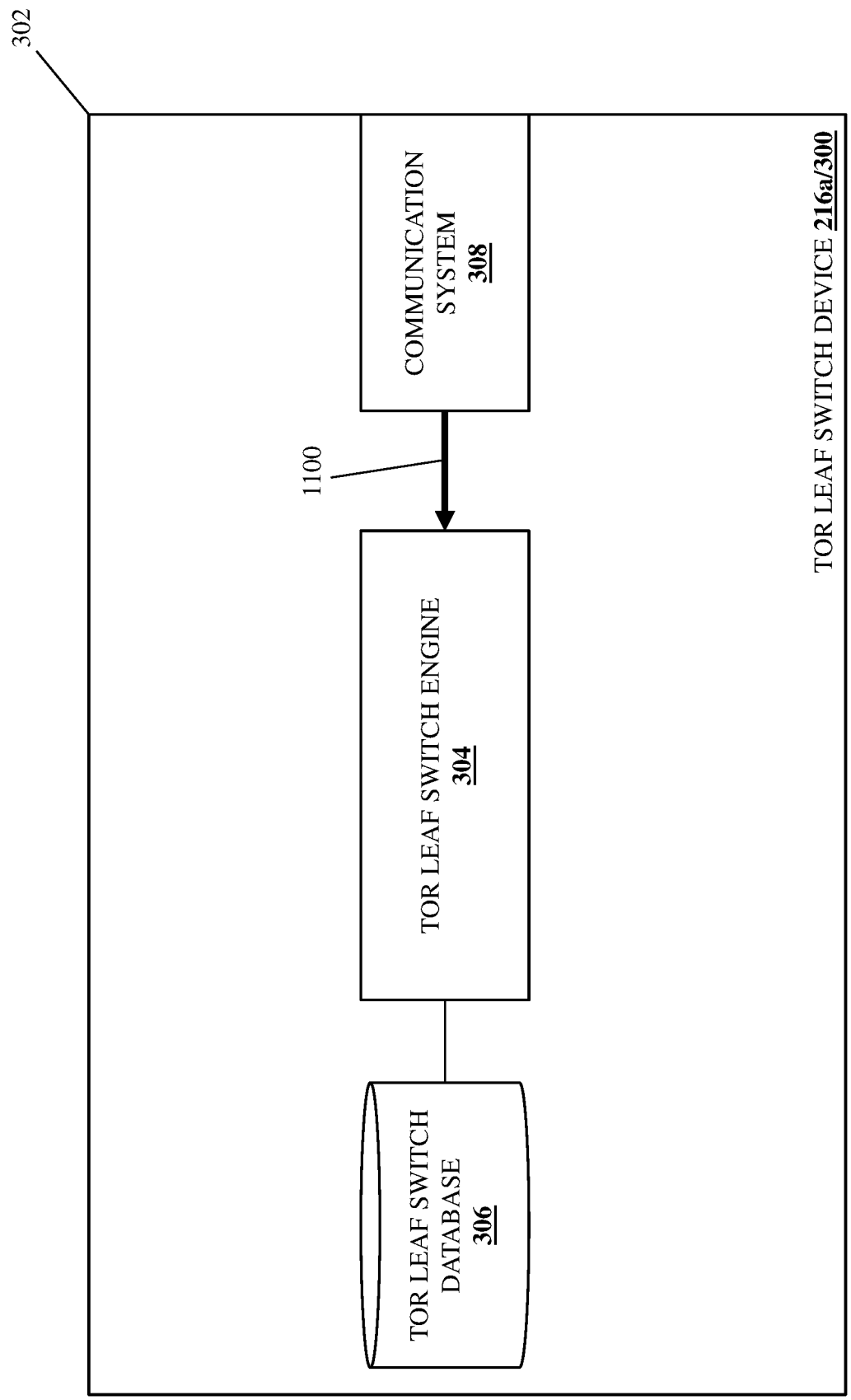
FIG. 11B is a schematic view illustrating an embodiment of the TOR leaf switch device of FIG. 3 operating during the method block of FIGS. 4B and 4C.
Figure 12:
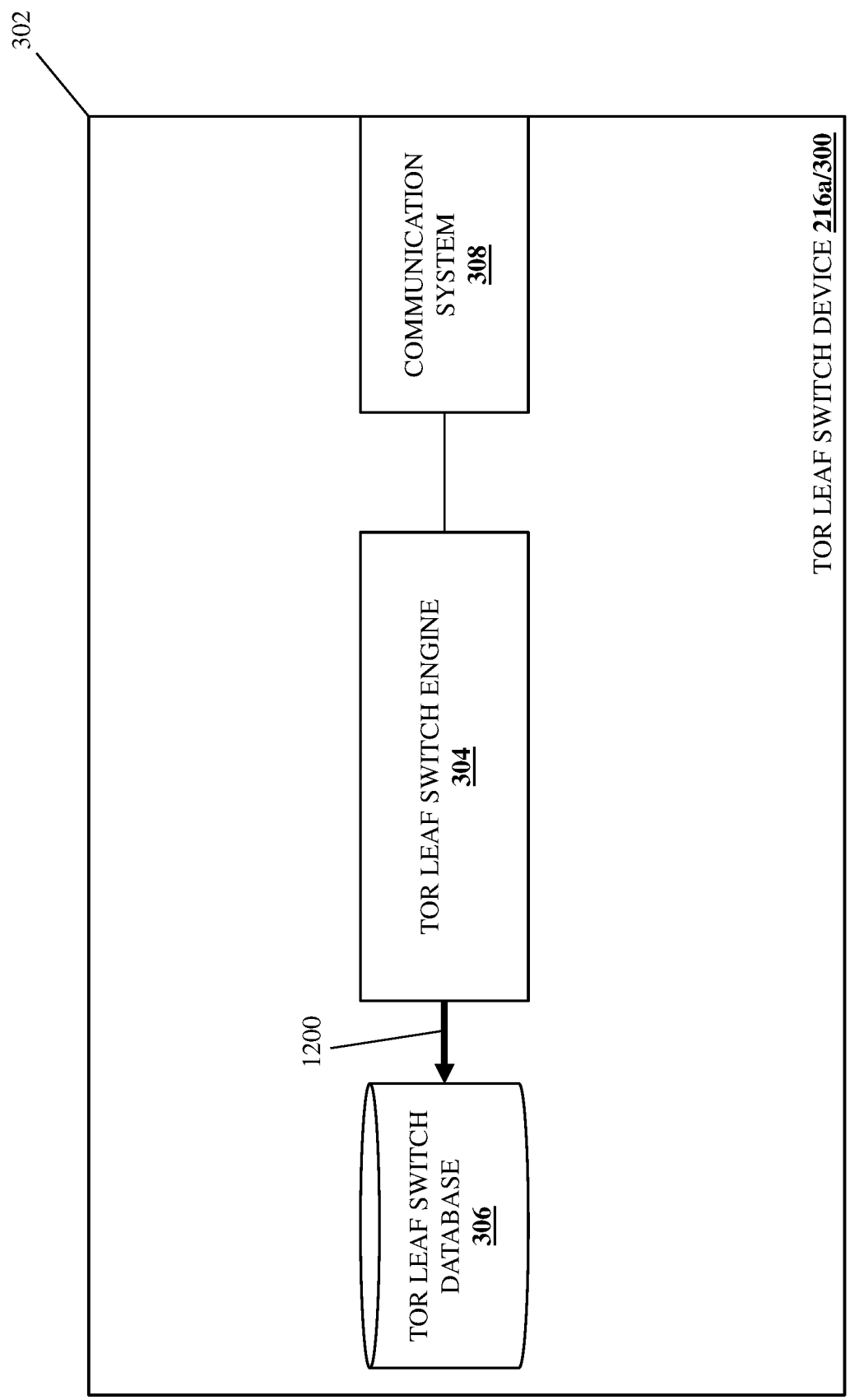
FIG. 12 is a schematic view illustrating an embodiment of the TOR leaf switch device of FIG. 3 operating during the method block of FIGS. 4B and 4C.

Block 402 of the method 400 then proceeds to sub-block 402g where the second leaf switch device receives a second discovery communication from the second host that includes a second non-hierarchical MAC address of the second host. With reference to FIG. 11A, in an embodiment of sub-block 402g and in response to receiving the discovery communication at sub-block 402f, the host 214a may perform discovery communication transmission operations 1100 that may include generating and transmitting a discovery communication that includes a non-hierarchical MAC address of the host 214a. For example, at sub-block 402g the host 214a may use the discovery communication received at sub-block 402f to learn that the IP address of the host 202a is reachable via the hierarchical MAC address of the host 202a and, in response, may generate a discovery communication (e.g., an ARP reply, an ND neighbor advertisement, etc.) that includes a non-hierarchical MAC address of the host 214a, the IP address of the host 214a, the hierarchical MAC address of the host 202a, the IP address of the host 202a, as well as any other information that would be apparent to one of skill in the art in possession of the present disclosure, and transmit that discovery communication to the TOR leaf switch device 216a. As such, as part of the discovery communication transmission operations 1100 and as illustrated in FIG. 11B, the TOR leaf switch engine 304 in the TOR leaf switch device 216a/300 receives the discovery communications via its communication system 308.

Block 402 of the method 400 then proceeds to sub-block 402h where the second leaf switch device generates a second hierarchical MAC address of the second host based on the second non-hierarchical MAC address. In an embodiment, at sub-block 402h, the TOR leaf switch engine 304 in the TOR leaf switch device 216a/300 may identify the non-hierarchical MAC address of the host 214a that was provided in the discovery communication, and determine that that non-hierarchical MAC address is unknown (i.e., the TOR leaf switch engine 304 in the TOR leaf switch device 216a/300 has not previously learned that non-hierarchical MAC address). In response to receiving the unknown non-hierarchical MAC address of the host 214a, the TOR leaf switch engine 304 in the TOR leaf switch device 216a/300 may use the non-hierarchical MAC address of the host 214a to generate a hierarchical MAC address for the host 214a. Similarly as described above, at sub-block 402h, the TOR leaf switch engine 304 in the TOR leaf switch device 216a/300 may perform non-hierarchical MAC address generation operations that may include executing a hashing operation on the non-hierarchical MAC address of the host 214a in order to generate the host identifier portion of a hierarchical MAC address for the host 214a that is similar in format to the hierarchical MAC address 500 described above with reference to FIG. 5 and that is within the hierarchical MAC address space utilized in the L2 domain provided by the networked system 200.

Similarly as described above, one of skill in the art in possession of the present disclosure will appreciate how the hashing operation discussed above may be configured, when executed on the non-hierarchical MAC address of the host 214a, to generate a bit combination for the host field 506 that uniquely identifies the host 214a that is accessible via the TOR leaf switch device (e.g., the aggregated TOR leaf switch device provided by the TOR leaf switch devices 216a and 216b), with that bit combination utilized with the site identifier, pod identifier, and rack identifier that identifies the location of that TOR leaf switch device through which the host 214a is accessible in order to provide the hierarchical MAC address for the host 214a. However, while a specific example of the use of a non-hierarchical MAC address of the host 214a to generate a hierarchical MAC address of the host 214a has been described, one of skill in the art in possession of the present disclosure will appreciate how other techniques for generating the hierarchical MAC address of the host 214a based on the non-hierarchical MAC address of the host 214a will fall within the scope of the present disclosure as well.

Block 402 of the method 400 then proceeds to sub-block 402i where the second leaf switch device stores the second hierarchical MAC address in association with the second IP address. In an embodiment, at sub-block 402i, the TOR leaf switch engine 304 in the TOR leaf switch device 216a/300 may perform hierarchical MAC address storage operations 1200 that includes storing the hierarchical MAC address of the host 214a that was generated at sub-block 402h in the TOR leaf switch database 306. Similarly as described above, the TOR leaf switch database 306 may include a translation table, and at sub-block 402i the TOR leaf switch engine 304 in the TOR leaf switch device 216a/300 may associate the hierarchical MAC address of the host 214a with the IP address of the host 214 (i.e., which was received in the discovery communication at sub-block 402g). As will be appreciated by one of skill in the art in possession of the present disclosure, the association of the hierarchical MAC address of the host 214a with the IP address of the host 214a in the translation table operates to generate, assign, and/or otherwise provide the hierarchical MAC address for the host 214a.

Figure 13B:
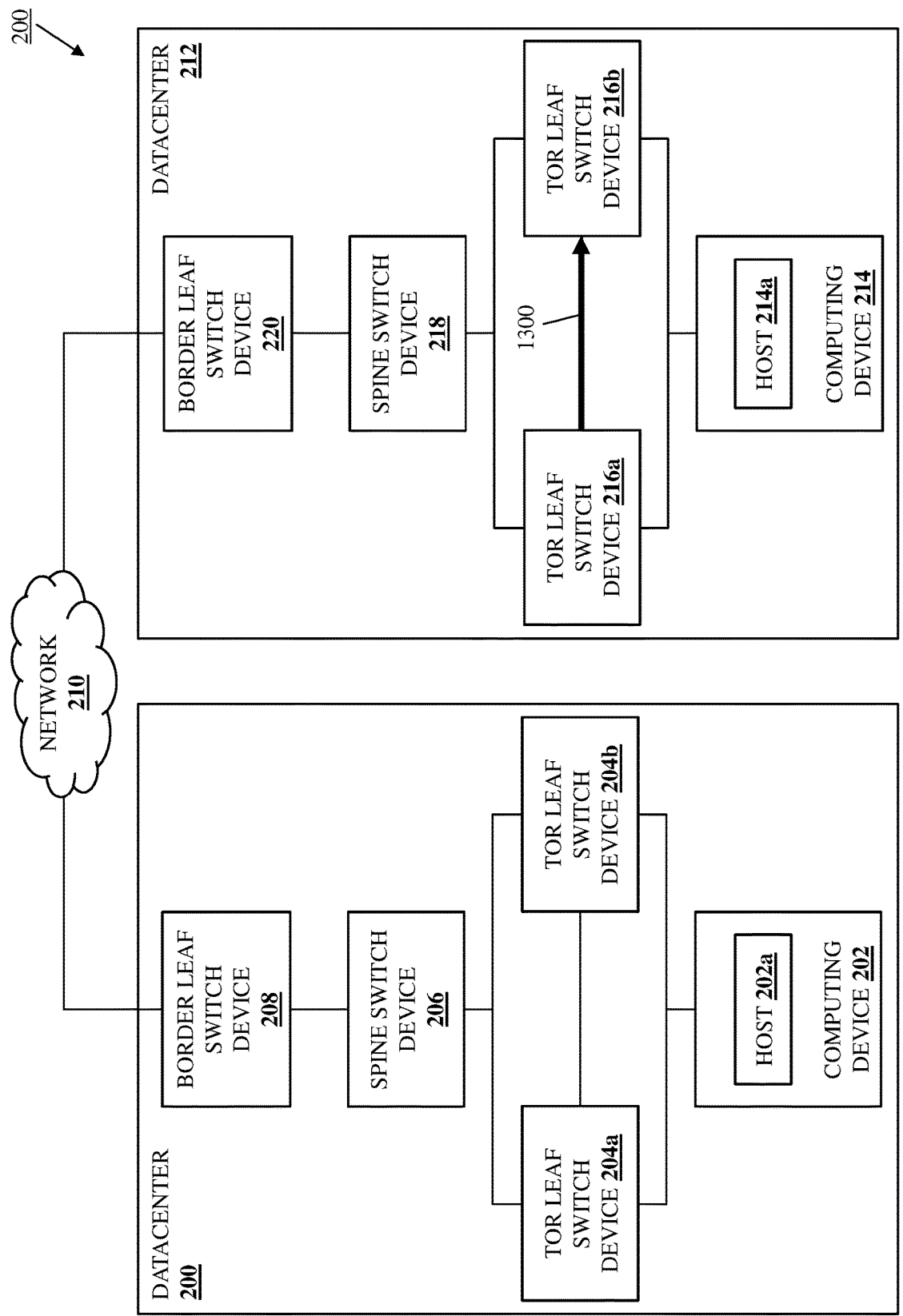
FIG. 13B is a schematic view illustrating an embodiment of the networked system of FIG. 2 operating during the method block of FIGS. 4B and 4C.

With reference to FIGS. 13A and 13B, in embodiments in which the TOR leaf switch devices 216a and 216b provide an aggregated TOR leaf switch device through which the host 214a is accessible and the TOR leaf switch device 216a operates as the "primary" aggregated switch device, the TOR leaf switch engine 304 in the TOR leaf switch device 216a/300 may perform hierarchical MAC address sharing operations 1300 that may include transmitting the hierarchical MAC address of the host 214a (as well as any of the information provided in the discovery communication received at sub-block 402g if necessary) via its communication system 308 and to the TOR leaf switch device 216b (which is operating as the "secondary" aggregated switch device in this embodiment). While not illustrated, one of skill in the art in possession of the present disclosure will appreciate how, in response to receiving the hierarchical MAC address of the host 214, the TOR leaf switch engine 304 in the TOR leaf switch device 216b/300 may store the hierarchical MAC address of the host 214a similarly as described above by the TOR leaf switch engine 304 in the TOR leaf switch device 216a/300 (e.g., in association with an IP address of the host 214a in a translation table in its TOR leaf switch device database 306). As will be appreciated by one of skill in the art in possession of the present disclosure, the hierarchical MAC address sharing operations 1300 ensure that hash collisions are dealt with by the TOR leaf switch devices 216a and 216b in a consistent manner.

Block 402 of the method 400 then proceeds to sub-block 402j where the second leaf switch device provides the second hierarchical MAC address in the second discovery communications. Similarly as described above, the discovery communication received at sub-block 402g may be held following its use to generate the hierarchical MAC address of the host 214a until the non-hierarchical MAC address/hierarchical MAC address translations described herein may be performed. However, in some embodiments the discovery communication received at sub-block 402g may be "dropped", discarded, and/or otherwise deleted following its use to generate the hierarchical MAC address of the host 214a in order to, for example, prevent the TOR leaf switch engine 304 in the TOR leaf switch device 216a/300 from becoming overloaded with accumulated discovery communications (i.e., received from the host 214a and other hosts) via the holding those discovery communications until the non-hierarchical MAC address/hierarchical MAC address translations described herein may be performed.

Similarly as described above, when the discovery communications are dropped as described above, the host 214a will generate and transmit a duplicate discovery communication after some time period that will be received by the TOR leaf switch engine 304 in the TOR leaf switch device 216a/300 in a manner similar to that described above. As such, the "second" discovery communication discussed herein may refer to a discovery communication that has been received from the host 214a and held, or a discovery communication that includes an initial discovery communication that was received from the host 214a and dropped as discussed above, as well as a subsequent duplicate discovery communication that is received from that host 214a following the dropping of the initial discovery communication.

Figure 14A:
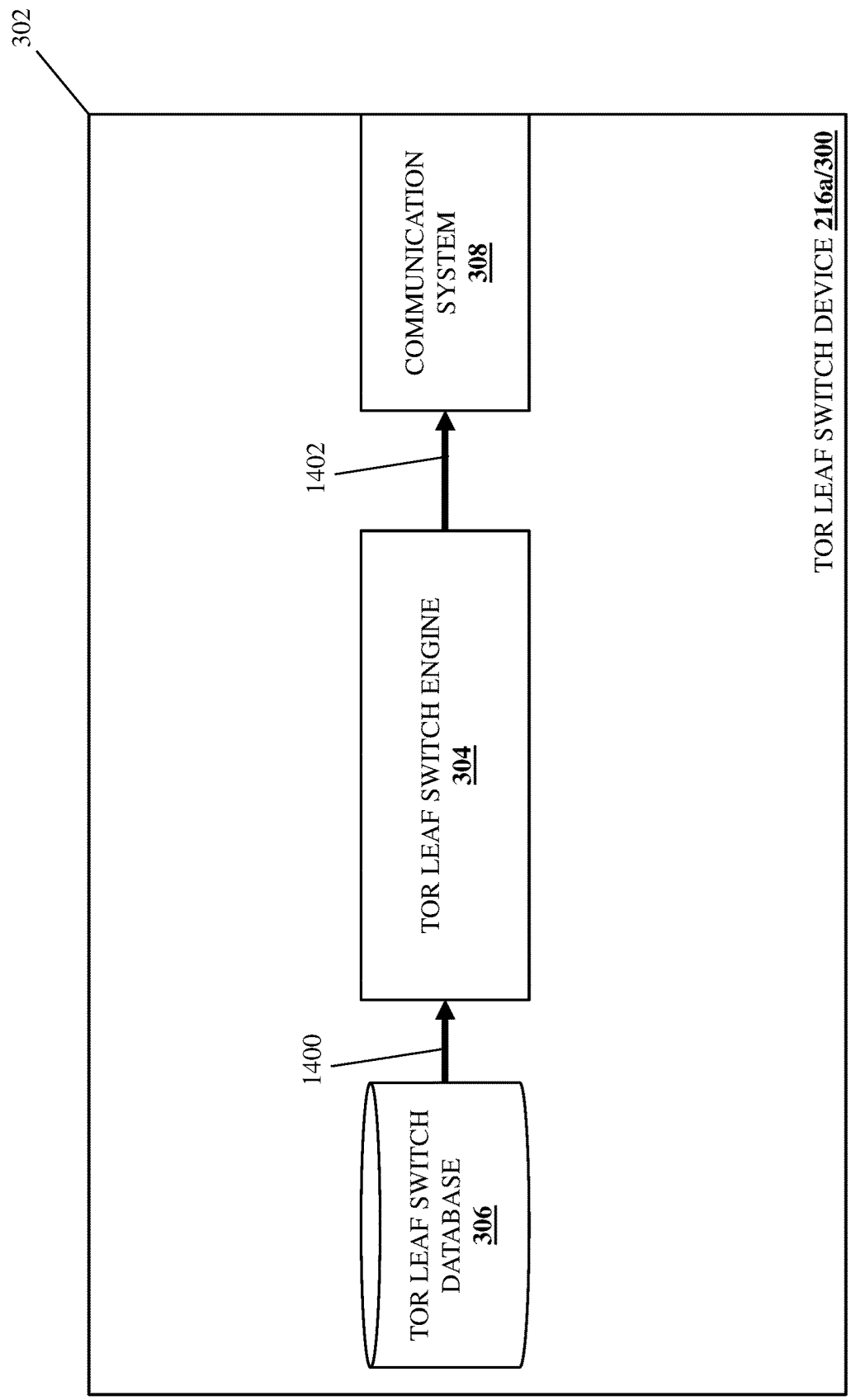
FIG. 14A is a schematic view illustrating an embodiment of the TOR leaf switch device of FIG. 3 operating during the method block of FIGS. 4B and 4C.

As such, in an embodiment of sub-block 402j, the TOR leaf switch engine 304 in the TOR leaf switch device 216a/300 may provide the hierarchical MAC address of the host 214a in the discovery communication that was received and held as discussed above, or in the subsequent duplicate discovery communication that was received following the dropping of the initial discovery communication as discussed above. With reference to FIG. 14A, in an embodiment of sub-block 402j, the TOR leaf switch engine 304 in the TOR leaf switch device 216a/300 may perform non-hierarchical MAC address/hierarchical MAC address translation operations 1400 that may include using the translation table in the TOR leaf switch database 306 to translate the non-hierarchical MAC address of the host 214a included in the discovery communication to the hierarchical MAC address of the host 214a.

For example, the non-hierarchical MAC address/hierarchical MAC address translation operations 1400 may retrieve the hierarchical MAC address of the host 214a from the TOR leaf switch device database 306 using the non-hierarchical MAC address of the host as a "key", and provide that hierarchical MAC address in place of the non-hierarchical MAC address of the host 214a as the "source MAC address" in a header of a data packet that provides the discovery communication, and as the "target hardware address" in a "payload" of the data packet that provides the discovery communication, and one of skill in the art in possession of the present disclosure will recognize how such translations may be performed for any non-hierarchical MAC addresses embedded in the discovery communications based on the control protocol being used. However, while examples of specific information that is provided in the discovery communication have been described, one of skill in the art in possession of the present disclosure will appreciate how other information may be provided in the discovery communication while remaining within the scope of the present disclosure as well.

As will be appreciated by one of skill in the art in possession of the present disclosure, in addition to the translation table discussed above, the TOR leaf switch engine 304 in the TOR leaf switch device 216a/300 may maintain a discovery cache (e.g., an ARP cache, an ND cache, etc.) in its TOR leaf switch database 306 that associates the IP address of the host 214a with the hierarchical MAC address of the host 214a, and may use that information to respond to discovery communications (e.g., ARP requests, ND neighbor solicitations, etc.) for the IP address of the host 214a from other hosts (e.g., the host 202a).

Figure 14B:
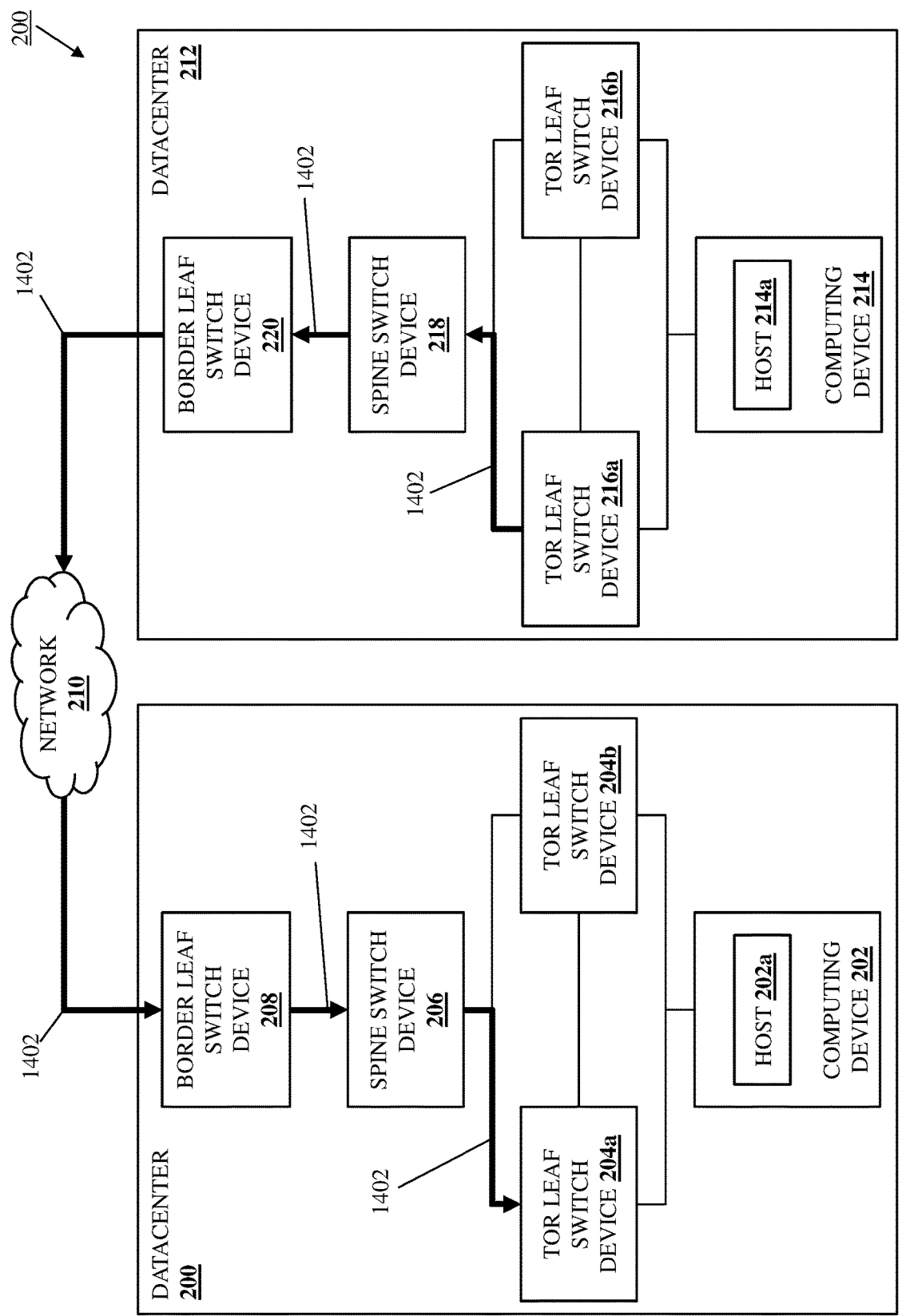
FIG. 14B is a schematic view illustrating an embodiment of the networked system of FIG. 2 operating during the method block of FIGS. 4B and 4C.

Block 402 of the method 400 then proceeds to sub-block 402k where the second leaf switch device transmits the second discovery communication to the first leaf switch device. With reference to FIGS. 14A and 14B, in an embodiment of sub-block 402k, the TOR leaf switch engine 304 in the TOR leaf switch device 216a/300 may perform discovery communication transmission operations 1402 that may include transmitting the discovery communication via its communication system 308 and towards the host 202a. For example, at sub-block 402k, the TOR leaf switch engine 304 in the TOR leaf switch device 216a/300 may unicast and/or otherwise transmit the discovery communication such that the discovery communication is transmitted via the spine switch device 218, the border leaf switch device 220, the network 210, the border leaf switch device 208, the spine switch device 206, and to the TOR leaf switch device 204a, as illustrated in FIG. 14B. As will be appreciated by one of skill in the art in possession of the present disclosure, that discovery communication may be transmitted using the hierarchical MAC address of the host 202a in the destination MAC address. As such, as part of the discovery communication transmission operations 1402 and as illustrated in FIG. 14C, the TOR leaf switch engine 304 in the TOR leaf switch device 204a/300 may receive the discovery communication via its communication system 308.

Figure 15:
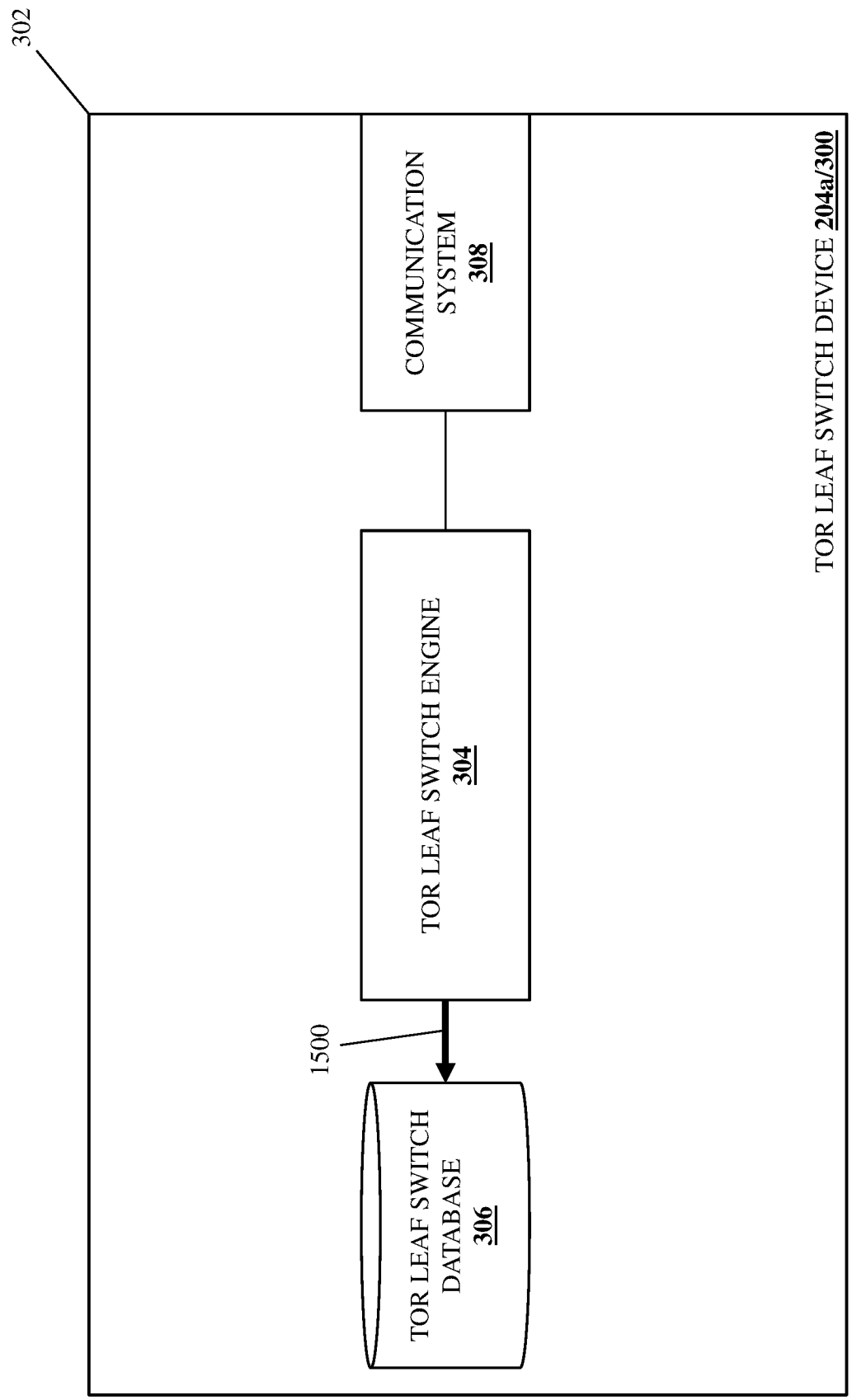
FIG. 15 is a schematic view illustrating an embodiment of the TOR leaf switch device of FIG. 3 operating during the method block of FIGS. 4B and 4C.

Block 402 of the method 400 then proceeds to sub-block 402*l* where the first leaf switch device stores a hierarchical MAC prefix of the second hierarchical MAC address in association with the second leaf switch device. With reference to FIG. 15, in an embodiment of sub-block 402*l*, the TOR leaf switch engine 304 in the TOR leaf switch device 204*a*/300 may perform hierarchical MAC prefix storage operations 1500 that includes identifying the hierarchical MAC prefix in the hierarchical MAC address of the host 214*a* that was received in the discovery communication at sub-block 402*k*, and associating that hierarchical MAC prefix with the remote TOR leaf switch 216*a*/216*b* in the TOR leaf switch database 306.

As will be appreciated by one of skill in the art in possession of the present disclosure, sub-block 402*l* of the method 400 may be performed using remote learning/Ethernet Virtual Private Network (EVPN) techniques that allow a TOR leaf switch device to learn that a hierarchical MAC prefix is reachable via another TOR leaf switch device (e.g., a TOR leaf switch device that provides a Virtual Tunnel End Point (VTEP) device), and may be performed via a data path learning or via the use of a Border Gateway Protocol (BGP) EVPN control plane. As such, one of skill in the art in possession of the present disclosure will appreciate how 2 associations may be maintained: a hierarchical-MAC-prefix-to-TOR/VTEP-mapping, and an IP-address-to-hierarchical-MAC-address mapping (with the latter maintained in the control plane if maintained).

As will be appreciated by one of skill in the art in possession of the present disclosure, the use of the hierarchical MAC prefix 504 in the hierarchical MAC address of the host 214*a* in order to forward data communications as described below reduces the storage space needed in the TOR leaf switch device 204*a* by the number of host identifiers for hosts that the TOR leaf switch device must transmit data communications to. Thus, continuing with the example provided above in which the host field 506 in the hierarchical MAC address 500 is 16 bits, the forwarding table for the TOR leaf switch devices 204*a* may require up to ($2^{16}$=) 65,536 fewer entries for the TOR leaf switch device 216*a* due to the need to only store a single entry with the hierarchical MAC prefix that identifies the TOR leaf switch device 216*a* (and not a respective entry that identifies each host accessible via the TOR leaf switch device 216*a*).

While not illustrated, one of skill in the art in possession of the present disclosure will appreciate how the TOR leaf switch engine 304 in the TOR leaf switch device 204*a*/300 may perform hierarchical MAC address sharing operations that are similar to the hierarchical MAC address sharing operations 800 described above with reference to FIGS. 8A and 8B in order to provide the hierarchical MAC address of the host 214*a* to the TOR leaf switch engine 304 in the TOR leaf switch device 204*b*/300.

Figure 16A:
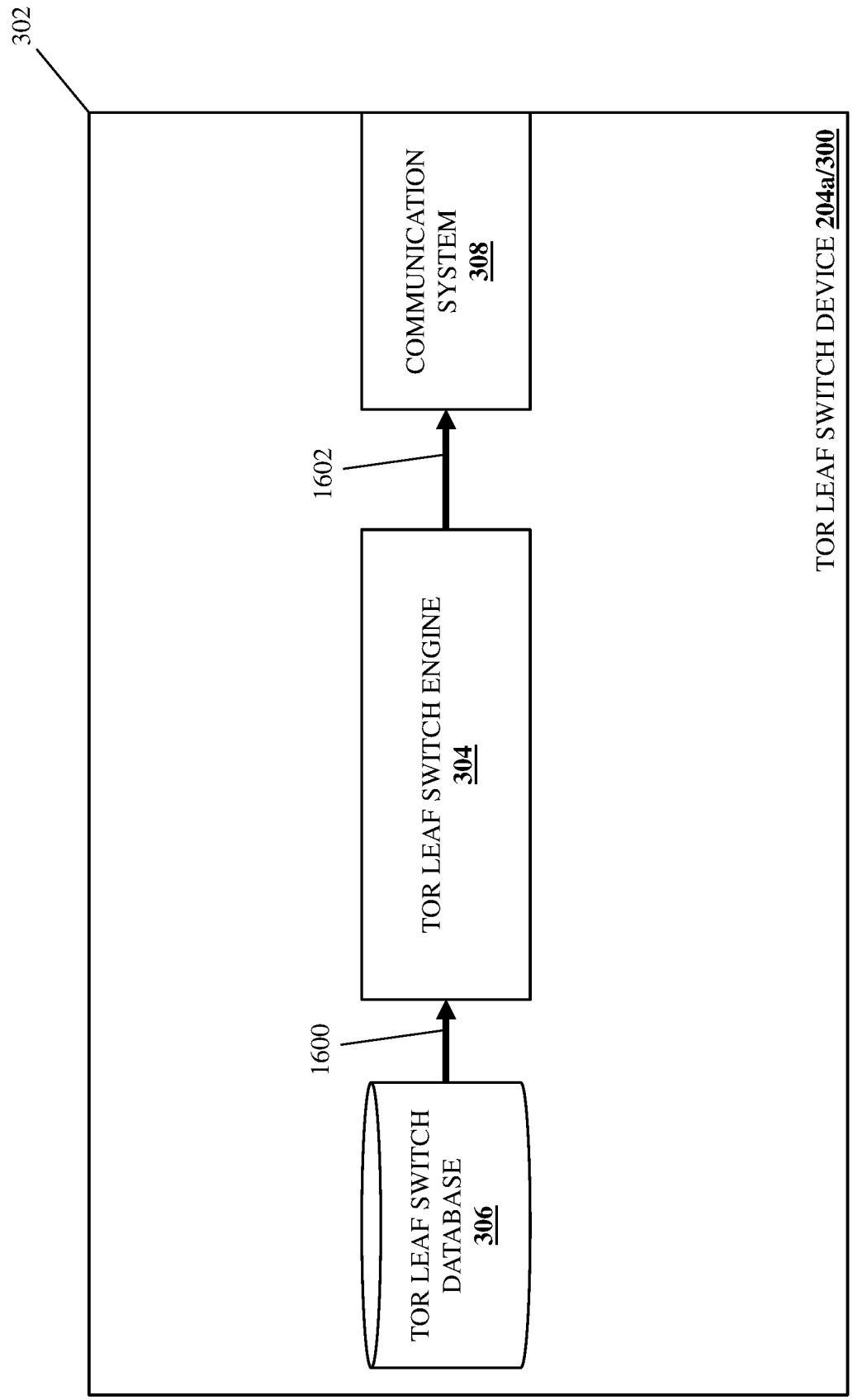
FIG. 16A is a schematic view illustrating an embodiment of the TOR leaf switch device of FIG. 3 operating during the method block of FIGS. 4B and 4C.

Block 402 of the method 400 then proceeds to sub-block 402*m* where the first leaf switch device translates the first hierarchical MAC address to a non-hierarchical MAC address and transmits the second discovery communication to the first host. With reference to FIG. 16A, in an embodiment of sub-block 402*m*, the TOR leaf switch engine 304 in the TOR leaf switch device 204*a*/300 may perform hierarchical MAC address/non-hierarchical MAC address translation operations 1600 that may include using the translation table in the TOR leaf switch database 306 to translate the hierarchical MAC address of the host 202*a* included in the discovery communication to the non-hierarchical MAC address of the host 202*a*, and may provide the non-hierarchical MAC address of the host 202*a* in place of the non-hierarchical MAC address of the host 202*a* as the "destination MAC address" in a header of a data packet that provides the discovery communication, and as the "source hardware address" in a "payload" of the data packet that provides the discovery communication.

Figure 16B:
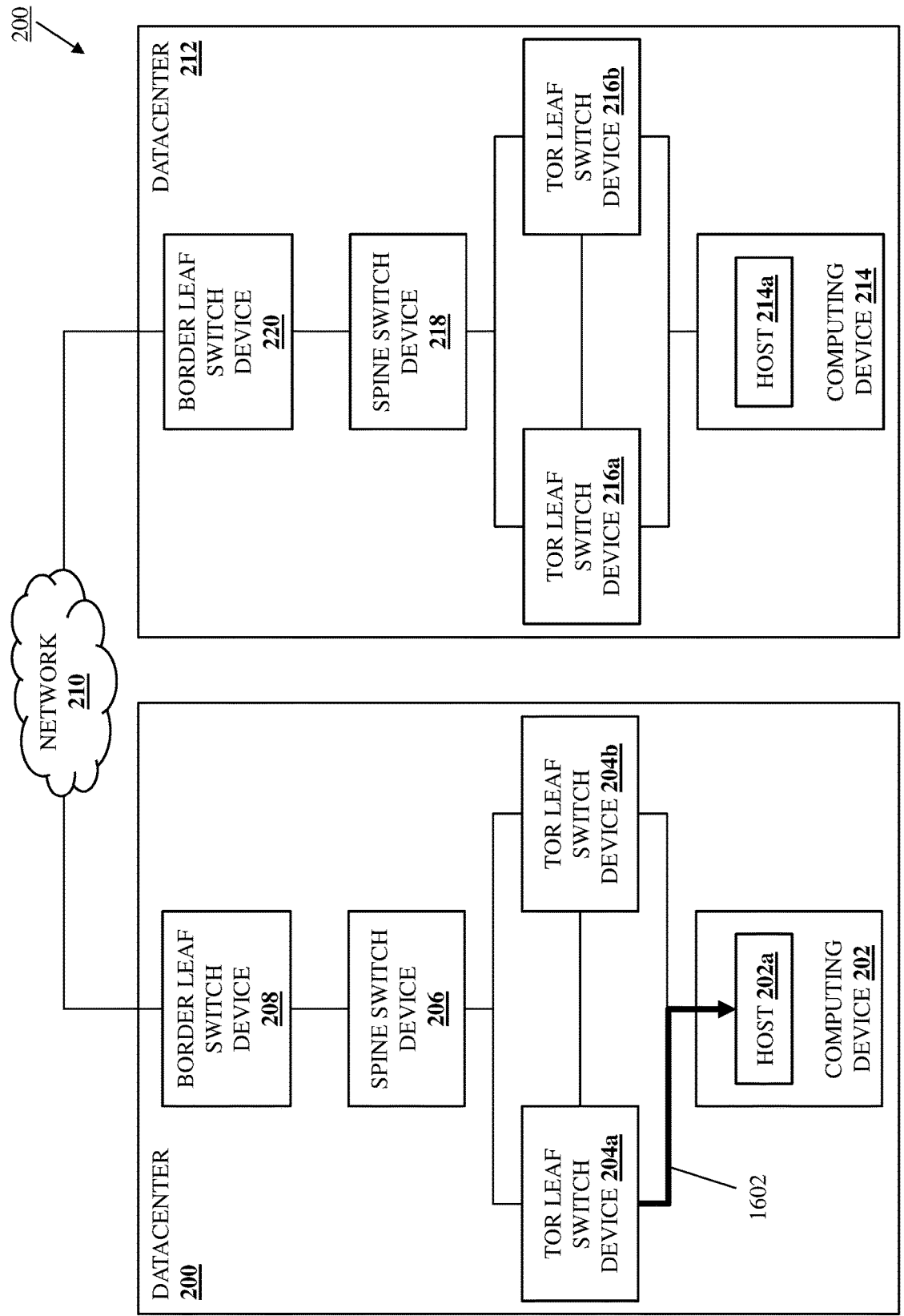
FIG. 16B is a schematic view illustrating an embodiment of the networked system of FIG. 2 operating during the method block of FIGS. 4B and 4C.

With reference to FIGS. 16A and 16B, in an embodiment of sub-block 402*m*, the TOR leaf switch engine 304 in the TOR leaf switch device 204*a*/300 may then perform discovery communication transmission operations 1602 that may include transmitting the discovery communications via its communication system 308 and to the host 202*a* in the computing device 202. As will be appreciated by one of skill in the art in possession of the present disclosure, the host 202*a* may use the discovery communications to learn that the IP address of the host 214*a* is associated with the hierarchical MAC address of the host 214*a* and, as discussed below, subsequent data communications generated by the host 202*a* and destined for the host 214*a* will include the non-hierarchical MAC address of the host 202*a* as the "source" MAC address in the header of the data packet that provides the data communication, and the hierarchical MAC address of the host 214*a* as the "destination" MAC address in the header of the data packet that provides the data communication.

While not described in detail herein, one of skill in the art in possession of the present disclosure will appreciate how block 402 of the method 400 may be performed similarly as discussed above by the host 214*a* to send similar discovery communications (e.g., ARP requests, ND neighbor solicitations, etc.) to the host 202*a*, with the host 202*a* replying with similar discovery communications (e.g., ARP replies, ND neighbor advertisements, etc.) in order to allow the host 214*a* to learn that the IP address of the host 202*a* is associated with the hierarchical MAC address of the host 202*a*, with subsequent data communications generated by the host 214*a* and destined for the host 202*a* including the non-hierarchical MAC address of the host 214*a* as the "source" MAC address in the header of the data packet that provides the data communication, and the hierarchical MAC address of the host 202*a* as the "destination" MAC address in the header of the data packet that provides the data communication. However, one of skill in the art in possession of the present disclosure will appreciate how block 402 may be performed in such a manner for "new" host communications, while subsequent host communications will be configured based on the original ARP request/reply operations.

As such, following block 402, one of skill in the art in possession of the present disclosure will appreciate how the hosts 202*a* and 214*a*, and the TOR leaf switch devices 204*a* and 216*a* (as well as the TOR leaf switch devices 204*b* and 216*b*), are configured to perform L2 domain communications using the hierarchical MAC addresses of the hosts 202*a* and 214*a*. As will be appreciated by one of skill in the art in possession of the present disclosure, following the configuration discussed above to perform L2 domain communications using the hierarchical MAC addresses of the hosts 202*a* and 214*a* such that information about those hosts has already been learned and stored by the TOR leaf switch devices that provide access to those hosts, subsequent discovery communications between different pairs of hosts will not result in the discarding of discovery requests (e.g., ARP requests, ND neighbor solicitations, etc.) or discovery replies (e.g., ARP replies, ND neighbor advertisements, etc.) that would otherwise result in a relatively slight delay in the initiation of data communications due to the need for the assignment of hierarchical MAC addresses and storing associated information.

Furthermore, some embodiments of the present disclosure may utilize relatively higher values in "aging" timers to avoid "aging out" once a host has been learned. As will be appreciated by one of skill in the art in possession of the present disclosure, when switch devices that learn the MAC addresses of hosts and subsequently do not see activity from those hosts/MAC addresses will operate to "age out" those MAC addresses (e.g., typically after 5 min according to industry default settings). The systems and methods of the present disclosure may be configured to "hold" the learned MAC addresses relatively longer, which one of skill in the art in possession of the present disclosure will appreciate is relatively less problematic in an EVPN-type network (e.g., as opposed to networks that use the spanning tree protocol). In some embodiments, the information mapping non-hierarchical MAC addresses to hierarchical MAC addresses may be removed from hardware but stored in software (e.g., via the control plane) for a relatively long period (e.g., 1 or more days), with an option to administratively purge any entries sooner, if desired. As will be appreciated by one of skill in the art in possession of the present disclosure, such operations will prevent a host that may "age out" and then reappears a relatively short time later from receiving different hierarchical MAC addresses. Furthermore, the aging of such information may be delayed to reduce the frequency of utilization of the control plane to access that information (as the control plane must be utilized to access that information if the entry is allowed to age out).

Figure 17A:
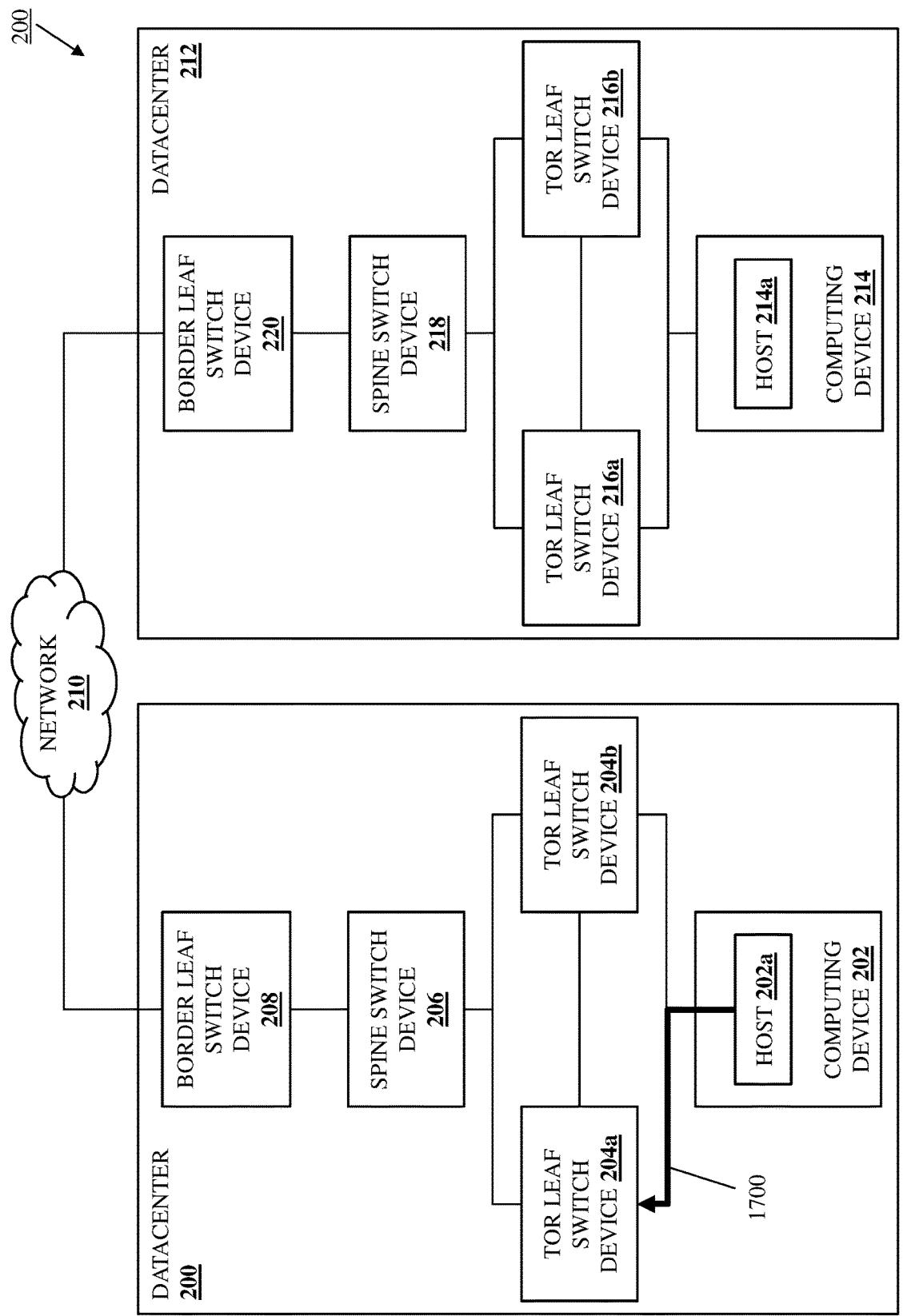
FIG. 17A is a schematic view illustrating an embodiment of the networked system of FIG. 2 operating during the method of FIG. 4A.

Referring back to FIG. 4A, following block 402, the method 400 may then proceed to block 404 where the first leaf switch device receives a first data communication from the first host that includes the second hierarchical MAC address of the second host. With reference to FIG. 17A, in an embodiment of block 404, the host 202a in the computing device 202 may perform data communication transmission operations 1700 that may include generating a data communication that includes the hierarchical MAC address of the host 214a, and transmitting that data communication to the TOR leaf switch device 204a. In embodiments in which the hosts 202a and 214a utilize their hierarchical MAC addresses, the data communication generated and transmitted by the host 202a at block 404 may include the hierarchical MAC address of the host 202a as a "source MAC address" in a header of a data packet that provides the data communications, and may also include the hierarchical MAC address of the host 214a as a "destination MAC address" in a header of the data packet that provides the data communication. (As discussed above, during discovery communications, the hierarchical MAC address of the host 214a may not be known, and the initial discovery communication will contain a broadcast address, a "target hardware address" of zero, and an IP address of the host 214a as the "target protocol address", while during data communications the hierarchical MAC address of the host 214a may be used as the "destination MAC address").

Figure 17B:
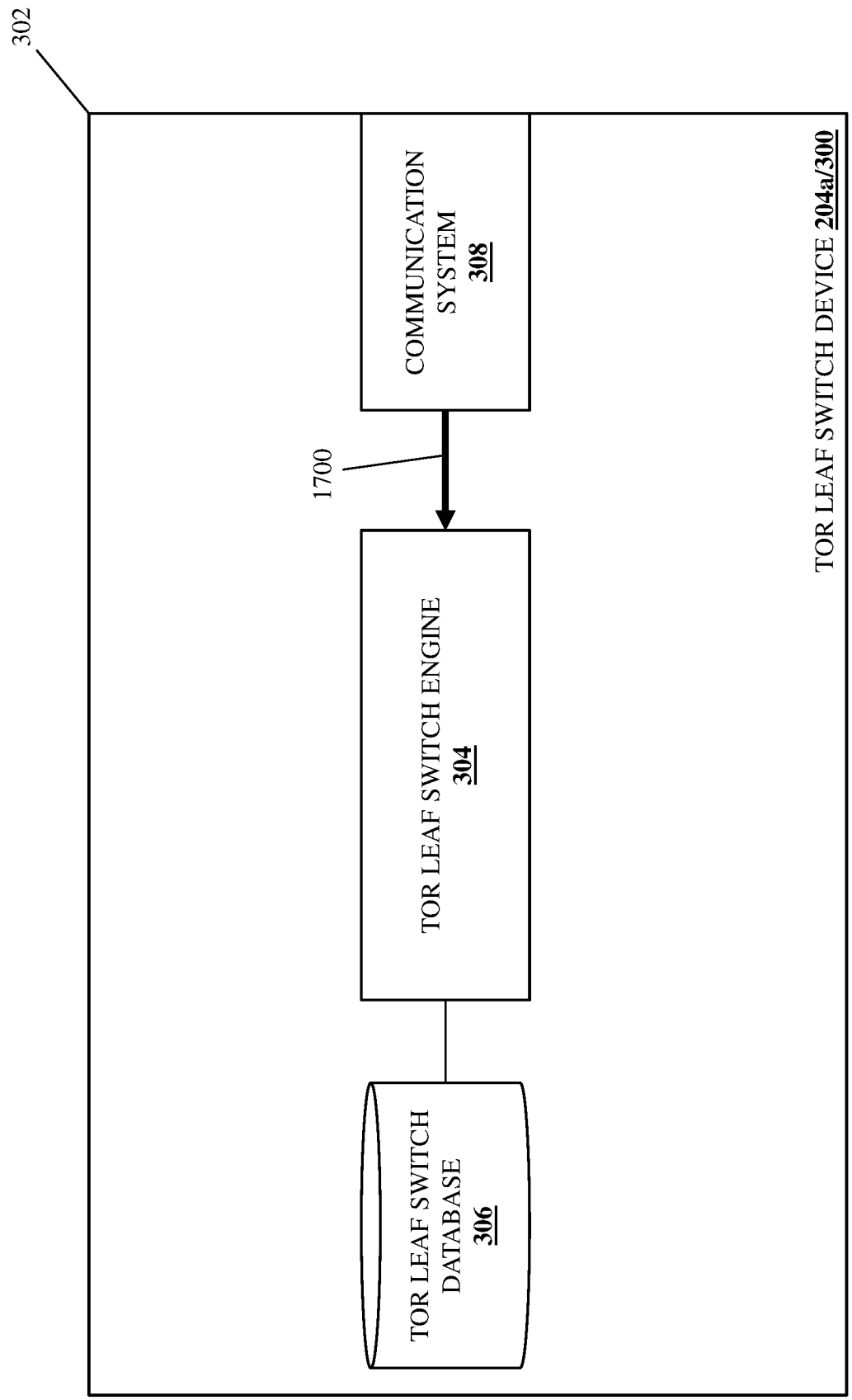
FIG. 17B is a schematic view illustrating an embodiment of the TOR leaf switch device of FIG. 3 operating during the method of FIG. 4A.

However, in embodiments in which the hosts 202a and 214a utilize their non-hierarchical MAC addresses, the data communication generated and transmitted by the host 202a at block 404 may include the non-hierarchical MAC address of the host 202a as a "source MAC address" in a header of a data packet that provides the data communications, and may also include the hierarchical MAC address of the host 214a as a "destination MAC address" in a header of the data packet that provides the data communication. As part of the data communication transmission operations 1700, and as illustrated in FIG. 17B, the TOR leaf switch engine 304 in the TOR leaf switch device 204a/300 may receive the data communication via its communication system 308.

Figure 18:
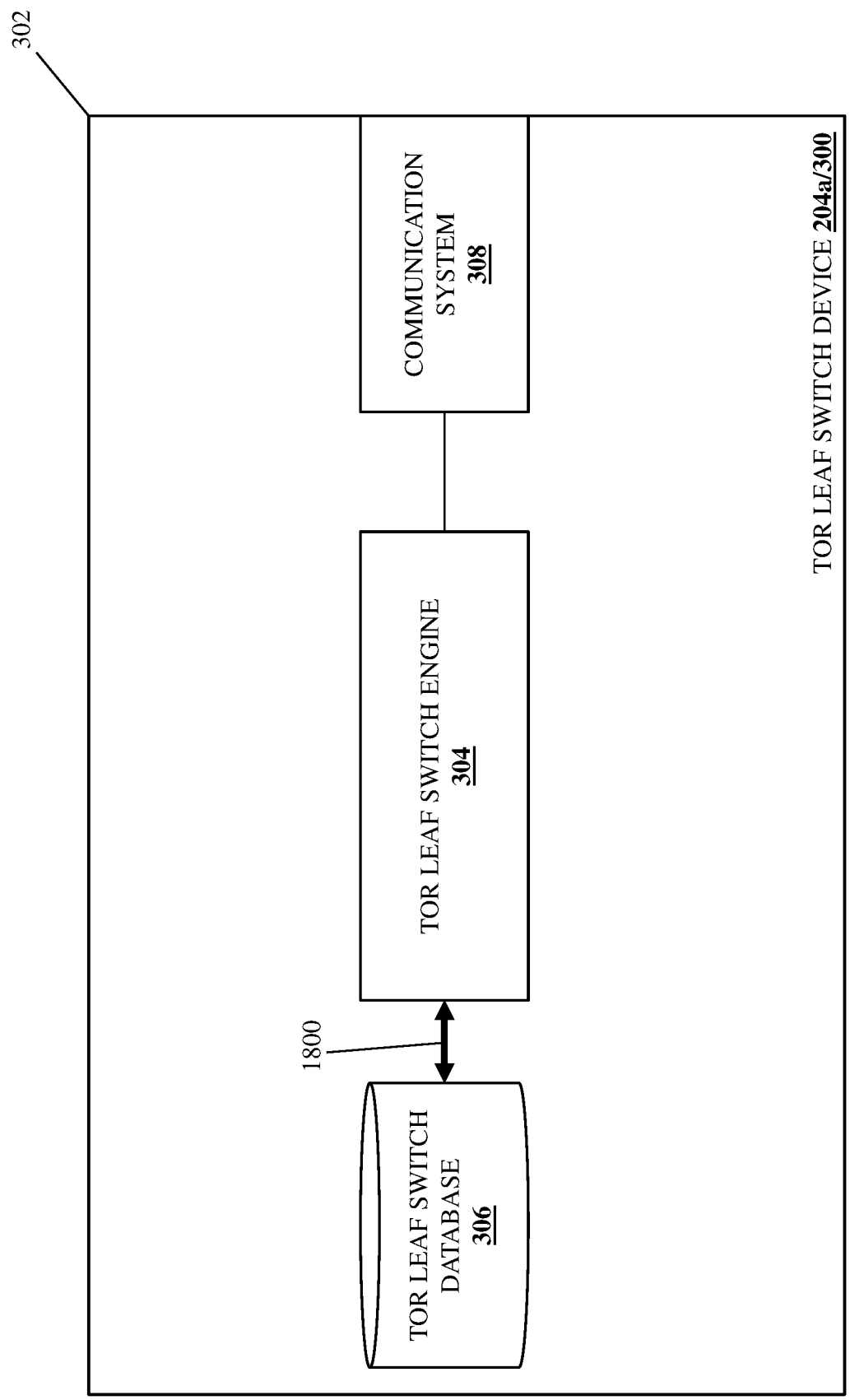
FIG. 18 is a schematic view illustrating an embodiment of the TOR leaf switch device of FIG. 3 operating during the method of FIG. 4A.

The method 400 may then proceed to optional block 406 where the first leaf switch device translates a first non-hierarchical MAC address of the first host in the first data communications to a first hierarchical MAC address of the first host and provides the first hierarchical MAC address in the first data communication. As will be appreciated by one of skill in the art in possession of the present disclosure, optional block 406 may be performed in embodiments where the hosts 202a and 214a utilize their non-hierarchical MAC addresses. With reference to FIG. 18, in an embodiment of optional block 406, the TOR leaf switch engine 304 in the TOR leaf switch device 204a/300 may perform non-hierarchical MAC address/hierarchical MAC address translation operations 1800 that may include using the translation table in the TOR leaf switch database 306 to translate the non-hierarchical MAC address of the host 202a included in the data communication to the hierarchical MAC address of the host 202a. For example, the non-hierarchical MAC address/hierarchical MAC address translation operations 1800 may retrieve the hierarchical MAC address of the host 202a from the TOR leaf switch device database 306, and provide that hierarchical MAC address in place of the non-hierarchical MAC address of the host 202a as the "source MAC address" in a header of a data packet that provides the data communication.

The method 400 then proceeds to block 408 where the first leaf switch device identifies a hierarchical MAC prefix in the second hierarchical MAC address. In an embodiment, at block 408, the TOR leaf switch engine 304 in the TOR leaf switch device 204a/300 may identify the hierarchical MAC prefix 504 in the hierarchical MAC address of the host 214a that was received in the data communication at block 404. As such, continuing with the specific example provided above, the TOR leaf switch engine 304 in the TOR leaf switch device 204a/300 may identify the bit combinations in the site field 504a, the pod field 504b, and the rack field 504c in the hierarchical MAC prefix 504 in the hierarchical MAC address of the host 214a.

Figure 19A:
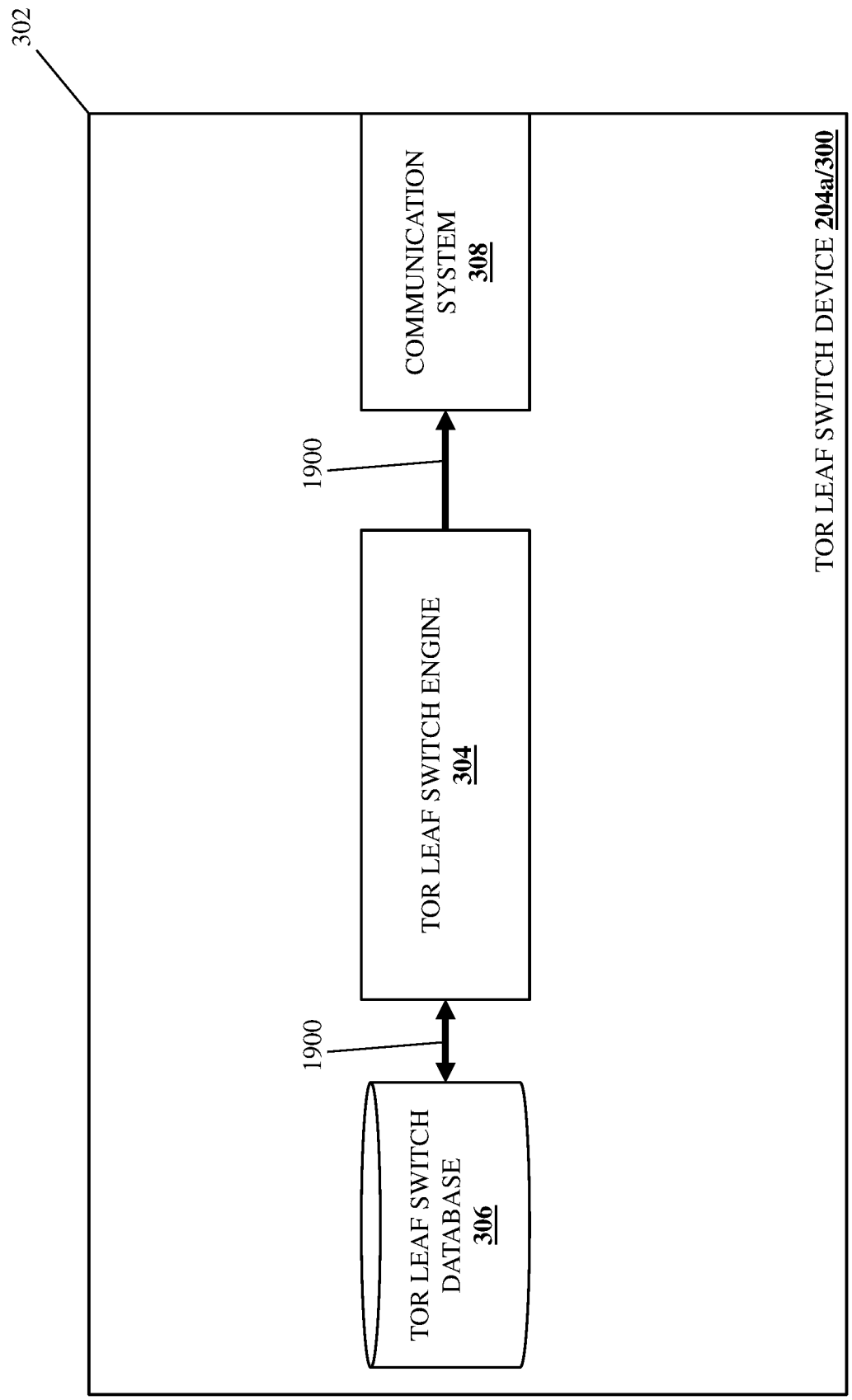
FIG. 19A is a schematic view illustrating an embodiment of the TOR leaf switch device of FIG. 3 operating during the method of FIG. 4A.
Figure 19B:
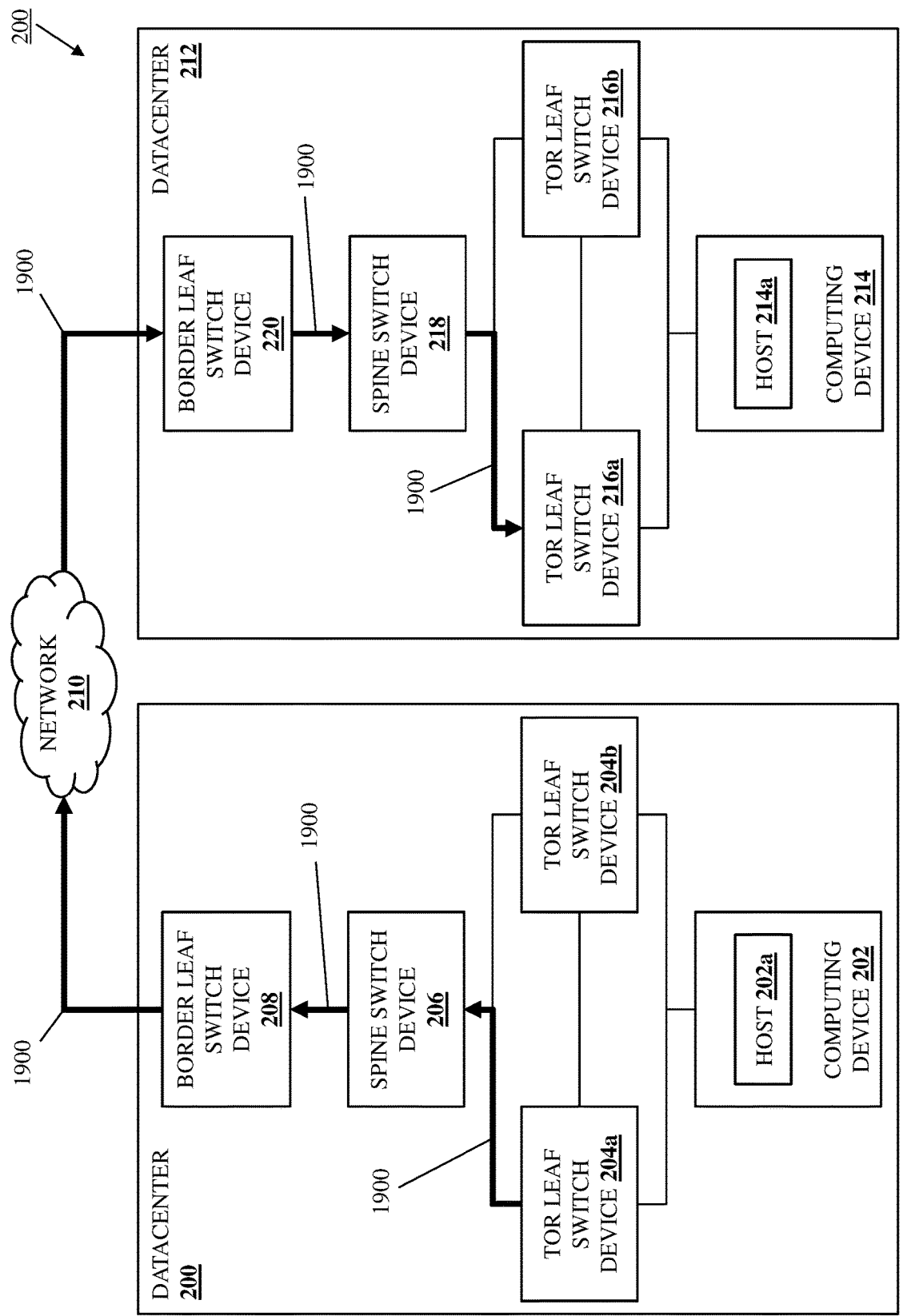
FIG. 19B is a schematic view illustrating an embodiment of the networked system of FIG. 2 operating during the method of FIG. 4A.
Figure 19C:
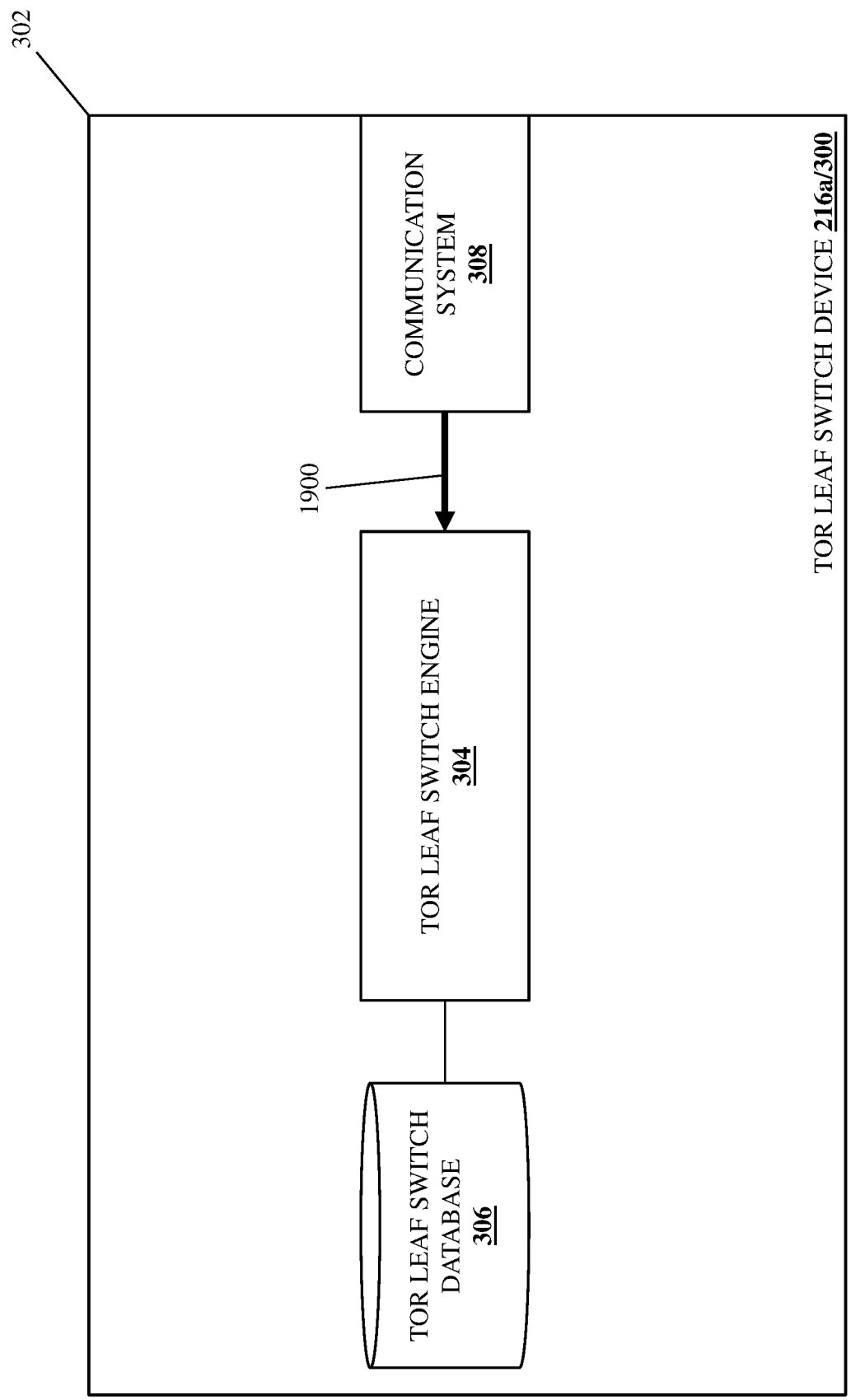
FIG. 19C is a schematic view illustrating an embodiment of the TOR leaf switch device of FIG. 3 operating during the method of FIG. 4A.

The method 400 then proceeds to block 410 where the first leaf switch device forwards the first data communication to the second leaf switch device using the hierarchical MAC prefix. With reference to FIG. 19A, in an embodiment of block 410, the TOR leaf switch engine 304 in the TOR leaf switch device 204a/300 may perform data communication transmission operations 1900 that may include retrieving any data communication transmission information (e.g., remote switch VTEP information, outgoing port information, MAC address information for a next hop to reach a VTEP (or a pointer to an ECMP table to reach a remote VTEP), and/or other forwarding information that one of skill in the art in possession of the present disclosure will appreciate may be accessed via a MAC destination address lookup when forwarding a data packet) associated with the hierarchical MAC prefix 504 in the hierarchical MAC address of the host 214a in the TOR leaf switch database 306 (e.g., in a forwarding table such a MAC address for local destinations, and a hierarchical MAC prefix table for remote destinations), and using that information to transmit the data communication via its communication system 308 and towards the host 214a. For example, as illustrated in FIG. 19B, the TOR leaf switch engine 304 in the TOR leaf switch device 204a/300 may use the hierarchical MAC prefix 504 in the hierarchical MAC address of the host 214a to transmit the data communication via the spine switch device 206, the border leaf switch device 208, the network 210, the border leaf switch device 220, the spine switch device 218, and to the TOR leaf switch device 216a. As such, as part of the data communication transmission operations 1900 and as illustrated in FIG. 19C, the TOR leaf switch engine 304 in the TOR leaf switch device 216a/300 may receive the data communication via its communication system 308

Figure 20A:
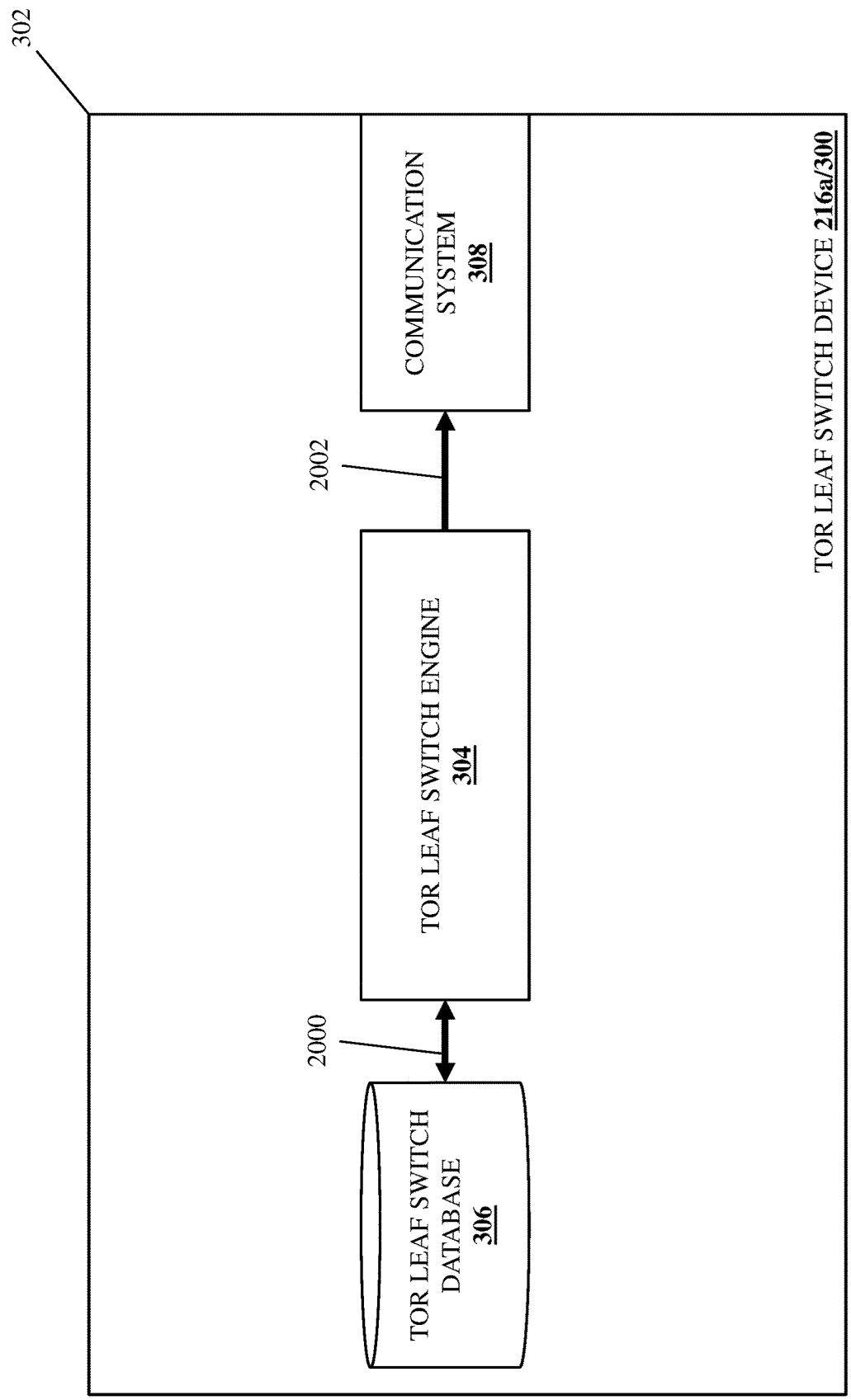
FIG. 20A is a schematic view illustrating an embodiment of the TOR leaf switch device of FIG. 3 operating during the method of FIG. 4A.

The method 400 may then proceed to optional block 412 where the second leaf switch device translates the second hierarchical MAC address in the first data communications to a second non-hierarchical MAC address of the second host and provides the second non-hierarchical MAC address in the first data communication. As will be appreciated by one of skill in the art in possession of the present disclosure, optional block 412 may be performed in embodiments where the hosts 202a and 214a utilize their non-hierarchical MAC addresses. With reference to FIG. 20A, in an embodiment of optional block 412, the TOR leaf switch engine 304 in the TOR leaf switch device 216a/300 may perform hierarchical MAC address/non-hierarchical MAC address translation operations 2000 that may include using the translation table in the TOR leaf switch database 306 to translate the hierarchical MAC address of the host 214a included in the data communication to the non-hierarchical MAC address of the host 214a. For example, the hierarchical MAC address/non-hierarchical MAC address translation operations 2000 may retrieve the non-hierarchical MAC address of the host 214a from the TOR leaf switch device database 306, and provide that non-hierarchical MAC address in place of the hierarchical MAC address of the host 214a as the "destination MAC address" in a header of a data packet that provides the data communication.

Figure 20B:
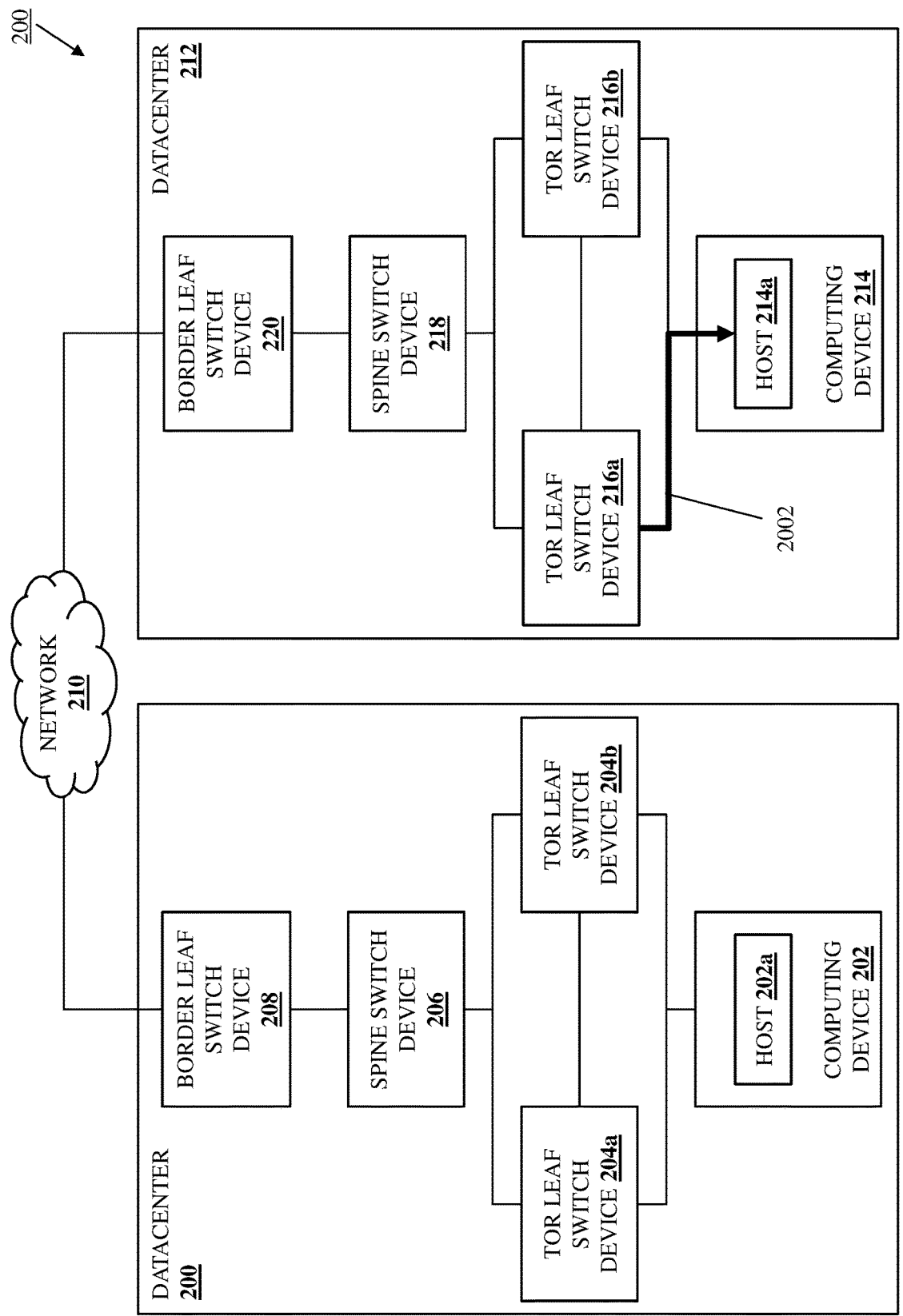
FIG. 20B is a schematic view illustrating an embodiment of the networked system of FIG. 2 operating during the method of FIG. 4A.

The method 400 then proceeds to block 414 where the second leaf switch device forwards the first data communication to the second host. With reference to FIGS. 20A and 20B, in an embodiment of block 414, the TOR leaf switch engine 304 in the TOR leaf switch device 216a/300 may perform data communication transmission operations 2002 that include transmitting the data communication via its communication system 308 and to the host 214a provided by the computing device 214. For example, in embodiments in which the host 214a utilizes it non-hierarchical MAC address, the TOR leaf switch engine 304 in the TOR leaf switch device 216a/300 may unicast or otherwise transmit the data communication to the host 214a based on the non-hierarchical MAC address of the host 214a that is included in the data communication (e.g., as the "destination" MAC address). However, in embodiments in which the host 214a utilizes it hierarchical MAC address, the TOR leaf switch engine 304 in the TOR leaf switch device 216a/300 may unicast or otherwise transmit the data communication to the host 214a based on the hierarchical MAC address of the host 214a that is included in the data communication (e.g., as the "destination" MAC address).

Figure 21A:
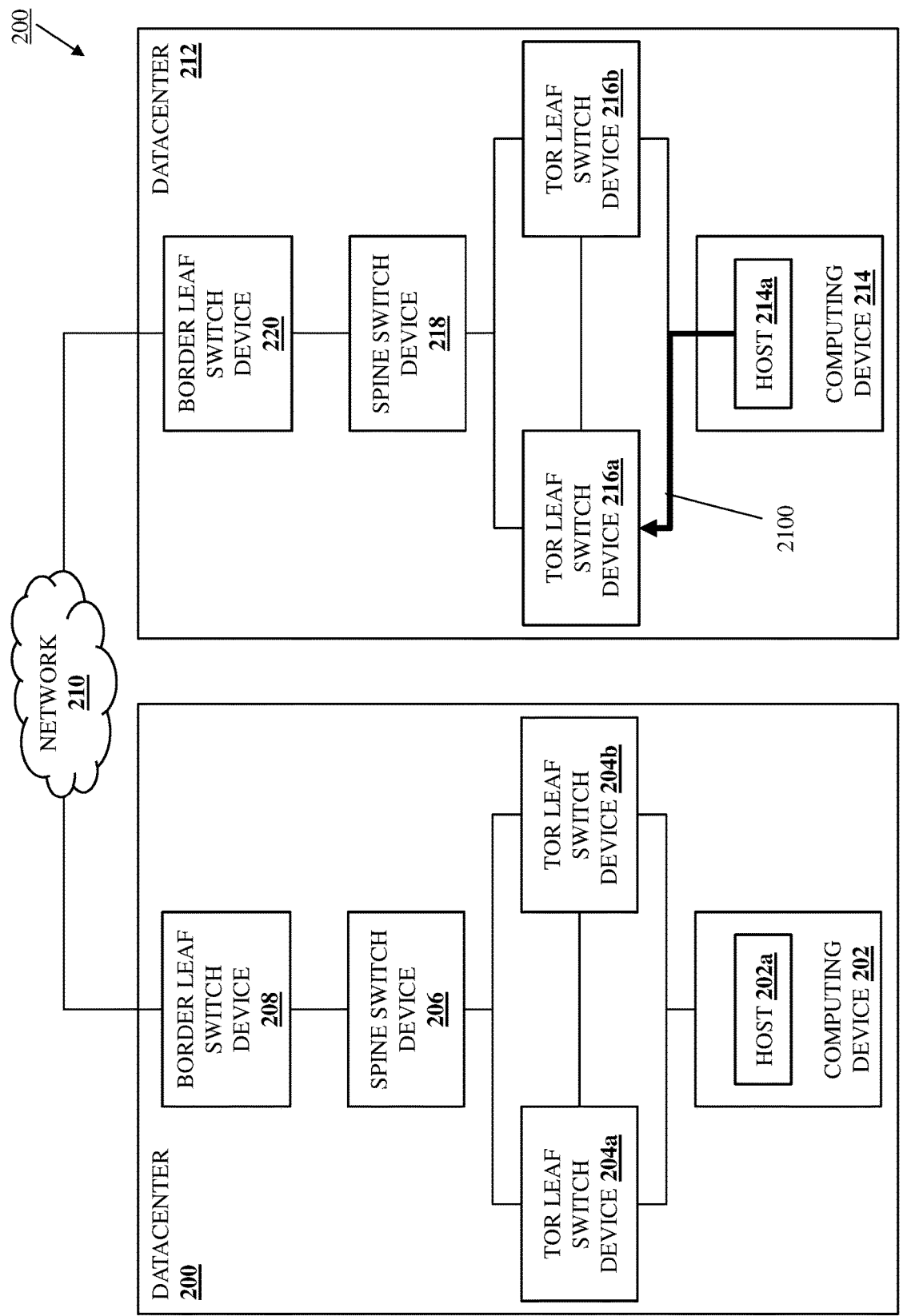
FIG. 21A is a schematic view illustrating an embodiment of the networked system of FIG. 2 operating during the method of FIG. 4A.

As will be appreciated by one of skill in the art in possession of the present disclosure, the host 214a may transmit data communications back to the host 202a in a similar manner as described above. For example, as illustrated in FIGS. 21A and 21B, similarly as described above with reference to the host-202a-to-host-214a data communications at block 404, the host 214a in the computing device 214 may perform data communication transmission operations 2100 that may include generating a data communication that includes the hierarchical MAC address of the host 202a, and transmitting that data communication to the TOR leaf switch device 204a. In embodiments in which the hosts 202a and 214a utilize their hierarchical MAC addresses, the data communication generated and transmitted by the host 214a may include the hierarchical MAC address of the host 214a as a "source MAC address" in a header of a data packet that provides the data communications, and may also include the hierarchical MAC address of the host 202a as a "destination MAC address" in a header of the data packet that provides the data communication. However, in embodiments in which the hosts 202a and 214a utilize their non-hierarchical MAC addresses, the data communication generated and transmitted by the host 214a may include the non-hierarchical MAC address of the host 214a as a "source MAC address" in a header of a data packet that provides the data communications, and may also include the hierarchical MAC address of the host 202a as a "destination MAC address" in a header of the data packet that provides the data communication. As part of the data communication transmission operations 1700, and as illustrated in FIG. 17B, the TOR leaf switch engine 304 in the TOR leaf switch device 216a/300 may receive the data communication via its communication system 308.

Similarly as described above with reference to the host-202a-to-host-214a data communications at optional block 406, when the hosts 202a and 214a utilize their non-hierarchical MAC addresses, the TOR leaf switch engine 304 in the TOR leaf switch device 216a/300 may perform non-hierarchical MAC address/hierarchical MAC address translation operations that may include using the translation table in the TOR leaf switch database 306 to translate the non-hierarchical MAC address of the host 214a included in the data communication to the hierarchical MAC address of the host 214a. For example, the non-hierarchical MAC address/hierarchical MAC address translation operations may retrieve the hierarchical MAC address of the host 214a from the TOR leaf switch device database 306, and provide that hierarchical MAC address in place of the non-hierarchical MAC address of the host 214a as the "source MAC address" in a header of a data packet that provides the data communication.

Similarly as described above with reference to the host-202a-to-host-214a data communications at block 408, the TOR leaf switch engine 304 in the TOR leaf switch device 216a/300 may identify the hierarchical MAC prefix 504 in the hierarchical MAC address of the host 202a that was received in the data communication. As such, continuing with the specific example provided above, the TOR leaf switch engine 304 in the TOR leaf switch device 216a/300 may identify the bit combinations in the site field 504a, the pod field 504b, and the rack field 504c in the hierarchical MAC prefix 504 in the hierarchical MAC address of the host 202a.

Figure 22A:
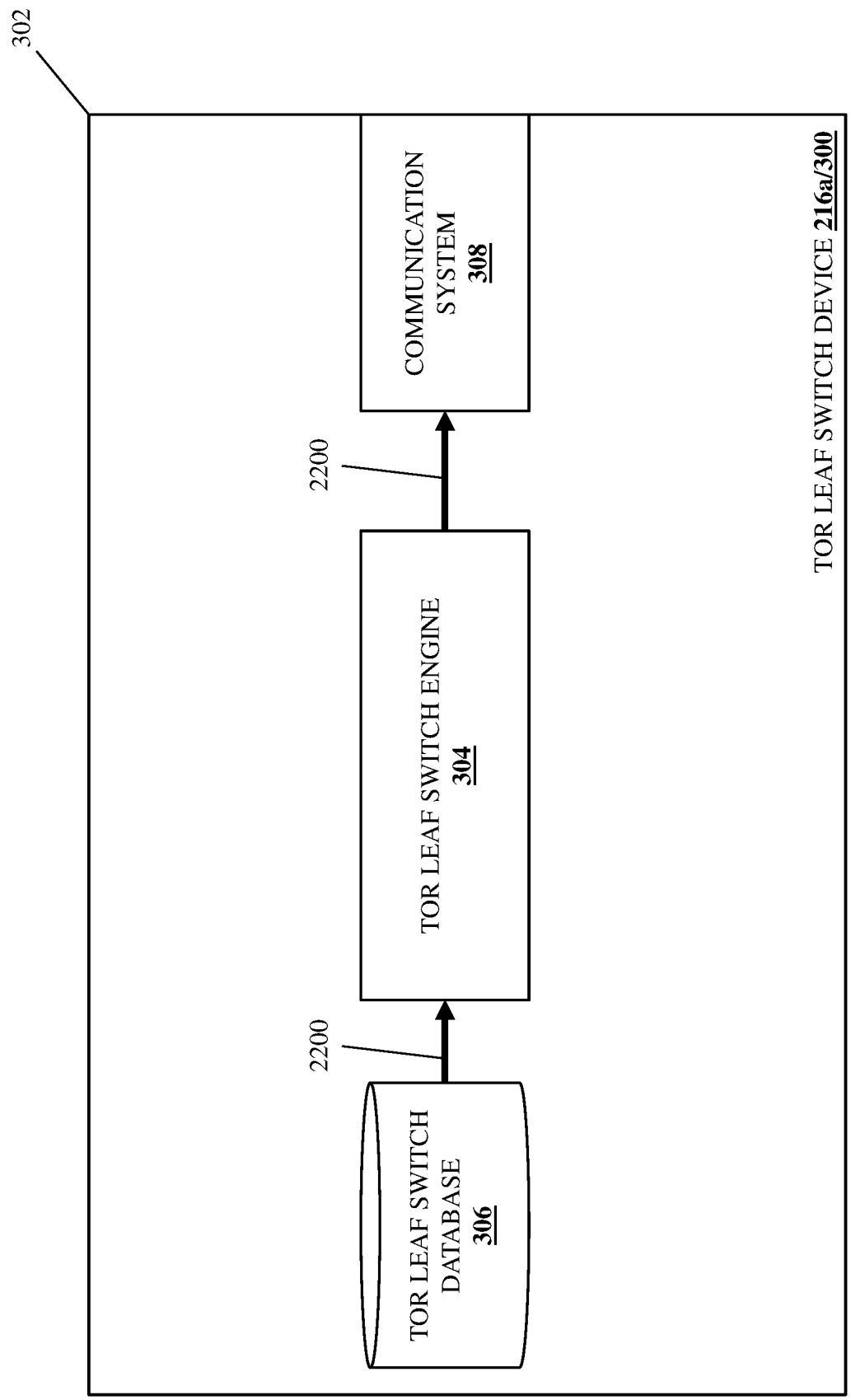
FIG. 22A is a schematic view illustrating an embodiment of the TOR leaf switch device of FIG. 3 operating during the method of FIG. 4A.
Figure 22B:
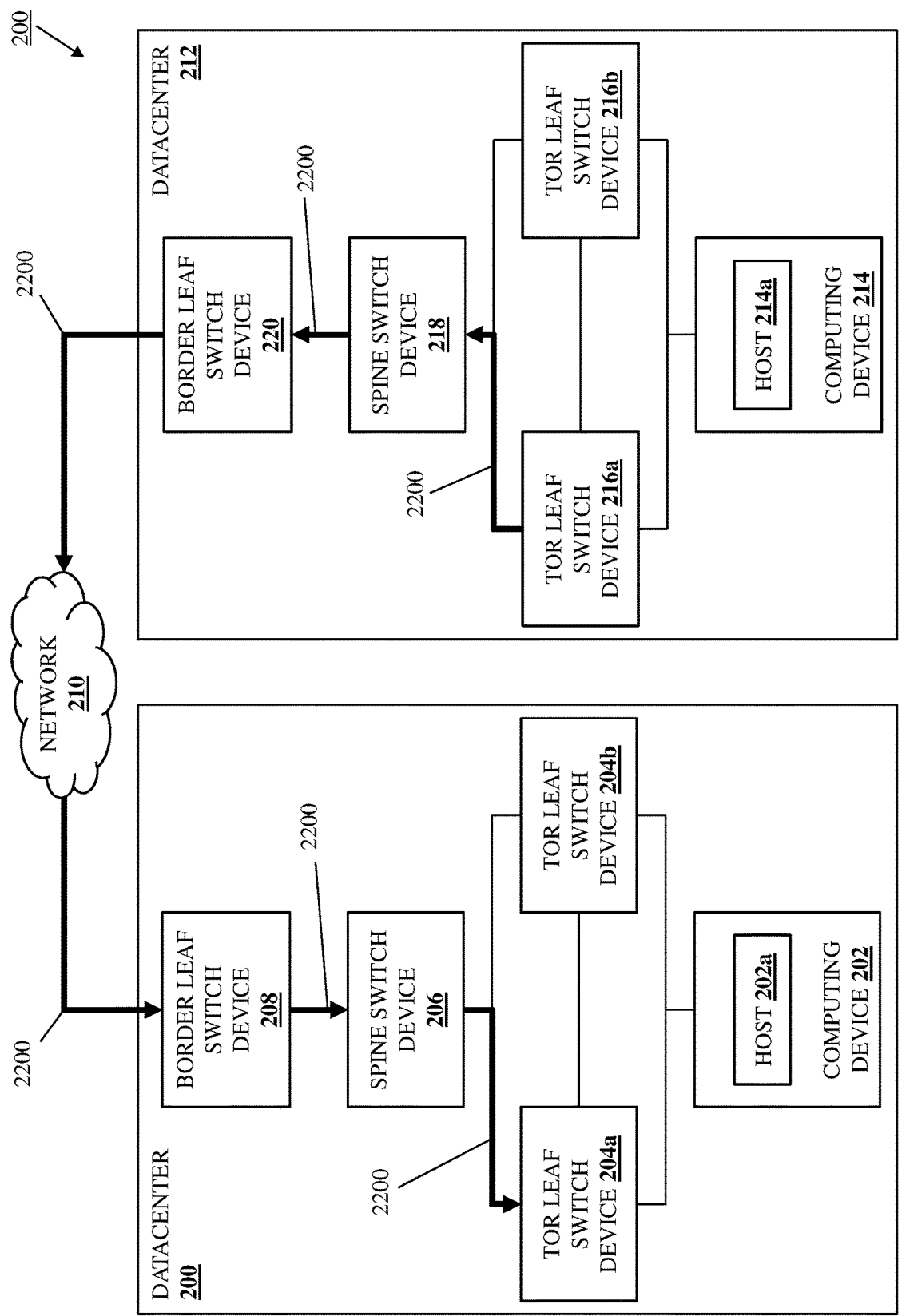
FIG. 22B is a schematic view illustrating an embodiment of the networked system of FIG. 2 operating during the method of FIG. 4A.

With reference to FIGS. 22A, 22B, and 22C, similarly as described above with reference to the host-202a-to-host-214a data communications at block 410, the TOR leaf switch engine 304 in the TOR leaf switch device 216a/300 may perform data communication transmission operations 2200 that may include retrieving any data communication transmission information (e.g., remote switch VTEP information, outgoing port information, MAC address information for a next hop to reach a VTEP (or a pointer to an ECMP table to reach a remote VTEP), and/or other forwarding information that one of skill in the art in possession of the present disclosure will appreciate may be accessed via a MAC destination address lookup when forwarding a data packet) associated with the hierarchical MAC prefix 504 in the hierarchical MAC address of the host 202a in the TOR leaf switch database 306 (e.g., in a forwarding table such a MAC address for local destinations, and a hierarchical MAC prefix table for remote destinations), and using that information to transmit the data communication via its communication system 308 and towards the host 202a. For example, as illustrated in FIG. 22B, the TOR leaf switch engine 304 in the TOR leaf switch device 216a/300 may use the hierarchical MAC prefix 504 in the hierarchical MAC address of the host 202a to transmit the data communication via the spine switch device 218, the border leaf switch device 220, the network 210, the border leaf switch device 208, the spine switch device 206, and to the TOR leaf switch device 204a. As such, as part of the data communication transmission operations 2200 and as illustrated in FIG. 22C, the TOR leaf switch engine 304 in the TOR leaf switch device 204a/300 may receive the data communication via its communication system 308.

Figure 23A:
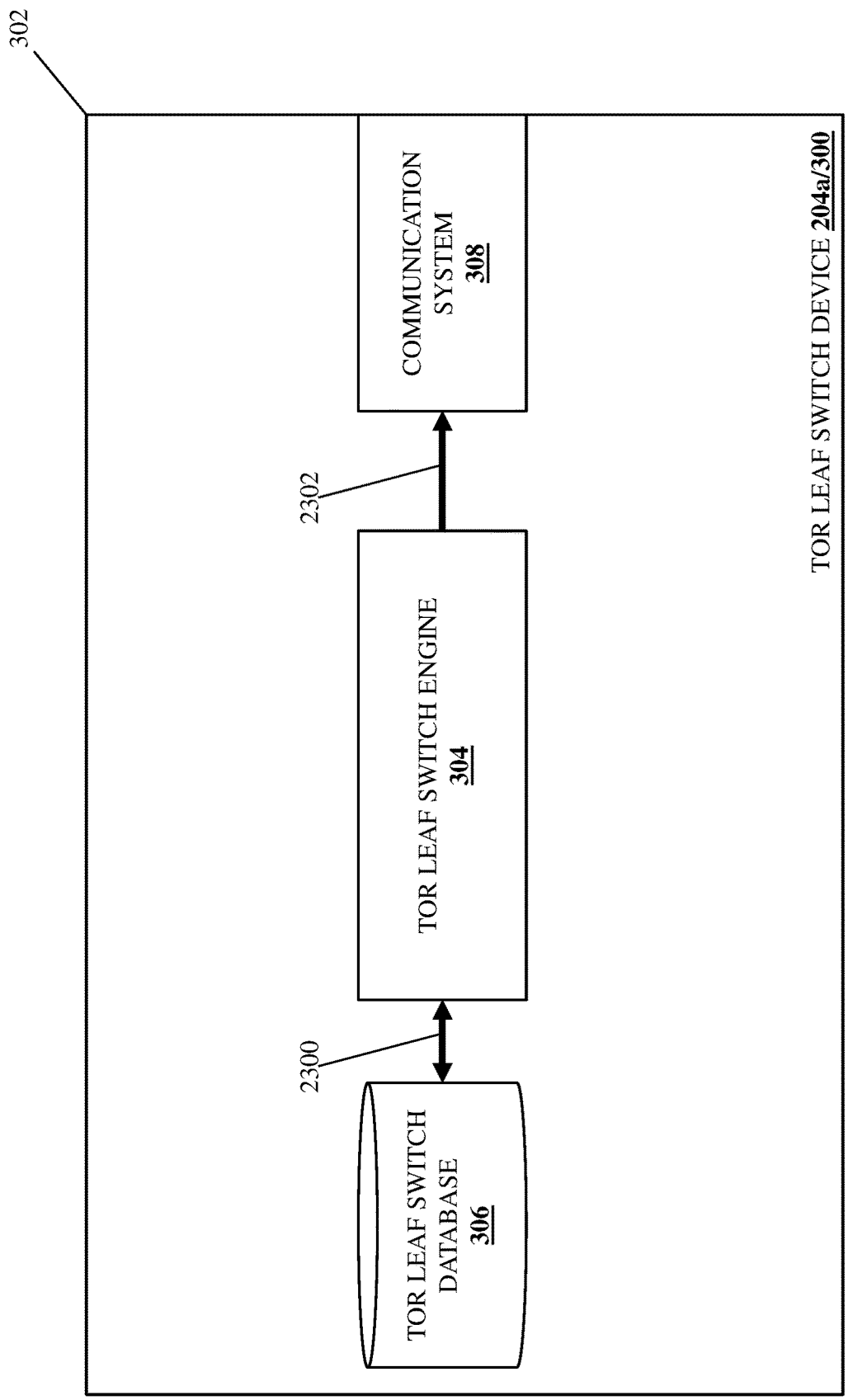
FIG. 23A is a schematic view illustrating an embodiment of the TOR leaf switch device of FIG. 3 operating during the method of FIG. 4A.

As illustrated in FIG. 23A, similarly as described above with reference to the host-202a-to-host-214a data communications at optional block 412, when the hosts 202a and 214a utilize their non-hierarchical MAC addresses, the TOR leaf switch engine 304 in the TOR leaf switch device 202a/300 may perform hierarchical MAC address/non-hierarchical MAC address translation operations 2300 that may include using the translation table in the TOR leaf switch database 306 to translate the hierarchical MAC address of the host 202a included in the data communication to the non-hierarchical MAC address of the host 202a. For example, the hierarchical MAC address/non-hierarchical MAC address translation operations 2200 may retrieve the non-hierarchical MAC address of the host 202ak from the TOR leaf switch device database 306, and provide that non-hierarchical MAC address in place of the hierarchical MAC address of the host 202a as the "destination MAC address" in a header of a data packet that provides the data communication.

Figure 23B:
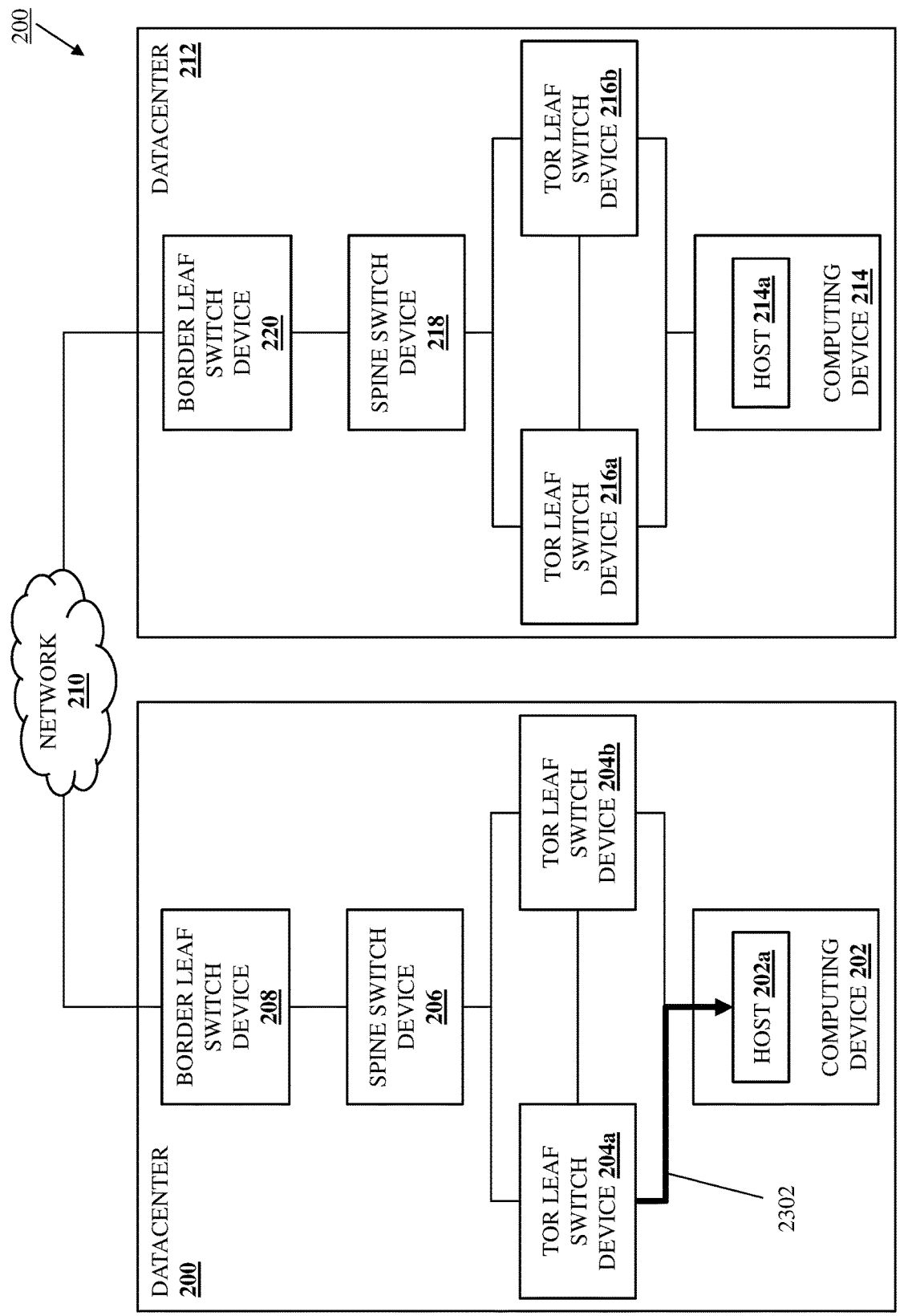
FIG. 23B is a schematic view illustrating an embodiment of the networked system of FIG. 2 operating during the method of FIG. 4A.

As illustrated in FIGS. 23A and 23B, similarly as described above with reference to the host-202a-to-host-214a data communications at block 414, the TOR leaf switch engine 304 in the TOR leaf switch device 204a/300 may perform data communication transmission operations 2302 that include transmitting the data communication via its communication system 308 and to the host 202a provided by the computing device 202. For example, in embodiments in which the host 202a utilizes it non-hierarchical MAC address, the TOR leaf switch engine 304 in the TOR leaf switch device 204a/300 may unicast or otherwise transmit the data communication to the host 202a based on the non-hierarchical MAC address of the host 202a that is included in the data communication (e.g., as the "destination" MAC address). However, in embodiments in which the host 202a utilizes it hierarchical MAC address, the TOR leaf switch engine 304 in the TOR leaf switch device 204a/300 may unicast or otherwise transmit the data communication to the host 202a based on the hierarchical MAC address of the host 202a that is included in the data communication (e.g., as the "destination" MAC address).

While the discussions above focus on communications with "remote" TOR leaf switch devices, one of skill in the art in possession of the present disclosure will appreciate how the TOR leaf switch devices may enable "local" communications between, for example, hosts provided by computing devices that are each accessible via that TOR leaf switch device, with such local communications performed without the need for the hierarchical MAC prefixes, translations, and/or other operations described above.

Thus, systems and methods have been described that provide for the use of hierarchical MAC addresses by leaf switch devices in the forwarding of L2 domain communications between their connected hosts. For example, the L2 domain hierarchical address communication system of the present disclosure may include a first computing device that provides a first host, and a second computing device that provides a second host. A first leaf switch device is connected to the first computing device, and a second leaf switch device that is connected to the second computing device and coupled to the first leaf switch device. The first leaf switch device receives a first data communication from the first host that includes a second hierarchical MAC address of the second host. The first leaf switch device identifies a hierarchical MAC prefix in the second hierarchical MAC address, and uses the hierarchical MAC prefix to forward the first data communication to the second leaf switch device. As such, leaf switch devices need only store the hierarchical MAC prefixes associated with "remote" hosts, thus reducing the size of their forwarding tables.

As will be appreciated by one of skill in the art in possession of the present disclosure, hosts like the hosts 202a and 214 discussed above may be moved within a computing device and/or between computing devices. In the systems and methods of the present disclosure, movement of a host between computing devices that are connected to or directly accessible via the same TOR leaf switch device (e.g., movement of the host 202a from the computing device 202 to a computing device also connected to the TOR switch devices 204a and/or 204b) do not require any modification to their hierarchical MAC address, as one of skill in the art in possession of the present disclosure will appreciate how those hosts will still be accessible using those hierarchical MAC addresses. However, movement of a host between computing devices connected to different TOR leaf switch device (e.g., movement of the host 202a from the computing device 202 to a computing device that is not connected to the TOR switch devices 204a and/or 204b) will require that those hosts be provided a new hierarchical MAC address that, using the example provided above, identifies the new site, pod, and/or rack in which the computing device now providing that host is included.

In some embodiments, hierarchical MAC addresses may be pre-allocated for non-hierarchical MAC addresses and provided in a second TOR leaf switch device that provides access to a second computing device that is expected to provide a host that is currently being provided by a different, first computing device accessible via a different, first TOR leaf switch device. Furthermore, the second TOR leaf switch device may be configured to release that hierarchical MAC address if necessary (e.g., if the host does not end up being moved to the computing device to which it provides access). Furthermore, a "gratuitous" discovery communication (e.g., a gratuitous ARP communication, a gratuitous ND communication, etc.) may be utilized to update discovery caches (e.g., ARP caches, ND caches, etc.) in hosts and TOR leaf switch devices in the event of the host movement discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Layer 2 (L2) domain hierarchical address communication system, comprising:

a second computing device that is located in a second datacenter and that provides a second host;
a second leaf switch device that is located in the second datacenter and through which the second computing device is directly accessible;
a first leaf switch device that is located in a first datacenter that is different than the second datacenter; and
a first computing device that is located in the first datacenter, that provides a first host, and that is coupled to and directly accessible via the second leaf switch, wherein the first computing device is configured to:
provide, to the first leaf switch device, a first data communication that includes a second hierarchical Media Access Control (MAC) address of the second host having a hierarchical MAC prefix that includes a site field that provides a site identifier identifying the second datacenter, a pod field that provides a pod identifier identifying a leaf switch device group of a plurality of leaf switch devices that include the second leaf switch device, a rack field that provides a rack identifier identifying the second leaf switch device, and a host field that provides a second host identifier identifying the second host, wherein the first leaf switch device is configured to:
receive, from the first host, the first data communication;
retrieve, using the site identifier that identifies the second datacenter, the pod identifier that identifies the leaf switch device group, and the rack identifier that identifies the second leaf switch device in the hierarchical MAC prefix in the second hierarchical MAC address, second leaf switch forwarding information for the second leaf switch device from a forwarding table in the first leaf switch device that does not store second host forwarding information for the second host identifier; and
forward, directly to the second leaf switch device using the second leaf switch forwarding information that is based on the site identifier, the pod identifier, and the rack identifier, the first data communication.

2. The system of claim 1, wherein the first data communication includes a first non-hierarchical MAC address of the first host, and wherein the first leaf switch device is configured to:
translate the first non-hierarchical MAC address to a first hierarchical MAC address of the first host; and
provide the first hierarchical MAC address in the first data communication that is forwarded to the second leaf switch device.

3. The system of claim 1, wherein the first leaf switch device is configured to:
receive, from the second leaf switch device, a second data communication that includes a first hierarchical MAC address of the first host; and
forward, to the first host using the first hierarchical MAC address, the second data communication.

4. The system of claim 1, wherein the first leaf switch device is configured to:
receive, from the second leaf switch device, a second data communication that includes a first hierarchical MAC address of the first host;
translate the first hierarchical MAC address to a first non-hierarchical MAC address of the first host; and
forward, to the first host using the first non-hierarchical MAC address, the second data communication.

5. The system of claim 1, wherein the first leaf switch device is configured, prior to receiving the first data communication, to:
receive, from the first host, a first discovery communication that includes a first non-hierarchical MAC address of the first host, a first Internet Protocol (IP) address of the first host, and a second IP address of the second host;
generate, based on the first non-hierarchical MAC address, a first hierarchical MAC address of the first host;
store the first hierarchical MAC address in association with the first IP address;
provide the first hierarchical MAC address and the second IP address in the first discovery communication; and
transmit, to the second leaf switch device, the first discovery communication.

6. The system of claim 5, wherein the second leaf switch device is configured to:
receive, from the first leaf switch device, the first discovery communication;
transmit, to the second host, the first discovery communication;
receive, from the second host subsequent to transmitting the first discovery communication to the second host, a second discovery communication that includes a second non-hierarchical MAC address of the second host;
generate, based on the second non-hierarchical MAC address, a second hierarchical MAC address of the second host;
store the second hierarchical MAC address in association with the second IP address;
provide the second hierarchical MAC address in the second discovery communication; and
transmit, to the first leaf switch device, the second discovery communication.

7. The system of claim 5, further comprising:
a third leaf switch device that is connected to each of the first leaf switch device and the first computing device, and that is coupled to the second leaf switch device, wherein the first leaf switch device is configured to:
provide, to the third leaf switch device, the first hierarchical MAC address.

8. An Information Handling System (IHS), comprising:
a processing system including at least one hardware processor; and
a memory system that is coupled to the processing system and that includes instructions that, when executed by the processing system, cause the processing system to provide a leaf switch engine that is configured to:
receive, from a first host provided by a first computing device that is located in a first datacenter with the processing system, a first data communication that includes a second hierarchical Media Access Control (MAC) address of a second host provided by a second computing device that is located in a second datacenter that is different than the first datacenter and that is coupled to the processing system by a second leaf switch device that is also located in the second datacenter and through which the second computing device is directly accessible, wherein the second hierarchical MAC address includes a hierarchical MAC prefix having a site field that provides a site identifier identifying the second datacenter, a pod field that provides a pod identifier identifying a leaf switch device group of a plurality of leaf switch devices that include the second leaf switch device, a rack field that provides a rack identifier identifying the second leaf switch device, and a host field that provides a second host identifier identifying the second host;

retrieve, using the site identifier that identifies the second datacenter, the pod identifier that identifies the leaf switch device group, and the rack identifier that identifies the second leaf switch device in the hierarchical MAC prefix in the second hierarchical MAC address, second leaf switch forwarding information for the second leaf switch device from a forwarding table that is coupled to the processing system and that does not store second host forwarding information for the second host identifier; and forward, using the second leaf switch forwarding information that is based on the site identifier, the pod identifier, and the rack identifier, the first data communication directly to the second leaf switch device.

9. The IHS of claim 8, wherein the first data communication includes a first non-hierarchical MAC address of the first host, and wherein the leaf switch engine is configured to:
translate the first non-hierarchical MAC address to a first hierarchical MAC address of the first host; and
provide the first hierarchical MAC address in the first data communication that is forwarded to the second leaf switch device.

10. The IHS of claim 8, wherein the leaf switch engine is configured to:
receive, from the second leaf switch device, a second data communication that includes a first hierarchical MAC address of the first host; and
forward, to the first host using the first hierarchical MAC address, the second data communication.

11. The IHS of claim 8, wherein the leaf switch engine is configured to:
receive, from the second leaf switch device, a second data communication that includes a first hierarchical MAC address of the first host;
translate the first hierarchical MAC address to a first non-hierarchical MAC address of the first host; and
forward, to the first host using the first non-hierarchical MAC address, the second data communication.

12. The IHS of claim 8, wherein the leaf switch engine is configured, prior to receiving the first data communication, to:
receive, from the first host, a first discovery communication that includes a first non-hierarchical MAC address of the first host, a first Internet Protocol (IP) address of the first host, and a second IP address of the second host;
generate, based on the first non-hierarchical MAC address, a first hierarchical MAC address of the first host;
store the first hierarchical MAC address in association with the first IP address; and
provide the first hierarchical MAC address and the second IP address in the first discovery communication;
transmit, to the second leaf switch device, the first discovery communication; and
receive, from the second leaf switch device in response to the first discovery communication, a second discovery communication that includes a second hierarchical MAC address of the second host.

13. The IHS of claim 9, wherein the leaf switch engine is configured to:
provide, to a third leaf switch device that connected to the first computing device and coupled to the second leaf switch device, the first hierarchical MAC address.

14. A method for providing Layer 2 (L2) domain hierarchical address communications, comprising:
receiving, by a first leaf switch device from a first host provided by a first computing device that is that is located in a first datacenter with the first leaf switch device, a first data communication that includes a second hierarchical Media Access Control (MAC) address of a second host provided by a second computing device that is located in a second datacenter that is different than the first datacenter and that is coupled to the first leaf switch device by a second leaf switch device that is also located in the second datacenter and through which the second computing device is directly accessible, wherein the second hierarchical MAC address includes a hierarchical MAC prefix having a site field that provides a site identifier identifying the second datacenter, a pod field that provides a pod identifier identifying a leaf switch device group of a plurality of leaf switch devices that include the second leaf switch device, a rack field that provides a rack identifier identifying the second leaf switch device, and a host field that provides a second host identifier identifying the second host;
retrieving, by the first leaf switch device using the site identifier that identifies the second datacenter, the pod identifier that identifies the leaf switch device group, and the rack identifier that identifies the second leaf switch device in the hierarchical MAC prefix in the second hierarchical MAC address, second leaf switch forwarding information for the second leaf switch device from a forwarding table that is coupled to the first leaf switch device and that does not store second host forwarding information for the second host identifier; and
forwarding, by the first leaf switch device directly to the second leaf switch device using the second leaf switch forwarding information that is based on the site identifier, the pod identifier, and the rack identifier, the first data communication.

15. The method of claim 14, wherein the first data communication includes a first non-hierarchical MAC address of the first host, and wherein the method further comprises:
translating, by the first leaf switch device, the first non-hierarchical MAC address to a first hierarchical MAC address of the first host; and
providing, by the first leaf switch device, the first hierarchical MAC address in the first data communication that is forwarded to the second leaf switch device.

16. The method of claim 14, further comprising:
receiving, by the first leaf switch device from the second leaf switch device, a second data communication that includes a first hierarchical MAC address of the first host; and
forwarding, by the first leaf switch device to the first host using the first hierarchical MAC address, the second data communication.

17. The method of claim 14, further comprising:
receiving, by the first leaf switch device from the second leaf switch device, a second data communication that includes a first hierarchical MAC address of the first host;

translating, by the first leaf switch device, the first hierarchical MAC address to a first non-hierarchical MAC address of the first host; and forwarding, by the first leaf switch device to the first host using the first non-hierarchical MAC address, the second data communication.

18. The method of claim 14, further comprising:

receiving, by the first leaf switch device from the first host, a first discovery communication that includes a first non-hierarchical MAC address of the first host, a first Internet Protocol (IP) address of the first host, and a second IP address of the second host;

generating, by the first leaf switch device based on the first non-hierarchical MAC address, a first hierarchical MAC address of the first host;

storing, by the first leaf switch device, the first hierarchical MAC address in association with the first IP address;

providing, by the first leaf switch device, the first hierarchical MAC address and the second IP address in the first discovery communication; and transmitting, by the first leaf switch device to the second leaf switch device, the first discovery communication.

19. The method of claim 18, further comprising:

receiving, by the second leaf switch device from the first leaf switch device, the first discovery communication;

transmitting, by the second leaf switch device to the second host, the first discovery communication;

receiving, by the second leaf switch device from the second host subsequent to transmitting the first discovery communication to the second host, a second discovery communication that includes a second non-hierarchical MAC address of the second host;

generating, by the second leaf switch device based on the second non-hierarchical MAC address, a second hierarchical MAC address of the second host;

storing, by the second leaf switch device, the second hierarchical MAC address in association with the second IP address;

providing, by the second leaf switch device, the second hierarchical MAC address in the second discovery communication; and transmitting, by the second leaf switch device to the first leaf switch device, the second discovery communication.

20. The method of claim 14, further comprising:

providing, by the first leaf switch device to a third leaf switch device that connected to the first computing device and coupled to the second leaf switch device, the first hierarchical MAC address.

* * * * *